United States Patent
Herbert

(10) Patent No.: US 12,461,885 B2
(45) Date of Patent: Nov. 4, 2025

(54) PARSER INSTRUCTIONS FOR CPUS

(71) Applicant: SiPanda Inc., San Jose, CA (US)

(72) Inventor: Tom Herbert, Los Gatos, CA (US)

(73) Assignee: SiPanda Inc., San Jose, CA (US)

( * ) Notice: Subject to any disclaimer, the term of this patent is extended or adjusted under 35 U.S.C. 154(b) by 0 days.

(21) Appl. No.: 18/762,396

(22) Filed: Jul. 2, 2024

(65) Prior Publication Data

US 2025/0028672 A1 Jan. 23, 2025

Related U.S. Application Data

(63) Continuation-in-part of application No. 17/233,149, filed on Apr. 16, 2021, now Pat. No. 12,026,546.

(60) Provisional application No. 63/011,002, filed on Apr. 16, 2020.

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
CPC .............. G06F 13/4282; G06F 2213/0002
See application file for complete search history.

(56) References Cited

U.S. PATENT DOCUMENTS

| | | | |
|---|---|---|---|
| 5,835,792 A | 11/1998 | Wise et al. | |
| 8,914,590 B2 | 12/2014 | Vorbach et al. | |
| 9,529,599 B2 | 12/2016 | Anderson | |
| 9,766,894 B2 | 9/2017 | Glossner et al. | |
| 10,212,131 B2* | 2/2019 | Uchikawa | G06F 3/1222 |
| 11,416,294 B1 | 8/2022 | Davis | |
| 12,282,775 B2* | 4/2025 | Shahar | G06F 9/3867 |
| 2012/0260239 A1 | 10/2012 | Martinez Canedo et al. | |
| 2013/0215906 A1* | 8/2013 | Hidai | H04L 69/12 370/474 |
| 2014/0115560 A1 | 4/2014 | Hutchison | |
| 2015/0081726 A1* | 3/2015 | Izenberg | G06F 16/134 707/755 |
| 2015/0293785 A1 | 10/2015 | Murphy | |
| 2015/0341265 A1* | 11/2015 | Basso | H04L 45/74 370/392 |
| 2015/0373169 A1* | 12/2015 | Singh | H04L 69/16 370/471 |
| 2016/0139892 A1* | 5/2016 | Atreya | G06F 8/427 717/143 |
| 2016/0197852 A1* | 7/2016 | Hutchison | G06F 3/0656 370/392 |
| 2017/0286292 A1* | 10/2017 | Levy | G06F 12/04 |
| 2018/0146077 A1 | 5/2018 | Pang et al. | |
| 2019/0182366 A1* | 6/2019 | Kfir | H04L 69/22 |
| 2019/0196824 A1 | 6/2019 | Liu et al. | |
| 2019/0215384 A1* | 7/2019 | Kfir | H04L 45/74 |

(Continued)

*Primary Examiner* — Henry Tsai
*Assistant Examiner* — Christopher A Daley
(74) *Attorney, Agent, or Firm* — Bold IP, PLLC; Christopher Mayle

(57) ABSTRACT

A system and method for a protocol parser that has native support for parsing TLVs and flag-fields and allow users to code in a language convenient to them and leverage standard tool chains and tools. The same parser source can be compiled to arbitrary software and hardware targets without code change and provide the highest performance possible given its capabilities.

20 Claims, 108 Drawing Sheets

(56) References Cited

U.S. PATENT DOCUMENTS

| | | |
|---|---|---|
| 2019/0310856 A1 | 10/2019 | Ayzenfeld et al. |
| 2021/0176345 A1* | 6/2021 | Urman .................... H04L 69/22 |

* cited by examiner

```
push    %rbp
mov     %rsp,%rbp
sub     $0x30,%rsp
mov     %rdi,-0x28(%rbp)
mov     %esi,-0x2c(%rbp)
mov     -0x28(%rbp),%rax
mov     %rax,-0x10(%rbp)
cmpl    $0x13,-0x2c(%rbp)
ja      28 <ipv4_node+0x28>
mov     $0x0,%eax
...
mov     %rax,-0x8(%rbp)
mov     -0x2c(%rbp),%eax
sub     -0x14(%rbp),%eax
mov     -0x14(%rbp),%ecx
mov     -0x28(%rbp),%rdx
add     %rdx,%rcx
mov     -0x8(%rbp),%rdx
mov     %eax,%esi
mov     %rcx,%rdi
callq   *%rdx
leaveq
retq
``` x86
~40 cycles

```
void *ipv4_node(void *hdr,
                unsigned int pktlen)
{
    handler_func_t func;
    struct iphdr *ip = hdr;
    unsigned int len;

if (pktlen < sizeof("ip"))
        return NULL;

len = ip->ihl << 2;
    if (pktlen < len)
        return NULL;

func =
        table[ip->protocol].func;
    return func(hdr + len,
                pktlen - len);
}
```

```
prs.load.b paccum,pcurptr
prs.lensetmin.n phlen,paccum[1],4:20
prs.load.b paccum,pcurptr+9
prs.cam.b.stp pnext,paccum[0],1
```

```
int ipv4_proto(const void *viph)
{
    return ((struct iphdr *)viph)->protocol;
} ssize_t ipv4_length(void *viph)
{
    return ipv4_len((struct iphdr *)viph);
} struct panda_proto_node parse_ipv4 = {
    .name = "IPV4-check",
    .min_len = sizeof(struct iphdr),
    .ops.len = ipv4_length,
    .ops.next_proto = ipv4_proto,
};
```

SDPU parser, 10 cycles

FIG. 16

| Canonical size value | Size | Assem.. qualifier | Position range | Sz value for ins. allowing nibble sub-registers | Sz value for ins. allowing full registers |
|---|---|---|---|---|---|
| 0 | Nibble (4 bits) | .n | 0 to 15 | 0 | |
| 1 | Byte (8 bits) | .b | 0 to 7 | 1 | 1 |
| 2 | Half-word (16 bits) | .h | 0 to 3 | 2 | 2 |
| 3 | Word (32 bits) | .w | 0 to 1 | 3 | 3 |
| 4 | Double (64 bits) | (none) | 0 | | 0 |

FIG. 17

3.2.1. Sub-register number (big endian representation)

| 0 | 1 | 2 | 3 | 4 | 5 | 6 | 7 | 8 | 9 | 10 | 11 | 12 | 13 | 14 | 15 |

Nibble sub-registers

| 0 | 1 | 2 | 3 | 4 | 5 | 6 | 7 |

Byte sub-registers

| 0 | 1 | 2 | 3 |

Half-word sub-registers

| 0 | 1 |

Word sub-registers

Sub-register number (byte little endian representation, bit big endian)

| 14 | 15 | 12 | 13 | 10 | 11 | 8 | 9 | 6 | 7 | 4 | 5 | 2 | 3 | 0 | 1 |

Nibble sub-registers

| 7 | 6 | 5 | 4 | 3 | 2 | 1 | 0 |

Byte sub-registers

| 3 | 2 | 1 | 0 |

Half-word sub-registers

| 1 | 0 |

Word sub-registers

FIG. 18

| Sub-Array Base index= 0 | Index | 0 | 0xFFFFFFF2 |
|---|---|---|---|
| | | 1 | 0x1149 |
| | | 2 | 0xFFFFFFF2 |
| | | 3 | 0x114ac |
| Sub-Array Base index= 4 | Index | 0 | 0xFFFFFFF2 |
| | | 1 | 0x114c5 |
| | | 2 | 0xFFFFFFF2 |
| | | 3 | 0x116c4 |
| | | 4 | 0x115c0 |
| | | 5 | 0xFFFFFFF2 |
| | | 6 | 0xFFFFFFF2 |
| | | 7 | 0xFFFFFFF2 |

Encoded 24-bit address

PANDA code STOP_UNKNOWN_PROTO

FIG. 22

| | | | | |
|---|---|---|---|---|
| p0 | ObjRef | p0 | pobjref | |
| p1 | CurHdr | p1 | pcurhdr | |
| p2 | DataHdr | p2 | pdathdr | |
| p3 | PktLen | p3 | ppktlen | Mapped to |
| p4 | FrameOffFnumSeqno | p4 | pfofnsq | panda_sdpu_thread_work_item |
| p5 | PktInfo | p5 | ppktinf | structure |
| p6 | NodeLoopCnt | p6 | pndlcnt | |
| p7 | Counters | p7 | pcount | |
| p8 | PktHdrBase | p8 | phdrbas | |
| p9 | MetadataBase | p9 | pmdbase | |
| p10 | ParserInstrBase | p10 | pinsbas | |
| p11 | Next | p11 | pnext | |
| p12 | PendingWork | p12 | ppendwk | |
| p13 | DataBoundLoop | p13 | pdbndlp | |
| p14 | ParserExitCode | p14 | pexcode | |
| p15 | Accum | p15 | paccum | |
| p16 | Flags | p16 | pflags | |
| p17 | ParserConfig | p17 | pconfig | |
| p18 | CounterLimitsConfig | p18 | pcntlim | |
| p19 | CounterArrayConfig | p19 | pctarcf | |
| p20 | ParserConfig | p20 | pconfig | |
| p21 | LoopSpec | p21 | ploopsp | |
| p22 | TLVSpec | p22 | ptlvsp | |
| p23 | OkayTarget | p23 | pokay | |
| p24 | FailTarget | p24 | pfail | |
| p25 | Wildcard | p25 | pwild | |
| p26 | AltWildcard | p26 | paltwild | |
| p27 | AtEncap | p27 | patenc | |
| p28 | PostLoop | p28 | ppostlp | |
| p29 | CompFalse | p29 | pcmpfal | |
| p30 | DataExtractBase | p30 | pdexbas | |
| p31 | Timestamp | p31 | ptimstp | |

FIG. 23

6.1. Register sub-fields

| REG | NAME | ASSEM | SUB-FIELDS |
|---|---|---|---|
| p0 | ObjectRef | pobjref | |
| p1 | CurHdr | pcurhdr | Offset, Length |
| p2 | DataHdr | pdathdr | Offset, Length |
| p3 | PktLen | ppktlen | AllLen, ParseLen, F,P |
| p4 | FrameOffFnumSeqno | pfofnsq | FrameOffset, FuncNum, Seqno |
| p5 | PktInfo | ppktinf | PktCtx, Checksum, NextWorkItem, IFID, L, N, D |
| p6 | NodeLoopCnt | pndlcnt | NumLoops, NonPadCnt, PadLen, ConPad, NodeCnt |
| p7 | Counters | pcount | Encap, Cntr1, Cntr2, Cntr3, Cntr4, Cntr5, Cntr6, Cntr7 |
| p8 | PktHdrBase | phdrbas | |
| p9 | MetadataBase | pmdbase | |
| p10 | ParserInstrBase | pinsbase | |
| p11 | Next | pnext | |
| p12 | PendingWork | ppendwk | PendingWork |
| p13 | DataBoundLoop | pdbndlp | DataBound, Loop |
| p14 | ParserExitCode | pexcode | Address, Error |
| p15 | Accum | paccum | |
| p16 | Flags | pflags | |
| p17 | ParserConfig | pconfig | MaxNodes, MaxEncap, MaxFrames, FrameSize, FrameOffset, EE, EO, NumPFuncs, PrsBuff, |
| p18 | CounterLimitsConfig | pcntlim | E1, E2, E3, E4, E5, E6, E7, Cntr1, Cntr2, Cntr3, Cntr4, Cntr5, Cntr6, Cntr7 |
| p19 | CounterArrayConfig | pctarcf | O1, O2, O3, O4, O5, O6, O7, Cntr1, Cntr2, Cntr3, Cntr4, Cntr5, Cntr6, Cntr7 |
| p20 | CounterArraySzResEncConfig | pctarsz | R1, R2, R3, R4, R5, R6, R7, Cntr1, Cntr2, Cntr3, Cntr4, Cntr5, Cntr6, Cntr7 |
| p21 | LoopSpec | ploopsp | MaxCnt, MaxNon, MaxPlen, MaxCPad, Disp, E |
| p22 | TLVSpec | ptlvsp | IgnVal, IgnMask, PAD1, PADN, EOL, Disp, P, N, E |
| p23 | OkayTarget | pokay | |
| p24 | FailTarget | pfail | |
| p25 | Wildcard | pwild | |
| p26 | AltWildcard | palwild | |
| p27 | AtEncapt | patenc | |
| p28 | PostLoop | ppostlp | |
| p29 | CompFalset | pcmpfal | |
| p30 | DataExtractBase | pdexbas | , |
| p31 | Timestamp | ptimstp | |

FIG. 24

Address encoded in next node (64 bits)
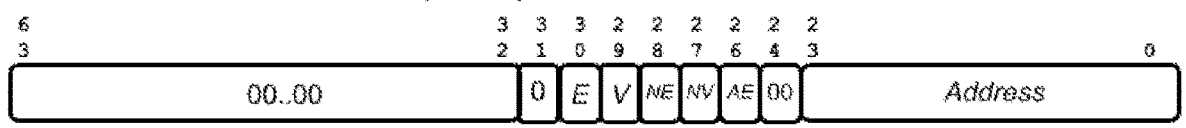
Code in next node (64 bits)
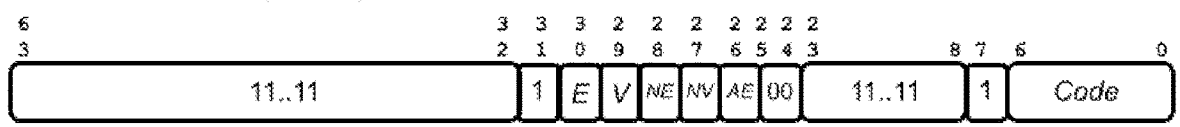
Address encoded in next node (32 bits)
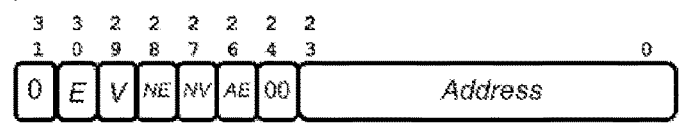
Code in next node (32 bits)
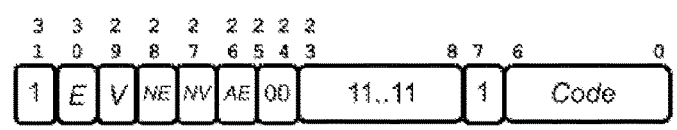
FIG. 25

| 6 3 | | 4 4 8 7 | 4 3 0 9 | 3 3 2 1 | | 1 1 6 5 | 0 |
|---|---|---|---|---|---|---|---|
| | NodeCnt | | ConPad | PadLen | NonPadCnt | | NumLoops |

FIG. 31

|  63 | 00..00 | 16 15 | PendingWork | 0 |

FIG. 33

| 6 | | 5 5 | | 4 4 | | 4 3 | | 3 3 | | 2 2 | | 1 1 | | 8 7 6 5 4 3 2 1 0 |
|---|---|---|---|---|---|---|---|---|---|---|---|---|---|---|
| 3 | | 6 5 | | 8 7 | | 0 9 | | 2 1 | | 4 3 | | 6 5 | | |

| Cntr7 | Cntr6 | Cntr5 | Cntr4 | Cntr3 | Cntr2 | Cntr1 | O7 O6 O5 O4 O3 O2 O1 0 |

FIG. 38

| 6  |    | 5 5 |    | 4 4 |    | 4 3 |    | 3 3 |    | 2 2 |    | 1 1 |    |   |   |   |   |   |   |   |   |
|----|----|-----|----|-----|----|-----|----|-----|----|-----|----|-----|----|---|---|---|---|---|---|---|---|
| 3  |    | 6 5 |    | 8 7 |    | 0 9 |    | 2 1 |    | 4 3 |    | 6 5 |    | 8 | 7 |   |   |   |   |   | 0 |

| Cntr7 | Cntr6 | Cntr5 | Cntr4 | Cntr3 | Cntr2 | Cntr1 | R7 | R6 | R5 | R4 | R3 | R2 | R1 | 0 |

FIG. 39

6.4. Register initialization

| REG | NAME | Initialized at | Default initial value |
|---|---|---|---|
| p0 | ObjectRef | Start parsing a packet | Set to object reference in work item from cluster front end |
| p1 | CurHdr | Start parsing a packet | Zero |
| p2 | DataHdr | Start parsing a packet | Zero |
| p3 | PktLen | Start parsing a packet | AllLen from dispatcher message, ParseLen is minimum of packet length and (ParserConfig.PrsBuff + 1) *64. F and P are to to one |
| p4 | FrameOffSeqno | Start parsing a packet | Seqno from work item, FrameOff to zero, FuncNum not initialized |
| p5 | PktInfo | Start parsing a packet | PktCtx and Checksum from work item |
| p6 | NodeLoopCnt | Start parsing a packet | 0 |
| p7 | Counters | Start parsing a packet | 0 |
| p8 | PktHdrBase | Start parsing a packet | Derived from packet context in work item from cluster front end |
| p9 | MetadataBase | Start parsing a packet | Derived from packet context in work item from cluster front end |
| p10 | ParserInstrBase | One time initialization | Initialize to 0xFFFF |
| p11 | Next | Start parsing a packet | Initialize to STOP_OKAY |
| p12 | PendingWork | Start parsing a packet | PendingWork to 0xFFFF |
| p13 | DataBndLoop | Start parsing a packet | DataBound to 0xFFFFFFFF, Loop to OKAY_RET |
| p14 | ParserExitCode | No initialization | — |
| p15 | Accum | No initialization | — |
| p16 | Flags | No initialization | — |
| p17 | ParserConfig | One time initialization | Set appropriately |
| p18 | CounterLimitsConfig | One time initialization | Set appropriately |
| p19 | CounterArrayConfig | One time initialization | Set appropriately |
| p20 | CounterArraySzResEncConfig | One time initialization | Set appropriately |
| p21 | LoopSpec | Per use case | Set for each loop (if only one loop then set once) |
| p22 | TLVSpec | Per use case | Set for each TLV loop (if only one loop then set once) |
| p23 | OkayTarget | One time initialization | Set once, unless multiple parsers with different okay target |
| p24 | FinalTarget | One time initialization | Set once, unless multiple parsers with different fail targets |
| p25 | Wildcard | Per CAM use initialization | Set for each CAM invocation unless wildcard is always the same |
| p26 | AltWildcard | Per CAM use initialization | Set for each CAM invocation unless wildcard is always the same |
| p27 | AtEncap | One time initialization | Set once, unless multiple parsers with different atencap targets |
| p28 | PostLoop | Per loop initialization | Set for each loop if target is changes |
| p29 | CompFlase | Per compare use case | Set for each compare case unless target doesn't change |
| p30 | DataExtractBase | Ont time initialization | Set once, unless parsers need different sets of pseudo instructions |
| p31 | TimeStamp | Start parsing a packet | Set from timestamp in work item from cluster front end |

FIG. 42

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| C | S | I | R | Rs ||||| Func3 ||| Rd ||||| Opcode ||||||| |
| 000 ||| Cpreg ||||| 0 | 0 | 0 | 0 | 00000 ||||| 000 ||| Rd ||||| 1111011 ||||||| CPPRSRD |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| C | S | I | R | Rs ||||| Func3 ||| Rd ||||| Opcode ||||||| |
| 000 ||| 00000 ||||| 0 | 0 | 0 | 1 | Rs ||||| 000 ||| Rd ||||| 1111011 ||||||| CPRSRDCAM |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| C | S | I | R | Rs ||||| Func3 ||| Rd ||||| Opcode ||||||| |
| 000 ||| 00000 ||||| 0 | 1 | 0 | 1 | Rs ||||| 000 ||| Rd ||||| 1111011 ||||||| CPRSRDARRAY |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| C | S | I | R | Rs ||||| Func3 ||| Rd ||||| Opcode ||||||| |
| 000 ||| Cpreg ||||| 0 | 0 | 0 | 0 | Rs ||||| 001 ||| 00000 ||||| 1111011 ||||||| CPPRSWR |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| D | S | I | R | Rs ||||| Func3 ||| Rd ||||| Opcode ||||||| |
| 000 ||| Cpreg ||||| D | 0 | 0 | 1 | Rs ||||| 001 ||| 00000 ||||| 1111011 ||||||| CPPRSWRCAM |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| D | S | I | R | Rs ||||| Func3 ||| Rd ||||| Opcode ||||||| |
| 000 ||| Cpreg ||||| D | 1 | 0 | 1 | Rs ||||| 001 ||| 00000 ||||| 1111011 ||||||| CPPRSWRARRAY |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| CoP ||| Cpreg ||||| C | S | I | Imm2 |||||| Func3 ||| Imm1 ||||| Opcode ||||||| |
| 000 ||| Cpreg ||||| 0 | 0 | 1 | Imm2 |||||| 001 ||| Imm1 ||||| 1111011 ||||||| CPPRSWRIMM |

FIG. 43

| CPPRSRD | prs.mv.x.p <ireg>,<preg> |
|---|---|
| CPPRSWR | prs.mv.p.x <preg>,<ireg> |
| CPPRSRDIMM | prs.ld.immed <preg>,<imm> |
| CPPRSWRCAM (D is zero) | prs.cam.write <ireg>,<preg> |
| CPPRSWRCAM (D is one) | prs.cam.delete <ireg> |
| CPPRSRDCAM | prs.cam.read <ireg>,<ireg> |
| CPPRSWRARRAY (D is zero) | prs.array.write <ireg>,<preg> |
| CPPRSWRARRAY (D is one) | prs.array.delete <ireg> |
| CPPRSRDARRAY | prs.array.read <ireg>,<ireg> |

FIG. 44

| Name | SW | 8-bit | Description |
|---|---|---|---|
| OKAY | 0 | -- | Processing succeeded, or no code (default for Loop) |
| OKAY_RET | -1 | 0xFF | Negative equivalent of OKAY (default for Loop) |
| OKAY_USE_WILD | -2 | 0xFE | Use wildcard return code from CAM |
| OKAY_USE_ALT_WILD | -3 | 0xFD | Use alternate wildcard return code from CAM |
| STOP_OKAY | -4 | 0xFC | Parser exited normally |
| STOP_NODE_OKAY | -5 | 0xFD | Stop current node, proceed to next node |
| STOP_SUB_NODE_OKAY | -6 | 0xFE | Stop current loop iteration, proceed to post loop |
| STOP_FAIL | -13 | 0xF3 | General failure code |
| STOP_LENGTH | -14 | 0xF2 | Length underrun |
| STOP_UNKNOWN_PROTO | -15 | 0xF1 | Unknown protocol encountered |
| STOP_ENCAP_DEPTH | -16 | 0xF0 | Maximum number of encapsulations exceeded |
| STOP_UNKNOWN_TLV | -17 | 0xEF | Unknown TLV encountered |
| STOP_TLV_LENGTH | -18 | 0xEE | TLV length underrun |
| STOP_BAD_FLAG | -19 | 0xED | Bad flag encountered |
| STOP_FAIL_CMP | -20 | 0xEC | Compare instruction fail |
| STOP_LOOP_CNT | -21 | 0xEB | Max number nodes is exceeded |
| STOP_PADDING_LIMIT | -22 | 0xEA | Padding limit exceeded |
| STOP_OPTION_LIMIT | -23 | 0xE9 | Max number of non-padding options exceeded |
| STOP_MAX_NODES | -24 | 0xE8 | Max number of loop iterations exceeded |
| STOP_COMPARE | -25 | 0xE7 | Compare test failed |
| STOP_CNTR1 | -26 | 0xE6 | Counter #1 limit exceeded |
| STOP_CNTR2 | -27 | 0xE5 | Counter #2 limit exceeded |
| STOP_CNTR3 | -28 | 0xE4 | Counter #3 limit exceeded |
| STOP_CNTR4 | -29 | 0xE3 | Counter #4 limit exceeded |
| STOP_CNTR5 | -30 | 0xE2 | Counter #5 limit exceeded |
| STOP_CNTR6 | -31 | 0xE1 | Counter #6 limit exceeded |
| STOP_CNTR7 | -32 | 0xE0 | Counter #7 limit exceeded |

FIG. 45

| func4 (decimal) | Func4 (binary) | Instruction(s) |
|---|---|---|
| 0 | 0000 | PLOAD,PLOADTLVLOOP,PTLVFASTLOOP |
| 1 | 0001 | PFLAGSLOOP |
| 2 | 0010 | PLENCUR,PLENDATA,PLENDATABND |
| 3 | 0011 | PLENDATATLV,PLENDATAPAD,PLENDATAEOL |
| 4 | 0100 | PSTORE |
| 5 | 0101 | PSTOREREG |
| 6 | 0110 | PSTOREIMM |
| 7 | 0111 | PEXTRACT,PLOOP,PINCCNTR,PSETCNTRBIT, PRESETCNTR |
| 8 | 1000 | PCAM,PCAMNEXT,PCAMJUMP,PCAMJUMPLOOP,PCAMJUMPTLVLOOP |
| 9 | 1001 | PARR,PARRNEXT,PARRJUMP,PARRJUMPLOOP |
| 10 | 1010 | PNEXTNODE,PSETIMM,PSETCODE,PSTP, PVARINT,PANDMASK |
| 11 | 1011 | PCMPILTB,PCMPILTB,PCMPIGTB,PCMPIGTEB |
| 12 | 1100 | PCMPIH |
| 13 | 1101 | PCMPIB |
| 14 | 1110 | PCMPNEIB |
| 15 | 1111 | PRUNTHREAD,PINITPARSER,PEVENTLOOP, PEVENTLOOPEND,PDATAEXTRACT |

FIG. 46

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| X | D | Sz | | | | Blen | | | Shift | | E | | | | Offset | | | | | | | Fnc4 | | | | Opcode | | | | | | |
| X | 0 | Sz | | | | Blen | | | Shift | | E | | | | Offset | | | | | | | 0000 | | | | 0001011 | | | | | | | PLOAD |
| 0 | 1 | Sz | | | | Blen | | | Shift | | E | | | | Offset | | | | | | | 0000 | | | | 0001011 | | | | | | | PLOADTLVLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| X | D | | | Rsvd | | | | | Shift | | F2 | | | | Len | | | | | | | Fnc4 | | | | Opcode | | | | | | |
| 1 | 1 | | | 000000 | | | | | Shift | | 0 | | | | Len | | | | | | | 0000 | | | | 0001011 | | | | | | | PTLVFASTLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Pos | | | SZ | | R | | | | | | | Mask | | | | | | | | | | fnc4 | | | | opcode | | | | | | |
| Pos | | | Sz | | R | | | | | | | Mask | | | | | | | | | | 0001 | | | | 0001011 | | | | | | | PFLAGSLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | F | Sz | | | Pos | | | J | Sind | | | | | | Offset | | | | | | | Fnc4 | | | | Opcode | | | | | | |
| S | F | Sz | | | Pos | | | J | Sind | | | | | | Offset | | | | | | | 0100 | | | | 0001011 | | | | | | | PSTORE |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | F | Sz | | | Reg | | | | Pos | | | | | | Offset | | | | | | | Fnc4 | | | | Opcode | | | | | | |
| S | F | Sz | | | Reg | | | | Pos | | | | | | Offset | | | | | | | 0101 | | | | 0001011 | | | | | | | PSTOREREG |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | F | Sz | | | | Value | | | | | | | | | Offset | | | | | | | Func4 | | | | Opcode | | | | | | |
| S | F | Sz | | | | Value | | | | | | | | | Offset | | | | | | | 0110 | | | | 0001011 | | | | | | | PSTOREIMM |

FIG. 47

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | Pos | | | Shift | | F2 | | | Len | | | | | Fnc4 | | | | Opcode | | | | | | | | | | | |
| S | D | Sz | | Pos | | | Shift | | 00 | | | Len | | | | | 0010 | | | | 0001011 | | | | | | | | | | | PLENCUR |
| S | D | Sz | | Pos | | | Shift | | 01 | | | Len | | | | | 0010 | | | | 0001011 | | | | | | | | | | | PLENDATA |
| S | 0 | Sz | | Pos | | | Shift | | 10 | | | Len | | | | | 0010 | | | | 0001011 | | | | | | | | | | | PLENDATABND |
| S | D | Sz | | Pos | | | Shift | | 00 | | | Len | | | | | 0011 | | | | 0001011 | | | | | | | | | | | PLENDATATLV |
| S | D | Sz | | Pos | | | Shift | | 01 | | | Len | | | | | 0011 | | | | 0001011 | | | | | | | | | | | PLENDATAPAD |
| S | D | Sz | | Pos | | | Shift | | 10 | | | Len | | | | | 0011 | | | | 0001011 | | | | | | | | | | | PLENDATAEOL |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | V | Pos | | A | | | Next | | | | | | | | | | | | | | fnc4 | | | | opcode | | | | | | | |
| S | V | 00 | | 0 | | | Next | | | | | | | | | | | | | | 1010 | | | | 0001011 | | | | | | | PNEXTNODE |
| S | V | 01 | | 0 | | | Imm | | | | | | | | | | | | | | 1010 | | | | 0001011 | | | | | | | PSETIMM |
| S | 0 | 10 | | 0 | | | Imm | | | | | | | | | | | | | | 1010 | | | | 0001011 | | | | | | | PSETCODE |
| 1 | 1 | 10 | | 0 | | | 00..00 | | | | | | | | | | | | | | 1010 | | | | 0001011 | | | | | | | PSTP |
| S | V | 11 | | 0 | | | 00..00 | | | | | | | | | | | | | | 1010 | | | | 0001011 | | | | | | | PVARINT |
| S | V | Pos | | 1 | | | Mask | | | | | | | | | | | | | | 1010 | | | | 0001011 | | | | | | | PANDMASK |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | V | Fun | | | Preg | | | | BitPos | | | | | BitLength | | | | | | | fnc4 | | | | opcode | | | | | | | |
| S | V | 00 | | | Preg | | | | BitPos | | | | | BitLength | | | | | | | 0111 | | | | 0001011 | | | | | | | PEXTRACT |
| S | 0 | 01 | | | 00000 | | | | 000000 | | | | | 000000 | | | | | | | 0111 | | | | 0001011 | | | | | | | PLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | V | Fun | | | Cntr | | | | Val0 | | F | Bnum | | | Reserved | | | | | | fnc4 | | | | opcode | | | | | | | |
| S | 0 | 10 | | | Cntr | | | | Val0 | | F | 000 | | | 000000 | | | | | | 0111 | | | | 0001011 | | | | | | | PINCCNTR |
| S | 1 | 10 | | | Cntr | | | | Val0 | | F | Bnum | | | 000000 | | | | | | 0111 | | | | 0001011 | | | | | | | PSETCNTRBIT |

FIG. 47 (cont)

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | 0 | 11 | | Cntr | | | | | ValO | | F | 000 | | | 000000 | | | | | | | 0111 | | | 0001011 | | | | | | | | PRESETCNTR |

FIG. 47 (cont)

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | | | | Pos | | | | Func3 | | | F | Share | | | | | Miss | | | | Fnc4 | | | | Opcode | | | | |
| S | 0 | Sz | | | | | Pos | | | | 000 | | | F | Share | | | | | Miss | | | | 1000 | | | | 0001011 | | | | PCAM |
| S | 1 | Sz | | | | | Pos | | | | 000 | | | F | Share | | | | | Miss | | | | 1000 | | | | 0001011 | | | | PCAMNEXT |
| S | 0 | Sz | | | | | Pos | | | | 001 | | | F | Share | | | | | Miss | | | | 1000 | | | | 0001011 | | | | PCAMJUMP |
| S | 0 | Sz | | | | | Pos | | | | 010 | | | F | Share | | | | | Miss | | | | 1000 | | | | 0001011 | | | | PCAMJUMPLOOP |
| S | 0 | Sz | | | | | Pos | | | | 011 | | | F | Share | | | | | Miss | | | | 1000 | | | | 0001011 | | | | PCAMJUMPTLVLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | | | | Pos | | | | Func3 | | | F | Base | | | | | | | | | Fnc4 | | | | Opcode | | | | |
| S | 0 | Sz | | | | | Pos | | | | 000 | | | F | Base | | | | | | | | | 1001 | | | | 0001011 | | | | PARR |
| S | 1 | Sz | | | | | Pos | | | | 000 | | | F | Base | | | | | | | | | 1001 | | | | 0001011 | | | | PARRNEXT |
| S | 0 | Sz | | | | | Pos | | | | 001 | | | F | Base | | | | | | | | | 1001 | | | | 0001011 | | | | PARRJUMP |
| S | 0 | Sz | | | | | Pos | | | | 010 | | | F | Base | | | | | | | | | 1001 | | | | 0001011 | | | | PARRJUMPLOOP |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Er | | Pos | | | | N | Value | | | | | | | | | | | | | | | | | Func4 | | | | Opcode | | | | |
| Er | | Pos | | | | N | Value | | | | | | | | | | | | | | | | | 1100 | | | | 0001011 | | | | PCMPIH |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Er | | Pos | | | | | Value | | | | | | | Mask | | | | | | | | | | Func4 | | | | Opcode | | | | |
| Er | | Pos | | | | | Value | | | | | | | Mask | | | | | | | | | | 1101 | | | | 0001011 | | | | PCMPIB |
| Er | | Pos | | | | | Value | | | | | | | Mask | | | | | | | | | | 1110 | | | | 0001011 | | | | PCMPINEB |

FIG. 47 (cont)

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | Pos | | Func3 | | | Er | | | Value | | | | | | | | Fnc4 | | | | Opcode | | | | | | | | |
| S | 0 | Sz | | Pos | | 000 | | | Er | | | Value | | | | | | | | 1011 | | | | 0001011 | | | | | | | | PCMPILTB |
| S | 0 | Sz | | Pos | | 001 | | | Er | | | Value | | | | | | | | 1011 | | | | 0001011 | | | | | | | | PCMPILTEB |
| S | 0 | Sz | | Pos | | 010 | | | Er | | | Value | | | | | | | | 1011 | | | | 0001011 | | | | | | | | PCMPIGTB |
| S | 0 | Sz | | Pos | | 011 | | | Er | | | Value | | | | | | | | 1011 | | | | 0001011 | | | | | | | | PCMPIGTEB |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | F2 | | N | | FuncNum | | | | | | | | | | | | | | Func4 | | | | Opcode | | | | | | | | |
| S | 0 | 00 | | 0 | | FuncNum | | | | | | | | | | | | | | 1111 | | | | 0001011 | | | | | | | | PRUNTHREAD |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Rv | | F2 | | Rsvd | | | | | | | | | | | | | | | | Func4 | | | | Opcode | | | | | | | | |
| 00 | | 01 | | 00..00 | | | | | | | | | | | | | | | | 1111 | | | | 0001011 | | | | | | | | PINITPARSER |
| 00 | | 10 | | 00..00 | | | | | | | | | | | | | | | | 1111 | | | | 0001011 | | | | | | | | PEVENTLOOP |
| 01 | | 10 | | 00..00 | | | | | | | | | | | | | | | | 1111 | | | | 0001011 | | | | | | | | PEVENTLOOPEND |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | F2 | | InsIndex | | | | | | | | | | InsNum | | | | | | Func4 | | | | Opcode | | | | | | | | |
| S | 0 | 11 | | InsIndex | | | | | | | | | | InsNum | | | | | | 1111 | | | | 0001011 | | | | | | | | PDATAEXTRACT |

FIG. 47 (cont)

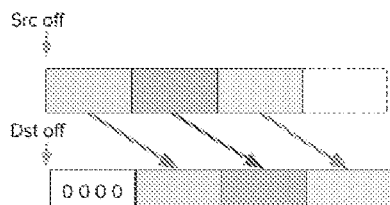
Odd length, even offset, no endian swap
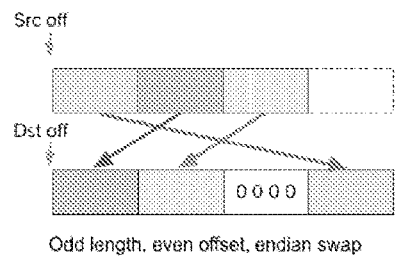
Odd length, even offset, endian swap
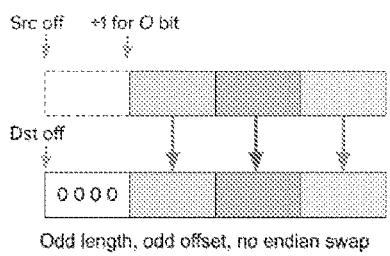
Odd length, odd offset, no endian swap
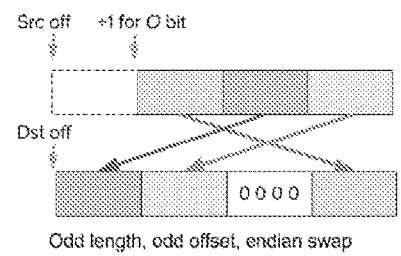
Odd length, odd offset, endian swap
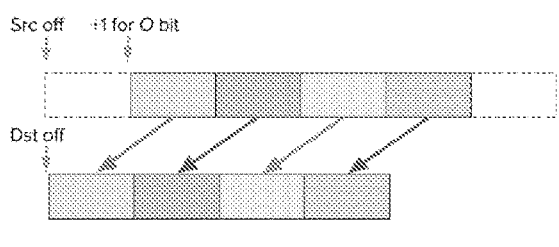
Even length, odd offset, no endian swap
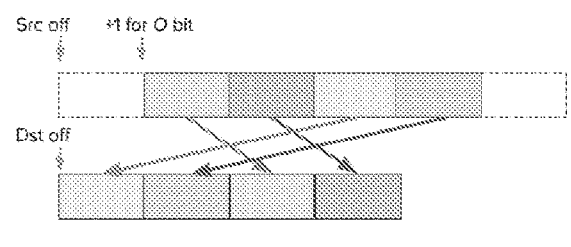
Even length, odd offset, endian swap
FIG. 48

| Assembly name | Description | Instructions used with |
|---|---|---|
| pcurptr | Indicates pointer to current header. The actual pointer is PktHdrBase + CurHdr.Offset | **prs.load\*, prs.loadmb\*** |
| pdatptr | Indicates pointer to current header. The actual pointer is PktHdrBase + DatHdr.Offset | **prs.load\*, prs.loadmb\*, prs.loadtlvloop\*, prs.loadtlvloopmb\*, prs.tlvfastloop** |
| pframe | Indicates pointer to current header. The actual pointer is **MetadataBase + 4 \* FrameOffFnumSeqno.FrameOffset** | **prs.store\*, prs.storereg\*, prs.storei\*** |
| pdatbnd | Refers to the data bound (i.e DataBndLoop.DataBound) | **prs.lenset\*, prs.lensetadd\*, prs.lensetmin\*** |
| cntr1, cntr2, cntr3, cntr4, cntr5, cntr6, cntr7 | Indicates counter to be used as an array index in a store instructions | **prs.store\*, prs.storereg\*** |

FIG. 49

| 3 3 | 2 2 2 2 2 2 2 2 2 2 | 1 1 1 1 1 1 1 1 1 1 | 9 8 7 6 5 4 3 2 1 0 | | |
|---|---|---|---|---|---|
| 1 0 | 9 8 7 6 5 4 3 2 1 0 | 9 8 7 6 5 4 3 2 1 0 | | | |
| X D | Sz | Blen | Shift | E | Offset | Fnc4 | Opcode | |
| X 0 | Sz | Blen | Shift | E | Offset | 0000 | 0001011 | PLOAD |
| 0 1 | Sz | Blen | Shift | E | Offset | 0000 | 0001011 | PLOADTLVLOOP |

FIG. 50

| | |
|---|---|
| *PLOAD*, source is packet offset (*X*=0, *Blen*=0, *Shift*=0) | prs.load{.swp} paccum,pcurptr+<offset><br>prs.load.b paccum,pcurptr+<offset><br>prs.load.[hw]{.swp} paccum,pcurptr+<offset> |
| *PLOAD*, source is packet offset (*X*=0) | prs.loadmb{.swp} paccum,pcurptr+<offset>,<shift>{:<blen>}<br>prs.loadmb.b paccum,pcurptr+<offset>,<shift>{:<blen>}<br>prs.loadmb.[hw]{.swp} paccum,pcurptr+<offset>,<shift>{:<blen>} |
| *PLOAD*, source is data offset (*X*=1, *Blen*=0, *Shift*=0) | prs.load{.swp} paccum,pdatptr+<offset><br>prs.load.b paccum,pdatptr+<offset><br>prs.load.[hw]{.swp} paccum,pdatptr+<offset> |
| *PLOAD*, source is data offset (*X*=1) | prs.loadmb{.swp} paccum,pdatptr+<offset>,<shift>{:<blen>}<br>prs.loadmb.b paccum,pdatptr+<offset>,<shift>{:<blen>}<br>prs.loadmb.[hw]{.swp} paccum,pdatptr+<offset>,<mult>{:<blen>} |
| *PLOADTLVLOOP* (*Blen*=0, *Shift*=0) | prs.loadtlvloop{.swp} paccum,pdatptr+<offset><br>prs.loadtlvloop.b paccum,pdatptr+<offset><br>prs.loadtlvloop.[hw]{.swp} paccum,pdatptr+<offset> |
| *PLOADTLVLOOP* | prs.loadtlvloopmb{.swp} paccum,pdatptr+<offset>,<shift>{:<blen>}<br>prs.loadtlvloopmb.b paccum,pdatptr+<offset>,<shift>{:<blen>}<br>prs.loadtlvloopmb.[hw]{.swp} paccum,pdatptr+<offset>,<shift>{:<blen>} |

FIG. 51

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Pos | | | SZ | | R | Mask | | | | | | | | | | | | | | | | fnc4 | | | | opcode | | | | | | |
| Pos | | | Sz | | R | Mask | | | | | | | | | | | | | | | | 0001 | | | | 0001011 | | | | | | PFLAGSLOOP |

FIG. 52

| | |
|---|---|
| *PFLAGSLOOP* | prs.flagsloop{.rev} pflags,paccum,paccum<br>prs.flagsloop.[nbhw]{.rev} pflags,paccum,paccum{[<pos>]}<br>prs.flagsloopm{.rev} pflags,paccum,paccum, <mask><br>prs.flagsloopm.[nbhw]{.rev} pflags,paccum,paccum{[<pos>]},<mask> |

FIG. 53

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| X | D | Rsvd | | | | | | Shift | | | | F2 | Len | | | | | | | | | Fnc4 | | | | Opcode | | | | | | |
| 1 | 1 | 000000 | | | | | | Shift | | | | 0 | Len | | | | | | | | | 0000 | | | | 0001011 | | | | | | | PTLVFASTLOOP |

| PTLVFASTLOOP (Shift=0) | prs.tlvfastloop pdathdr,pdatptr,<len> |
|---|---|
| PTLVFASTLOOP | prs.tlvfastloop pdathdr,pdatptr,<mult>:<len> |

FIG. 54

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | F | Sz | | | Pos | | | J | Sind | | | | Offset | | | | | | | | Fnc4 | | | | Opcode | | | | | | | |
| S | F | Sz | | | Pos | | | J | Sind | | | | Offset | | | | | | | | 0100 | | | | 0001011 | | | | | | | PSTORE |

FIG. 55

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | F | Sz | | | Reg | | | Pos | | | | Offset | | | | | | | | | | Fnc4 | | | | Opcode | | | | | | |
| S | F | Sz | | | Reg | | | Pos | | | | Offset | | | | | | | | | | 0101 | | | | 0001011 | | | | | | PSTOREREG |

FIG. 56

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | Value | | | | | | | | Offset | | | | | | | | Func4 | | | | Opcode | | | | | | | | |
| S | F | Sz | | Value | | | | | | | | Offset | | | | | | | | 0110 | | | | 0001011 | | | | | | | | PSTOREIMM |

FIG. 57

| | |
|---|---|
| *PSTORE* (*D*=0, *J*=0, *Si*=0) | prs.store.b{.stp} pframe+<offset>,paccum{[<pos>]}<br>prs.store.[hw]{.stp} pframe+<offset>,paccum{[<pos>]}<br>prs.store{.stp} pframe+<offset>,paccum |
| *PSTORE* (*D*=1, *J*=0, *Si*=0) | prs.store.b{.stp} pmdbase+<offset>,paccum{[<pos>]}<br>prs.store.[hw]{.stp} pmdbase+<offset>,paccum{[<pos>]}<br>prs.store{.stp} pmdbase+<offset>,paccum |
| *PSTORE* (*D*=0, *J*=1, *Si*=0) | prs.store.b{.stp} pframe+<offset>,pflags{[<pos>]}<br>prs.store.[hw]{.stp} pframe+<offset>,pflags{[<pos>]}<br>prs.store{.stp} pframe+<offset>,pflags |
| *PSTORE* (*D*=1 *J*=1, *Si*=0) | prs.store.b{.stp} pmdbase+<offset>,pflags{[<pos>]}<br>prs.store.[hw]{.stp} pmdbase+<offset>,pflags{[<pos>]}<br>prs.store{.stp} pmdbase+<offset>,pflags |
| *PSTORE* (*D*=0, *J*=0, *Si* != 0) | prs.store.b{.stp} pframe+<offset>[cntr/1234567]],paccum{[<pos>]}<br>prs.store.[hw]{.stp}<br>    pframe+<offset>[cntr/1234567]],paccum{[<pos>]}<br>prs.store{.stp} pframe+<offset>[cntr/1234567]],paccum |
| *PSTORE* (*D*=1, *J*=0, *Si* != 0) | prs.store.b{.stp}<br>    pmdbase+<offset>[cntr/1234567]],paccum{[<pos>]}<br>prs.store.[hw]{.stp}<br>    pmdbase+<offset>[cntr/1234567]],paccum{[<pos>]}<br>prs.store{.stp} pmdbase+<offset>[cntr/1234567]],paccum |
| *PSTORE* (*D*=0, *J*=1, *Si* != 0) | prs.store.b{.stp} pframe+<offset>[cntr/1234567]],pflags{[<pos>]}<br>prs.store.[hw]{.stp}<br>    pframe+<offset>[cntr/1234567]],pflags{[<pos>]}<br>prs.store{.stp} pframe+<offset>[cntr/1234567]],pflags |
| *PSTORE* (*D*=1 *J*=1, *Si* != 0) | prs.store.b{.stp}<br>    pmdbase+<offset>[cntr/1234567]],pflags{[<pos>]}<br>prs.store.[hw]{.stp}<br>    pmdbase+<offset>[cntr/1234567]],pflags{[<pos>]}<br>prs.store{.stp} pmdbase+<offset>[cntr/1234567]],pflags |

FIG. 58

| PSTOREREG (D=0, Si=0) | prs.storereg.b{.stp} pframe+<offset>,<reg><br>prs.storereg.[hw]{.stp} pframe+<offset>,<reg><br>prs.storereg{.stp} pframe+<offset>,<reg> |
|---|---|
| PSTOREREG (D=1, Si=0) | prs.storereg.b{.stp} pmdbase+<offset>,<reg><br>prs.storereg.[hw]{.stp} pmdbase+<offset>,<reg><br>prs.storereg{.stp} pmdbase+<offset>,<reg> |
| PSTOREREG (D=0, Si != 0) | prs.storereg.b{.stp} pframe+<offset>[pparsct.cntr[123]],<reg><br>prs.storereg.[hw]{.stp} pframe+<offset>[cntr[1234567]],<reg><br>prs.storereg{.stp} pframe+<offset>[cntr[1234567]],<reg> |
| PSTOREREG (D=1, Si != 0) | prs.storereg.b{.stp} pmdbase+<offset>[cntr[1234567]],<reg><br>prs.storereg.[hw]{.stp} pmdbase+<offset>[cntr[1234567]],<reg><br>prs.storereg{.stp} pmdbase+<offset>[cntr[1234567]],<reg> |
| PSTOREIMM (D=0) | prs.storei{.stp} pframe+<offset>,<value><br>prs.storei.[bhw]{.stp} pframe+<offset>,<value> |
| PSTOREIMM (D=1) | prs.storei pmdbase+<offset>,<value><br>prs.storei.[bhw]{.stp} pmdbase+<offset>,<value> |

FIG. 58 (cont)

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | | Pos | | | Shift | | | F2 | | | | Len | | | | | | Fnc4 | | | | Opcode | | | | | | | |
| S | D | Sz | | | Pos | | | Shift | | | 00 | | | | Len | | | | | | 0010 | | | | 0001011 | | | | | | | PLENCUR |
| S | D | Sz | | | Pos | | | Shift | | | 01 | | | | Len | | | | | | 0010 | | | | 0001011 | | | | | | | PLENDATA |
| S | 0 | Sz | | | Pos | | | Shift | | | 10 | | | | Len | | | | | | 0010 | | | | 0001011 | | | | | | | PLENDATABND |
| S | D | Sz | | | Pos | | | Shift | | | 00 | | | | Len | | | | | | 0011 | | | | 0001011 | | | | | | | PLENDATATLV |
| S | D | Sz | | | Pos | | | Shift | | | 01 | | | | Len | | | | | | 0011 | | | | 0001011 | | | | | | | PLENDATAPAD |
| S | D | Sz | | | Pos | | | Shift | | | 10 | | | | Len | | | | | | 0011 | | | | 0001011 | | | | | | | PLENDATAEOL |

FIG. 59

| | |
|---|---|
| PLENCUR (Shift=7, D=0) | prs.lenset{.stp} pcurhdr,<len> |
| PLENCUR (Shift != 7, D=0) | prs.lensetadd.[nbhw]{.stp} pcurhdr,paccum{[<pos>]},{<mult>:}<len> |
| PLENCUR (Shift=0, Len=0, D=0) | prs.lenset.[nbhw]{.stp} pcurhdr,paccum{[<pos>]} |
| PLENCUR (D=1) | prs.lensetmin.[nbhw]{.stp} pcurhdr,paccum{[<pos>]},{<min_mult>:}<min_len> |
| PLENDATA (Shift=7, D=0) | prs.lenset{.stp} pdathdr,<len> |
| PLENDATA (Shift != 7, D=0) | prs.lensetadd.[nbhw]{.stp} pdathdr,paccum{[<pos>]},{<mult>:}<len> |
| PLENDATA (Shift=0, Len=0, D=0) | prs.lenset.[nbhw]{.stp} pdathdr,paccum{[<pos>]} |
| PLENDATA (D=1) | prs.lensetmin.[nbhw]{.stp} pdathdr,paccum{[<pos>]},{<min_mult>:}<min_len> |
| PLENDBND (Shift=7, D=0) | prs.lenset{.stp} pdatbnd,<len> |
| PLENDBND (Shift != 7, D=0) | prs.lensetadd.[nbhw]{.stp} pdatbnd,paccum{[<pos>]},{<mult>:}<len> |
| PLENDBND (Shift=0, Len=0, D=0) | prs.lenset.[nbhw]{.stp} pdatbnd,paccum{[<pos>]} |
| PLENDBND (D=1) | prs.lensetmin.[nbhw]{.stp} pdatbnd,paccum{[<pos>]},{<min_mult>:}<min_len> |
| PLENDATATLV (Shift=7, D=0) | prs.lensettlv{.stp} pdathdr,<len> |
| PLENDATATLV (Shift != 7, D=0) | prs.lensettlvadd.[nbhw]{.stp} pdathdr,paccum{[<pos>]},{<mult>:}<len> |

FIG. 60

| | |
|---|---|
| *PLENDATATLV*<br>(*Shift=0, Len=0,*<br>*D=0*) | prs.lensettlv.*[nbhw]{.stp}* pdathdr,paccum*{[<pos>]}* |
| *PLENDATATLV*<br>(*D=1*) | prs.lensettlvmin.*[nbhw]{.stp}*<br>    pdathdr,paccum*{[<pos>]},{<min_mult>:}<min_len>* |
| *PLENDATAPAD*<br>(*Shift=7, D=0*) | prs.lensetpad*{.stp}* pdathdr,*<len>* |
| *PLENDATAPAD*<br>(*Shift != 7, D=0*) | prs.lensetpadadd.*[nbhw]{.stp}* pdathdr,paccum*{[<pos>]},{<mult>:}<len>* |
| *PLENDATAPAD*<br>(*Shift=0, Len=0,*<br>*D=0*) | prs.lensetpad.*[nbhw]{.stp}* pdathdr,paccum*{[<pos>]}* |
| *PLENDATAPAD*<br>(*D=1*) | prs.lensetpadmin.*[nbhw]{.stp}*<br>    pdathdr,paccum*{[<pos>]},{<min_mult>:}<min_len>* |
| *PLENDATAEOL*<br>(*Shift=7, D=0*) | prs.lenseteol*{.stp}* pdathdr,*<len>* |
| *PLENDATAEOL*<br>(*Shift != 7, D=0*) | prs.lenseteoladd.*[nbhw]{.stp}* pdathdr,paccum*{[<pos>]},{<mult>:}<len>* |
| *PLENDATAEOL*<br>(*Shift=0, Len=0,*<br>*D=0*) | prs.lenseteol.*[nbhw]{.stp}* pdathdr,paccum*{[<pos>]}* |
| *PLENDATAEOL*<br>(*D=1*) | prs.lenseteolmin.*[nbhw]{.stp}*<br>    pdathdr,paccum*{[<pos>]},{<min_mult>:}<min_len>* |

FIG. 60 (cont)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | V | Pos | | A | | | | | | | | | Next | | | | | | | | | | | fnc4 | | | | opcode | | | | |
| S | V | 00 | | 0 | | | | | | | | | Next | | | | | | | | | | | 1010 | | | | 0001011 | | | | PNEXTNODE |
| S | V | 01 | | 0 | | | | | | | | | Imm | | | | | | | | | | | 1010 | | | | 0001011 | | | | PSETIMM |
| S | 0 | 10 | | 0 | | | | | | | | | Imm | | | | | | | | | | | 1010 | | | | 0001011 | | | | PSETCODE |
| 1 | 1 | 10 | | 0 | | | | | | | | | 00..00 | | | | | | | | | | | 1010 | | | | 0001011 | | | | PSTP |
| S | V | 11 | | 0 | | | | | | | | | 00..00 | | | | | | | | | | | 1010 | | | | 0001011 | | | | PVARINT |
| S | V | Pos | | 1 | | | | | | | | | Mask | | | | | | | | | | | 1010 | | | | 0001011 | | | | PANDMASK |

FIG. 61

| PNEXTNODE | prs.setaddr{.ov}{.stp} pnext,<reloc-address> |
|---|---|
| PSETIMM | prs.setimm{.stp} paccum,<imm><br>prs.setimm{.stp} pflags,<imm> |
| PSETCODE | prs.setcode{.stp} pnext,<imm> |
| PSTP | prs.stp |
| PVARINT | prs.varint{.alt}{.stp} paccum,paccum,pdatptr |
| PANDMASK | prs.andmask{.stp} paccum,paccum,<mask><br>prs.andmask{.stp} pflags,pflags,<mask> |

FIG. 62

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | V | Fun | | Preg | | | | BitPos | | | | BitLength | | | | | | fnc4 | | | | opcode | | | | | | | | | | |
| S | V | 00 | | Preg | | | | BitPos | | | | BitLength | | | | | | 0111 | | | | 0001011 | | | | | | | | | | PEXTRACT |
| S | 0 | 01 | | 00000 | | | | 000000 | | | | 000000 | | | | | | 0111 | | | | 0001011 | | | | | | | | | | PLOOP |

FIG. 63

| PEXTRACT (V = 0) | prs.extract{.stp} paccum,<preg>,<bit_pos>:<bit_len> |
|---|---|
| PEXTRACT (V = 1) | prs.extract{.stp} pflags,<preg>,<bit_pos>:<bit_len> |
| PLOOP | prs.loop ploop |

FIG. 64

| 3 3 | 2 2 | 2 2 2 2 2 2 | 2 2 2 | 1 1 1 | 1 1 1 1 1 1 | 9 8 7 | 6 5 4 3 2 1 0 | | |
|1 0|9 8|7 6 5 4 3 2|2 1 0|9 8 7|6 5 4 3 2 1|0| | | |
| S | V | Fun | Cntr | ValO | F | Bnum | Reserved | fnc4 | opcode | |
| S | 0 | 10 | Cntr | ValO | F | 000 | 000000 | 0111 | 0001011 | PINCCNTR |
| S | 1 | 10 | Cntr | ValO | F | Bnum | 000000 | 0111 | 0001011 | PSETCNTRBIT |
| S | 0 | 11 | Cntr | ValO | F | 000 | 000000 | 0111 | 0001011 | PRESETCNTR |

FIG. 65

| | |
|---|---|
| PRSINCCNTR<br>(*Counter* == 0,<br>encapsulation) | prs.inc{.stp} encap<br>prs.inc.preval{.stp} paccum,encap<br>prs.inc.preval{.stp} pflags,encap<br>prs.inc.postval{.stp} paccum,encap<br>prs.inc.postval{.stp} pflags,encap |
| PRSINCCNTR<br>(*Counter* == 1 to 5,<br>user defined counters) | prs.inc{.stp} cntr[1234567]<br>prs.inc.preval{.stp} paccum,cntr[1234567]<br>prs.inc.preval{.stp} pflags,cntr[1234567]<br>prs.inc.postval{.stp} paccum,cntr[1234567]<br>prs.inc.postval{.stp} pflags,cntr[1234567] |
| PRSSETCNTRBIT<br>(*Counter* == 1 to 5,<br>user defined counters) | prs.setflag{.stp} cntr[1234567],<bit-pos><br>prs.setflag.preval{.stp} paccum,cntr[12345],<bit-pos><br>prs.setflag.preval{.stp} pflags,cntr[12345],<bit-pos><br>prs.setflag.postval{.stp} paccum,cntr[12345],<bit-pos><br>prs.setflag.postval{.stp} pflags,cntr[12345],<bit-pos> |
| PRSRESETCNTR<br>(*Counter* == 1 to 5,<br>user defined counters) | prs.reset{.stp} cntr[12345]<br>prs.reset.preval{.stp} paccum,cntr[12345]<br>prs.reset.pretval{.stp} pflags,cntr[12345] |

FIG. 66

| 31 30 | 29 28 | 27 26 25 24 | 23 22 21 | 20 | 19 18 17 16 | 15 14 13 | 12 11 | 10 | 9 8 7 | 6 5 4 3 2 1 0 | |
|---|---|---|---|---|---|---|---|---|---|---|---|
| S D | Sz | Pos | Func3 | F | Share | Miss | | | Fnc4 | Opcode | |
| S 0 | Sz | Pos | 000 | F | Share | Miss | | | 1000 | 0001011 | PCAM |
| S 1 | Sz | Pos | 000 | F | Share | Miss | | | 1000 | 0001011 | PCAMNEXT |
| S 0 | Sz | Pos | 001 | F | Share | Miss | | | 1000 | 0001011 | PCAMJUMP |
| S 0 | Sz | Pos | 010 | F | Share | Miss | | | 1000 | 0001011 | PCAMJUMPLOOP |
| S 0 | 01 | 0000 | 011 | F | Share | Miss | | | 1000 | 0001011 | PCAMJUMPTLVLOOP |

FIG. 67

| | |
|---|---|
| PCAM<br>(Share != 0, F=0) | prs.cam.[nbh]{miss} paccum,paccum{[<pos>]},<share> |
| PCAM<br>(Share == 0, F=0) | prs.cam.[nbh]{miss} paccum,paccum{[<pos>]},pc |
| PCAM<br>(Share != 0, F=1) | prs.cam.[nbh]{miss} paccum,pflags{[<pos>]},<share> |
| PCAM<br>(Share == 0, F=1) | prs.cam.[nbh]{miss} paccum,pflags{[<pos>]},pc |
| PCAMNEXT<br>(Share != 0, F=0) | prs.cam.[nbh]{miss} pnext,paccum{[<pos>]},<share> |
| PCAMNEXT<br>(Share == 0, F=0) | prs.cam.[nbh]{miss} pnext,paccum{[<pos>]},pc |
| PCAMNEXT<br>(Share != 0, F=1) | prs.cam.[nbh]{miss} pnext,pflags{[<pos>]},<share> |
| PCAMNEXT<br>(Share == 0, F=1) | prs.cam.[nbh]{miss} pnext,pflags{[<pos>]},pc |
| PCAMJUMP<br>(Share != 0, F=0) | prs.camjump.[nbh]{miss} paccum{[<pos>]},<share> |
| PCAMJUMP<br>(Share == 0, F=0) | prs.camjump.[nbh]{miss} paccum{[<pos>]},pc |
| PCAMJUMP<br>(Share != 0, F=1) | prs.camjump.[nbh]{miss} pflags{[<pos>]},<share> |
| PCAMJUMP<br>(Share == 0, F=1) | prs.camjump.[nbh]{miss} pflags{[<pos>]},pc |
| PCAMJUMPLOOP<br>(Share != 0, F=0) | prs.camjumploop.[nbh]{miss} paccum{[<pos>]},<share> |
| PCAMJUMPLOOP<br>(Share == 0, F=0) | prs.camjumploop.[nbh]{miss} paccum{[<pos>]},pc |

FIG. 68

| | |
|---|---|
| *PCAMJUMPLOOP* (Share != 0, F=1) | prs.camjumploop.[nbh]{miss} pflags{[<pos>]},<share> |
| *PCAMJUMPLOOP* (Share == 0, F=1) | prs.camjumploop.[nbh]{miss} pflags{[<pos>]},pc |
| *PCAMJUMPTLVLOOP* (Share != 0, F=0) | prs.camjumptlvloop.[nbh]{miss} paccum{[<pos>]},<share> |
| *PCAMJUMPTLVLOOP* (Share == 0, F=0) | prs.camjumptlvloop.[nbh]{miss} paccum{[<pos>]},pc |
| *PCAMJUMPTLVLOOP* (Share != 0, F=1) | prs.camjumptlvloop.[nbh]{miss} pflags{[<pos>]},<share> |
| *PCAMJUMPTLVLOOP* (Share == 0, F=1) | prs.camjumptlvloop.[nbh]{miss} pflags{[<pos>]},pc |

FIG. 68 (cont)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | Sz | | Pos | | | | Func3 | | | F | Base | | | | | | | | | | Fnc4 | | | | Opcode | | | | | | |
| S | 0 | Sz | | Pos | | | | 000 | | | F | Base | | | | | | | | | | 1001 | | | | 0001011 | | | | | | PARR |
| S | 1 | Sz | | Pos | | | | 000 | | | F | Base | | | | | | | | | | 1001 | | | | 0001011 | | | | | | PARRNEXT |
| S | 0 | Sz | | Pos | | | | 001 | | | F | Base | | | | | | | | | | 1001 | | | | 0001011 | | | | | | PARRJUMP |
| S | 0 | Sz | | Pos | | | | 010 | | | F | Base | | | | | | | | | | 1001 | | | | 0001011 | | | | | | PARRJUMPLOOP |

FIG. 69

| PARR (F=0) | prs.arr.[nbh] paccum,paccum{[<pos>]},<base> |
|---|---|
| PARR (F=1) | prs.arr.[nbh] paccum,pflags{[<pos>]},<base> |
| PARRNEXT (F=0) | prs.arr.[nbh] pnext,paccum{[<pos>]},<base> |
| PARRNEXT (F=1) | prs.arr.[nbh] pnext,pflags{[<pos>]},<base> |
| PARRJUMP (F=0) | prs.arrjump.[nbh] paccum{[<pos>]},<base> |
| PARRJUMP (F=1) | prs.arrjump.[nbh] pflags{[<pos>]},<base> |
| PARRJUMPLOOP (F=0) | prs.arrjumploop.[nbh] paccum{[<pos>]},<base> |
| PCAMJUMPLOOP (F=1) | prs.arrjumploop.[nbh] pflags{[<pos>]},<base> |

FIG. 70

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| *Er* | | *Pos* | | *N* | *Value* | | | | | | | | | | | | | | | | | *Func4* | | | | *Opcode* | | | | | | |
| *Er* | | *Pos* | | *N* | *Value* | | | | | | | | | | | | | | | | | 1100 | | | | 0001011 | | | | | | *PCMPIH* |

FIG. 71

| PCMPIH (N=0) | prs.cmpi.h.stop paccum{[<pos>]},<value><br>prs.cmpi.h.stopsub paccum{[<pos>]},<value><br>prs.cmpi.h.fail paccum{[<pos>]},<value><br>prs.cmpi.h.cmpfail paccum{[<pos>]},<value> |
|---|---|
| PCMPIH (N=1) | prs.cmpnei.h.stop paccum{[<pos>]},<value><br>prs.cmpnei.h.stopsub paccum{[<pos>]},<value><br>prs.cmpnei.h.fail paccum{[<pos>]},<value><br>prs.cmpnei.h.cmpfail paccum{[<pos>]},<value> |

FIG. 72

| 3 3 | 2 2 | 2 2 2 | 2 2 2 2 2 2 | 1 1 1 1 1 1 1 1 1 1 | 9 8 7 | 6 5 4 3 2 1 0 | |
|1 0|9 8|7 6 5|4 3 2 1 0 9|8 7 6 5 4 3 2 1 0| | | |
| Er | Pos | Value | | Mask | Func4 | Opcode | |
| Er | Pos | Value | | Mask | 1101 | 0001011 | PCMPIB |
| Er | Pos | Value | | Mask | 1110 | 0001011 | PCMPINEB |

FIG. 73

| PCMPIB | prs.cmpi.h paccum{[<pos>]},<value>{,<mask>}<br>prs.cmpi.h.stop paccum{[<pos>]},<value>{,<mask>}<br>prs.cmpi.h.stopnode paccum{[<pos>]},<value>{,<mask>}<br>prs.cmpi.h.stopsub paccum{[<pos>]},<value>{,<mask>} |
|---|---|
| PCMPINEB | prs.cmpnei.h accum{[<pos>]},<value>{,<mask>}<br>prs.cmpnei.h.stop paccum{[<pos>]},<value>{,<mask>}<br>prs.cmpnei.h.stopnode paccum{[<pos>]},<value>{,<mask>}<br>prs.cmpnei.h.stopsub paccum{[<pos>]},<value>{,<mask>} |

FIG. 74

| 3 3 | 2 2 | 2 2 2 2 | 2 2 2 2 | 2 1 | 1 1 1 1 1 1 1 | 1 9 8 | 7 6 5 4 3 2 1 0 | | |
|---|---|---|---|---|---|---|---|---|---|
| 1 0 | 9 8 | 7 6 5 4 | 3 2 1 0 | 9 8 | 7 6 5 4 3 2 1 | 0 | | | |
| S D | Sz | Pos | Func3 | Er | Value | Fnc4 | Opcode | | |
| S 0 | Sz | Pos | 000 | Er | Value | 1011 | 0001011 | PCMPILTB |
| S 0 | Sz | Pos | 001 | Er | Value | 1011 | 0001011 | PCMPILTEB |
| S 0 | Sz | Pos | 010 | Er | Value | 1011 | 0001011 | PCMPIGTB |
| S 0 | Sz | Pos | 011 | Er | Value | 1011 | 0001011 | PCMPIGTEB |

FIG. 75

| PCMPILTB | prs.cmplti.[nbhw] accum{[<pos>]},<value><br>prs.cmplti.[nbhw].stop accum{[<pos>]},<value><br>prs.cmplti.[nbhw].stopnode accum{[<pos>]},<value><br>prs.cmplti.[nbhw].stopsub accum{[<pos>]},<value> |
|---|---|
| PCMPILTEB | prs.cmpleti.[nbhw] accum{[<pos>]},<value><br>prs.cmpltei.[nbhw].stopsub accum{[<pos>]},<value><br>prs.cmpltei.[nbhw].stopnode accum{[<pos>]},<value><br>prs.cmpltei.[nbhw].stopsub accum{[<pos>]},<value> |
| PCMPIGTB | prs.cmpgti.[nbhw] accum{[<pos>]},<value><br>prs.cmpgti.[nbhw].stop accum{[<pos>]},<value><br>prs.cmpgti.[nbhw].stopnode accum{[<pos>]},<value><br>prs.cmpgti.[nbhw].stopsub accum{[<pos>]},<value> |
| PCMPIGTEB | prs.cmpgtei.[nbhw] accum{[<pos>]},<value><br>prs.cmpgtei.[nbhw].stop accum{[<pos>]},<value><br>prs.cmpgtei.[nbhw].stopnode accum{[<pos>]},<value><br>prs.cmpgtei.[nbhw].stopsub accum{[<pos>]},<value> |

FIG. 76

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| *Rv* | | *F2* | | *Rsvd* | | | | | | | | | | | | | | | | | | *Func4* | | | | *Opcode* | | | | | | |
| 00 | | 01 | | 00..00 | | | | | | | | | | | | | | | | | | 1111 | | | | 0001011 | | | | | | *PINITPARSER* |

FIG. 77

| PINITPARSER (Arguments in registers a0 to a7) | prs.init |

FIG. 78

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | F2 | | N | | | | | | FuncNum | | | | | | | | | | | | Func4 | | | | Opcode | | | | | | |
| S | 0 | 00 | | 0 | | | | | | FuncNum | | | | | | | | | | | | 1111 | | | | 0001011 | | | | | | PRUNTHREAD |

FIG. 79

| PRUNTHREAD (S=0) | prs.runthread <func-num> |
|---|---|
| PRUNTHREAD (S=1) | prs.runthread.stp <func-num> |

FIG. 80

| 3 3 | 2 2 | 2 2 2 2 2 2 2 2 | 1 1 1 1 1 1 1 1 1 1 | 9 8 7 | 6 5 4 3 2 1 0 | |
|---|---|---|---|---|---|---|
| 1 0 | 9 8 | 7 6 5 4 3 2 1 0 | 9 8 7 6 5 4 3 2 1 0 | | | |
| Rv | F2 | Return_address | | Func4 | Opcode | |
| 00 | 01 | Return address | | 1111 | 0001011 | PEVENTLOOP |
| 01 | 01 | 00..00 | | 1111 | 0001011 | PEVENTLOOPEND |

FIG. 81

| PEVENTLOOP | prs.eventloop <return_address> |
|---|---|
| PEVENTLOOPEND | prs.eventloopend |

FIG. 82

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| S | D | F2 | | Insindex | | | | | | | | | | | InsNum | | | | | Func4 | | | | Opcode | | | | | | | | |
| S | 0 | 11 | | Insindex | | | | | | | | | | | InsNum | | | | | 1111 | | | | 0001011 | | | | | | | | PDATAEXTRACT |

FIG. 83

| PDATAEXTRACT (S=0) | prs.dataextract <insoff>, <numins> |
|---|---|
| PDATAEXTRACT (S=1) | prs.dataextract.stp <insoff>, <numins> |

FIG. 84

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Type | | | F | Sind | | | DstOffset | | | | | | | | | X | E | Length | | | | | | SrcOffset | | | | | | | | |
| 000 | | | F | Sind | | | DstOffset | | | | | | | | | X | E | Length | | | | | | SrcOffset | | | | | | | | PSEUDOMOVE |
| 001 | | | F | Sind | | | DstOffset | | | | | | | | | X | E | Length | | | | | | SrcOffset | | | | | | | | PSEUDONIBBMOVE |
| 010 | | | F | Sind | | | DstOffset | | | | | | | | | X | E | Length | | | | | | SrcOffset | | | | | | | | PSEUDONIBODMOVE |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| Type | | | F | Sind | | | DstOffset | | | | | | | | | Imm | | | | | | | | | | | | | | | | |
| 011 | | | F | Sind | | | DstOffset | | | | | | | | | Imm16 | | | | | | | | | | | | | | | | PSEUDOSTOREI16 |
| 10 | | | F | Sind | | | DstOffset | | | | | | | | | Imm8 | | | | | | | | 00000000 | | | | | | | | PSEUDOSTOREI8 |

FIG. 85

| | |
|---|---|
| PSEUDOMOVE<br>(Sind=0) | prsps.dataextract{.swp}<br>    pframe+<DstOffset>,pcurhdr+<SrcOffset>,<Length><br>prsps.dataextract{.swp}<br>    pframe+<DstOffset>,pdathdr+<SrcOffset>,<Length><br>prsps.dataextract{.swp}<br>    pmdbase+<DstOffset>,pdathdr+<SrcOffset>,<Length><br>prsps.dataextract{.swp}<br>    pmdbase+<DstOffset>,pcurhdr+<SrcOffset>,<Length> |
| PSEUDOMOVE<br>(Sind != 0) | prsps.dataextract{.swp}<br>    pframe+<DstOffset>[cntr[1234567]],pcurhdr+<SrcOffset>,<Length><br>prsps.dataextract{.swp}<br>    pframe+<DstOffset>[cntr[1234567]],pdathdr+<SrcOffset>,<Length><br>prsps.dataextract{.swp}<br>    pmdbase+<DstOffset>[cntr[1234567]],pdathdr+<SrcOffset>,<Length><br>prsps.dataextract{.swp}<br>    pmdbase+<DstOffset>[cntr[1234567]],pcurhdr+<SrcOffset>,<Length> |
| PSEUDONIBBMOVE<br>(Sind=0) | prsps.dataextract.nibb{.swp}<br>    pframe+<DstOffset>,pcurhdr+<SrcOffset>,<Length><br>prsps.dataextract.nibb{.swp}<br>    pframe+<DstOffset>,pdathdr+<SrcOffset>,<Length><br>prsps.dataextract.nibb{.swp}<br>    pmdbase+<DstOffset>,pdathdr+<SrcOffset>,<Length><br>prsps.dataextract.nibb{.swp}<br>    pmdbase+<DstOffset>,pcurhdr+<SrcOffset>,<Length> |
| PSEUDONIBBMOVE<br>(Sind != 0) | prsps.dataextract.nibb{.swp}<br>    pframe+<DstOffset>[cntr[1234567]],pcurhdr+<SrcOffset>,<Length><br>prsps.dataextract.nibb{.swp}<br>    pframe+<DstOffset>[cntr[1234567]],pdathdr+<SrcOffset>,<Length><br>prsps.dataextract.nibb{.swp}<br>    pmdbase+<DstOffset>[cntr[1234567]],pdathdr+<SrcOffset>,<Length><br>prsps.dataextract.nibb{.swp}<br>    pmdbase+<DstOffset>[cntr[1234567]],pcurhdr+<SrcOffset>,<Length> |

FIG. 86

| | |
|---|---|
| PSEUDONIBBODDMOVE<br>(Sind=0) | prsps.dataextract.nibbodd {.swp}<br>    pframe+<DstOffset>,pcurhdr+<SrcOffset>,<Length><br>prsps.dataextract.nibbodd {.swp}<br>    pframe+<DstOffset>,pdathdr+<SrcOffset>,<Length><br>prsps.dataextract.nibbodd{.swp}<br>    pmdbase+<DstOffset>,pdathdr+<SrcOffset>,<Length><br>prsps.dataextract.nibbodd{.swp}<br>    pmdbase+<DstOffset>,pcurhdr+<SrcOffset>,<Length> |
| PSEUDONIBBODDMOVE<br>(Sind != 0) | prsps.dataextract.nibbodd{.swp}<br>    pframe+<DstOffset>[cntr[1234567]],pcurhdr+<SrcOffset>,<Length><br>prsps.dataextract.nibbodd{.swp}<br>    pframe+<DstOffset>[cntr[1234567]],pdathdr+<SrcOffset>,<Length><br>prsps.dataextract.nibbodd{.swp}<br>    pmdbase+<DstOffset>[cntr[1234567]],pdathdr+<SrcOffset>,<Length><br>prsps.dataextract.nibbodd{.swp}<br>    pmdbase+<DstOffset>[cntr[1234567]],pcurhdr+<SrcOffset>,<Length> |
| PSEUDOSTOREI16<br>(Sind=0) | prsps.storei.h pframe+<DstOffset>,<Imm16><br>prsps.storei.h pmdbase+<DstOffset>,<Imm16> |
| PSEUDOSTOREI16<br>(Sind != 0) | prsps.storei.h pframe+<DstOffset>[cntr[1234567]],<Imm16><br>prsps.storei.h pmdbase+<DstOffset>[cntr[1234567]],<Imm16> |
| PSEUDOSTOREI8<br>(Sind=0) | prsps.storei.h pframe+<DstOffset>,<Imm8><br>prsps.storei.h pmdbase+<DstOffset>,<Imm8> |
| PSEUDOSTOREI8<br>(Sind != 0) | prsps.storei.h pframe+<DstOffset>[cntr[1234567]],<Imm8><br>prsps.storei.h pmdbase+<DstOffset>[cntr[1234567]],<Imm8> |

FIG. 86 (cont)

Point 2: After `prs.cam.h.stp pnext,paccum[0],1`
(at `ipv4_node`)

Point 4: After `prs.lensettlv.b.stp pdathdr,paccum[1]`
(before .stp processing is applied)

PARSER INSTRUCTIONS FOR CPUS

CROSS REFERENCE TO RELATED APPLICATIONS

This application is a continuation in part which claims priority to U.S. patent application Ser. No. 17/233,149 filed Apr. 16, 2021 which claims priority to U.S. Provisional Patent Application No. 63/011,002 filed Apr. 16, 2020 which is incorporated in its entirety.

FIELD OF THE DISCLOSURE

The overall field of this invention relates generally to employing architecture, programming models, and Application Programming Interface (API) for serial data processing, and in particular for serial processing pipelines. The disclosed embodiments relate to a system and method for an architecture that allows concurrent processing of multiple stages in a serial processing pipeline. In concert with other techniques, including hardware accelerations and alternative methods for accessing memory, parallelism improves performance in dimensions of latency, throughput, and CPU utilization.

BACKGROUND

This paper describes an architecture that allows concurrent processing of multiple stages in a serial processing pipeline. In concert with other techniques, including hardware accelerations and alternative methods for accessing memory, parallelism improves performance in dimensions of latency, throughput, and CPU utilization. Parallelism has long been exploited as a means to improve processing performance in different areas of computing. For instance, in networking, techniques such as Receive Side Scaling (RSS) parallelize packet processing across different CPUs. Those mechanisms employ horizontal parallelism to process packets concurrently, however processing for each packet remains serialized. For instance, a QUIC/IPv4 packet consists of a stack of Ethernet, IPv4, UDP, and QUIC headers—the corresponding protocol layers are processed serially for each packet. Vertical parallelism allows concurrent processing of different layers of a packet thereby reducing latency and increasing throughput. The benefits of vertical parallelism become more pronounced with increased use of encapsulation, extension headers, Type Length Value lists (TLVs), and Deep Packet Inspection (DPI). Network protocol processing is an instance of a serial processing pipeline. A serial processing pipeline is characterized by a pipeline composed of some number of stages that are expected to be processed serially where one stage must complete its processing before moving to the next one. A serial processing pipeline is parallelized by running its stages in parallel. A threading and dependency model is required to facilitate this. This paper describes such a model for parallelizing serial pipeline processing. The fundamental elements of the model are data objects, metadata, external data, threads, and dependencies. Data objects are units of data processed by a serial processing pipeline. Metadata is data about an object that is accumulated as an object is processed. External data provides configuration and state that is shared amongst processing elements. Threads are units of execution created for each stage in a pipeline. Dependencies define dependencies between threads. Given a threading and dependency model, a design for parallelizing a serial processing pipeline of a network stack can be articulated. Packet processing begins with one of the threads such as the initial thread to process the first protocol layer. Each protocol layer thread parses the corresponding protocol headers and starts a thread to process the next layer. Wait points and resolve points are set in the code paths to handle dependencies between stages. Once processing for all protocol layers has been started, the initial thread waits for all the threads to complete and then performs any necessary serial completion processing.

SUMMARY

In some aspects, the techniques described herein relate to a parsing system for parsing protocol headers, the parsing system including one or more computers, one or more storage devices on which are stored instructions that are operable, one or more memory and a parser engine, one or more parse nodes, one or more protocol tables, and one or more parsers, wherein an instance of a parser is included of a set of parse nodes and protocol tables, wherein the one or more parse nodes provide rules for parsing one or more protocol headers and the one or more parse nodes including additional rules for processing a protocol, wherein the one or more protocol tables describe relationships between the one or more parse nodes, wherein the parser engine processes the one or more protocol headers in a data object or packet per the rules of the one or more parse nodes and the one or more protocol tables, wherein to parse the one or more protocol headers, the one or more parse nodes determines a length of the one or more protocol headers being processed and a type of a next protocol header to be processed, wherein the length of the one or more protocol headers is determined by the one or more parse nodes that defines a minimum length attribute to give a minimum length of the one or more protocol headers, and wherein for a variable size protocol header, the one or more parse nodes define a length function that calculates the length of the one or more protocol headers, and wherein the length function includes a value of a length field in the one or more protocol headers as input, wherein the one or more parse nodes define a next type function to determine a type of the next protocol header to process, where the next type function includes a value of a next protocol field in the one or more protocol headers as input, wherein the parser engine uses the type of the next protocol header as input to a lookup in the one or more protocol tables that returns a next parse node or null when there is no next parse node, wherein an offset of the next parse node to process is given by a sum of an offset of a current protocol header being processed and a length of the current protocol header being processed, wherein when processing completes for the one or more parse nodes, the parser engine transitions to process the next parse node, wherein parsing of the data object or the packet is complete when the parser engine determines there is no next parse node to process.

In some aspects, the techniques described herein relate to a parsing system, wherein the parsing system is configured for parsing sub-protocol headers within a protocol header, wherein a sub-protocol defines a list of data elements each of which have one or more data headers, wherein the list of data elements are a Type Length Value list, a set of flag-fields, arrays, or other construct including multiple objects to be parsed, wherein the one or more data headers are parsed in a context of the one or more parse nodes, wherein the one or more parse nodes for the protocol with the sub-protocol includes one or more sub-parse nodes, one or more sub-protocol tables, and rules for parsing the one or more data headers of the sub-protocol, wherein the one or more sub-parse nodes provide rules for processing a data element, wherein the one or more sub-parse nodes define nested sub-protocols, wherein the one or more sub-protocol tables map types of data elements to the one or more sub-parse nodes, wherein the parser engine processes the sub-protocol in the protocol header by parsing and processing each of the data elements in the list of the sub-protocol, wherein to parse the one or more data headers, the one or more parse nodes determine a length and type of a current data header of the one or more data headers being processed, wherein the parser engine uses the type of the one or more data headers as input to a lookup in a sub-protocol table that returns the one or more sub-parse nodes for processing the data element, wherein the offset of a next data element to process is given by the sum of the offset of the one or more data headers being processed and the length of the data being processed, wherein when processing completes for the one or more sub-parse nodes, the parser engine transitions to process a next sub-parse node, wherein parsing of the sub-protocol for the one or more parse nodes is complete when all the data elements have been processed.

In some aspects, the techniques described herein relate to a parsing system, further including a set of parser instructions and one or more parser registers, wherein parser instructions are instructions in an Instruction Set Architecture that perform functions and operations related to parsing, wherein the one or more parser registers includes state variables for parsing, wherein the one or more parser registers are input to and processed by the parser instructions, wherein the parser instructions can be commingled with plain integer instructions, wherein the parsing system has instructions to move data from one or more integer registers to the one or more parser registers, wherein the instructions also move the data from the one or more parser registers to the one or more integer registers.

In some aspects, the techniques described herein relate to a parsing system, further including one or more parser exit codes which are a set of status codes returned when the parser exits, wherein the one or more parser exit codes include a success code and error code for conditions, wherein the one or more parser exit codes are stored in a parser status code register, wherein parser instruction processing cause the parser to exit prematurely, wherein an exit code set in a parser exit status register specifying a reason the parser exited.

In some aspects, the techniques described herein relate to a parsing system, further including state information describing the current protocol header being processed or the current data header being processed, wherein the state information for the current protocol header being processed includes the offset of a first byte of the protocol header being processed relative to a start of the packet and the length of the current protocol header being processed, wherein a current header parser register of the one or more parser registers holds the offset and the length of the current protocol header being processed, wherein a pointer to the current protocol header or the current data header being processed is derived from the offset and a base address pointer for the data object or the packet, wherein the state information for the one or more data headers being processed includes the offset of the first byte of the one or more data headers being processed relative to the start of the packet and the length of the one or more data headers being processed, where in the current header parser register of the one or more parser registers holds the offset and the length of the one or more data headers being processed, wherein a pointer to the one or more data headers being processed is derived from an offset and the base address pointer for the data object or the packet.

In some aspects, the techniques described herein relate to a parsing system, further including limit bounds of parsing, wherein the length of the data object or the packet implies a maximum length of the one or more protocol headers, wherein the length of the data object or the packet is held in a packet length register, wherein when the protocol header with its length exceeds the limit bounds set by the length of the packet or an instruction attempts to access data beyond the limit bounds then the parser will exit on an error, wherein a parse node sets a databound for the sub-protocol that is the maximum length of all the data elements included within the protocol header, wherein when the length of the one or more data headers exceeds the bound limits set by the databound or the instructions attempt to access data beyond the databound in the context of the sub-protocol then the parser exits on the error.

In some aspects, the techniques described herein relate to a parsing system, further including end of node processing that is performed at an end of a node for an instruction sequence, wherein the end of node processing includes checking that parsing is complete, checking a for loop, jump to loop head, exiting loops, jump to next node, and overlay handling, wherein end of node processing first checks a loop register, wherein when the loop register is set to an address a data header offset is advanced by the length of the current data header and then a jump is performed to that address, or wherein when the loop register is a status code indicating an error then the parser exits and reports the error, or wherein when the loop register is set to an okay status code, the loop is not being processed and a next register is checked, wherein when the next register is set to an address, a current header offset is advanced by the length of the current data header, wherein when the one or more parse nodes are marked as an overlay node then the current header offset does not advance, wherein the jump is performed to that address the next register, or wherein when the next register is a status code indicating an error then the parser exits and reports the error, or wherein when the loop register is set to the okay status code then the parser exits normally with the okay status code, wherein a limit is configured for a number of loop iterations and when the limit is exceeded then the loop exits with an error, wherein a limit is configured for the one or more parse nodes to process and when the limit is exceeded then the parser exits with an error.

In some aspects, the techniques described herein relate to a parsing system, wherein the parser instructions are augmented with an end-of-node attributes, wherein once a marked instruction completes its primary processing it executes common end of node processing, wherein the parser instructions set the next register or loop register to be processed by the end of node processing.

In some aspects, the techniques described herein relate to a parsing system, further including loop instructions including basic loops that are defined by a loop head, which sets the loop register with the address, wherein at the end of node processing when the loop register is set an address then the jump is made to the address to process the next loop iteration, wherein in end-of-node processing a loop terminates when the loop register has been set to sub node stop okay or the loop register is set to an error code when an error being encountered during loop processing, wherein an optional jump to post loop processing is allowed.

In some aspects, the techniques described herein relate to a parsing system, wherein an encapsulation level is maintained in the one or more parser registers, wherein when transitioning to a parse node marked as encapsulation in the end of node processing the encapsulation level is incremented, where in when the encapsulation is incremented a pointer to a metadata frame is advanced by the size of the metadata frame, wherein a limit for a number of encapsulations is set and when the limit is exceeded the parser exits with an error, the one or more parser registers include one or more counters that count events and the encapsulation level.

In some aspects, the techniques described herein relate to a parsing system, wherein the one or more parser registers include one or more counters that count events, wherein the parsing system includes an increment counter instruction that increments the one or more counters, wherein a limit is configured for a counter, of wherein when the limit is exceeded then the parser engine takes an action that could be stop the parser, stop the parser with error, exit loop, don't increment counter, wherein counters are automatically reset to zero when parsing commences for the packet or the data object, wherein the counter is optionally configured to be reset when an encapsulation parse node is encountered.

In some aspects, the techniques described herein relate to a parsing system, further including a load from header instruction that loads some number of bytes from the current protocol header or the data being processed into an accumulator register, wherein an attribute of the instructions indicates whether a source is the current protocol header or the one or more data headers, wherein an offset indicates the offset to load from relative to a start of the current data header, wherein an address pointer for the load can be derived by adding the offset to the pointer for the current header or the one or more data headers, wherein the attribute of the instructions indicate a loaded value is to by endian swapped, wherein an optional shift value indicates a number of bits to shift left the loaded value, wherein an optional mask value indicates a number of high order bits in the loaded value to zero, wherein the parsing system checks current header of data header length as part of the load, wherein when the load would access bytes beyond a length limit then parsing system jumps out of the parser on error condition, wherein when the length is acceptable but beyond the current header or data length then extend the loaded value in the one or more parser registers.

In some aspects, the techniques described herein relate to a parsing system, further including a store to metadata instruction that stores some number of bytes from the one or more parser registers or immediate value to metadata memory, wherein source data is sub-register of the one or more parser registers, wherein a target of the store is either common metadata or a metadata frame, wherein the offset indicates the offset to store data relative to start of the common metadata or the metadata frame, wherein a counter register is specified to use as an array index and the counter is configured to be associated with an array element size, wherein the offset into the array is derived by multiplying the value of the counter by the array element size, wherein the offset for storing data is the offset indicated in the instructions plus the offset of the array when the array index is specified, wherein the one or more parser registers include base addresses of the common metadata and the metadata frame so that fully qualified address pointer for a destination is derived by adding the base addresses and a computed store offset.

In some aspects, the techniques described herein relate to a parsing system, further including hardware parser length instructions, to set and check current header length data header length, and databound, wherein the length is derived from an immediate length, a variable field loaded in a sub-register of the one or more parser registers, or a sum of an immediate value and a variable length, wherein when the variable length is set it can be left shifted, wherein once the length is computed it is checked against appropriate bounds, wherein when a bound is exceeded, the parser stops with code depending on whether the length is for the current protocol header or the one or more data headers.

In some aspects, the techniques described herein relate to a parsing system, further including a Content Addressable Memory that is used as a protocol table, wherein each entry is composed of a key and a target value, wherein the Content Addressable Memory used to perform next protocol lookups and can be used for other purposes as well, wherein instruction are used to program entries of the Content Addressable Memory, wherein the Content Addressable Memory lookup instructions perform the lookup on the value in an accumulator sub-register as the key, wherein Content Addressable Memory instructions set returned value in a next register, set the returned value in an accumulator register, or jump directly to a returned address, wherein the Content Addressable Memory instructions indicate a table selector that allows different Content Addressable Memory tables, wherein the different Content Addressable Memory tables are consolidated into a single Content Addressable Memory table by making the table selector to be part of the key, wherein for the single Content Addressable Memory table, where the table selector is deduced by a low order bits program counter to reduce a number of bits needed to express a table identifier in the instructions.

In some aspects, the techniques described herein relate to a parsing system, further including lookup arrays that are used as a protocol table, wherein the lookup arrays are used to perform next protocol lookups and can be used for other purposes as well, wherein instruction are used to program entries of the array, wherein parser array lookup instructions perform a lookup using a value in a sub-register as an index, wherein array lookup instructions set a returned value in a next register, set the returned value in the one or more parser registers, or jump directly to a returned address, where the value includes a base index into a sub-table to consolidated different lookup arrays in into a single array table.

In some aspects, the techniques described herein relate to a parsing system, further including Type Length Value loops that are implemented using a loadtlvloop instruction, which combines a functionality of loading a Type Length Value type from the one or more data headers and serving as a loop head, wherein at each iteration the one or more parser registers is set to an index of a next set flag bit to process, wherein a "jump loop" function performs the lookup and jump in the context of a loop, wherein a "jump TLV loop" function performs the lookup and the jump in the context of a Type Length Value loop.

In some aspects, the techniques described herein relate to a parsing system further including comparison instructions that perform a comparison operation between a value in sub-register of the one or more parser registers and an immediate, wherein a result of the comparison is false then behaviors include one of a following: stop the parser, stop processing the current node, stop processing a current sub-node, of jump to a handler.

In some aspects, the techniques described herein relate to a parsing system further including runthread instructions that requests that work be performed to process a protocol layer in one or more worker threads, wherein a work item indicates a function to run in the one or more worker threads to process a protocol layer and includes the parser state describing the protocol layer to be processed, wherein when a runthread instruction is executed, a snapshot of a material parser state is taken and placed in an allocated work item which is a memory object, wherein the one or more parser registers are overlaid with data of the allocated work item such that taking the snapshot is done by a block copy for the one or more parser registers to an address of the allocated work item in memory, wherein the parser engine sends these messages to a thread scheduler initiate scheduling of the one or more worker threads, wherein the scheduler processes the message and schedules the one or more worker threads to run all the work items in the list, wherein the one or more worker threads thread are scheduled asynchronously and runs in parallel with the parser.

In some aspects, the techniques described herein relate to a parsing system further including data extraction instructions that performs a copy from header data to metadata to perform data extraction, wherein the data extraction instructions encapsulate load and store operations and move more than eight bytes in one instruction, wherein the data extraction instructions invokes pseudo instructions, wherein the pseudo instructions include an index of the instructions in memory, and a total number of the pseudo instructions to execute.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 16 illustrates CPU instructions for parsing IPv4.

FIG. 17 illustrates possible sizes with the value set in the Sz field for a sub-register instruction.

FIG. 18 illustrates the position numbering for nibble, byte, half-word and word sub-registers.

FIG. 22 illustrates a lookup array with two sub-arrays

FIG. 23 illustrates a new set of 64-bit registers.

FIG. 24 illustrates a table for a new set of 64-bit registers.

FIG. 25 illustrates encoding to contain either an address or a parser code.

FIG. 31 illustrates holding the running node count and various counters for iterating in a loop.

FIG. 33 illustrates the pending work register.

FIG. 38 illustrates indication when a counter exceeds the maximum array index value.

FIG. 39 illustrates a configuration for the array element sizes

FIG. 42 illustrates register initialization.

FIG. 43 illustrates a plurality of registers.

FIG. 44 illustrates assembly for parser coprocessor read and write instructions.

FIG. 45 illustrates a check for a code

FIG. 46 illustrates 32-bit Hardware Parser instructions.

FIG. 47 illustrates examples of how the nibbles are copied.

FIG. 48 illustrates pseudo registers used in Assembly instruction.

FIG. 49 illustrates streaming datagram infrastructure.

FIG. 50 illustrates assembly for PLOAD instruction.

FIG. 51 illustrates multiple code for registers.

FIG. 52 illustrates assembly for PFLAGSLOOP instruction.

FIG. 53 illustrates code for PTLVFASTLOOP.

FIG. 54 illustrates assembly for PTLVFASTLOOP instruction.

FIG. 55 illustrates assembly for PSTORE instruction.

FIG. 56 illustrates assembly for PSTOREREG instruction.

FIG. 57 illustrates assembly for PSTOREIMM instruction.

FIG. 58 illustrates code for PSTORE.

FIG. 59 illustrates further assembly instructions.

FIG. 60 illustrates further code.

FIG. 61 illustrates further assembly instructions.

FIG. 62 illustrates assembly for next instructions.

FIG. 63 illustrates instructions for PLOOP AND PEXTRACT.

FIG. 64 illustrates code for PLOOP AND PEXTRACT.

FIG. 65 illustrates instructions for PINCCNTR, PSETCNTRBIT, and PRESETCNTR

FIG. 66 illustrates code for PINCCNTR, PSETCNTRBIT, and PRESETCNTR.

FIG. 67 illustrates assembly instructions for further registers.

FIG. 68 illustrates CAM instructions.

FIG. 69 illustrates assembly instructions for further registers.

FIG. 70 illustrates code for further registers.

FIG. 71 illustrates assembly instruction for PCMPIH register.

FIG. 72 illustrates code for PCMPIH register.

FIG. 73 illustrates assembly instructions for PCMPIB and PCMPINEB registers.

FIG. 74 illustrates code for PCMPIB and PCMPINEB registers.

FIG. 75 illustrates assembly instructions for further registers.

FIG. 76 illustrates code for further registers.

FIG. 77 illustrates assembly instructions for PINTPARSER register.

FIG. 78 illustrates code for PINTPARSER register.

FIG. 79 illustrates assembly instructions for PRUNTHREAD register.

FIG. 80 illustrates code for PRUNTHREAD register.

FIG. 81 illustrates assembly instructions for PEVENTLOOP and PEVENTLOPEND registers.

FIG. 82 illustrates code for PEVENTLOOP and PEVENTLOPEND registers.

FIG. 83 illustrates assembly instructions for PDATAEXTRACT register.

FIG. 84 illustrates code for PDATAEXTRACT register.

FIG. 85 illustrates assembly instructions for further registers.

FIG. 86 illustrates code for further registers.

DETAILED DESCRIPTION

Protocol parsing is essential in network processing. It can be defined as the operation of inspecting network packets to identify and process their protocol layers, and a protocol parser is then an entity that parses a set of protocols. A protocol parser may be represented as a parse graph that indicates the various protocol layers that may be parsed and the relationships between layers.

Figure 1:
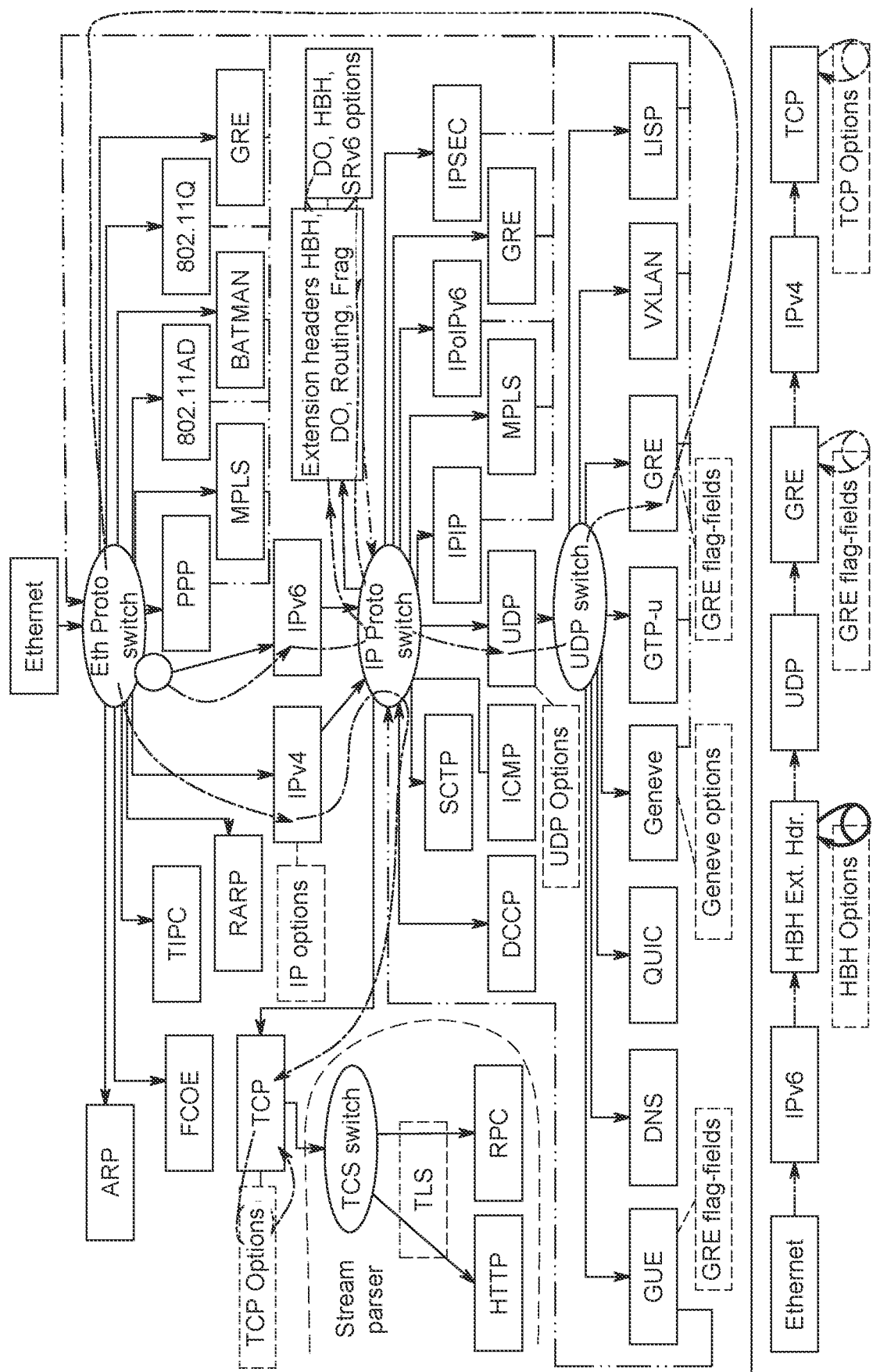
FIG. 1 illustrates an example parse graph and parsing of a packet.

FIG. 1 illustrates an example parse graph and "parse walk" for parsing a packet. Implementing protocol parsers is a challenging conundrum. On one hand, parsers are in the critical data path so they demand high performance—a router may need to parse and forward billions of packets per second, or a host may need to process millions of TCP packets per second. On the other hand, parsers need to be flexible to support a wide variety of protocols. Protocol parsing is also replete with inherent complexities: the input is unpredictable, protocols layers must be processed sequentially, headers can be variable length with sub-structures like Type Value Length (TLVs), and packets may contain layers of encapsulation. In this paper, we present the PANDA Parser that addresses the challenges to achieve high performance with full flexibility.

The goals of the PANDA parser are: •"Turing complete"—any protocol that can be parsed by a CPU can be parsed by the PANDA parser. •Native support for parsing TLVs and flag-fields. Allow users to code in a language convenient to them and leverage standard tool chains and tools. The same parser source can be compiled to arbitrary software and hardware targets without code change. For any given target environment, provide the highest performance possible given its capabilities. The following paragraphs explain the design of the PANDA parser including core data structures and the parser engine that processes them, the programming model including compilers and an Intermediate Representation for parsers, the hardware implementation that employs Domain Specific [XX] CPU instructions, and a discussion of related work and opportunities.

FIG. 1 illustrates an example parse graph and parsing a packet. This diagram shows a parse graph with common networking protocols and parsing of an TCP/IPv4 packet in GRE in IPv6 with Hop-by-Hop Options. The linearized parse walk is shown at the bottom.

Figure 2:
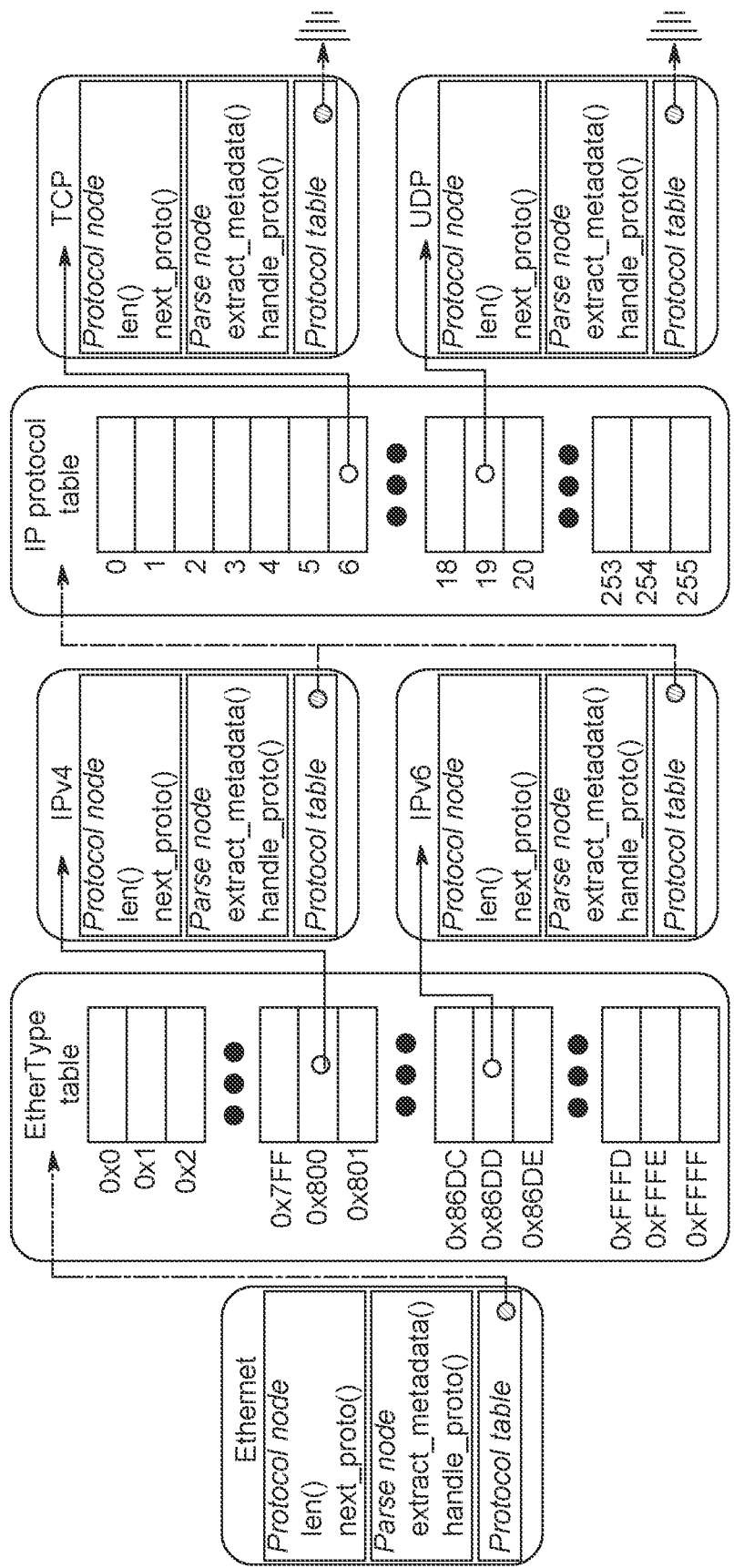
FIG. 2 illustrates an example of a PANDA parser.

The PANDA Parser is a facility that implements generic and programmable parsing. A parser instance is defined by a set of data structures as nodes that are linked together by protocol tables to represent the parse graph for a parser. A parser engine parses packets per the rules and attributes of the parse graph. The parser engine is effectively a Finite State Machine (FSM) where the input data are packets, the nodes of the parse graph are the states, and protocol tables define the state transitions. A parse graph for a PANDA parser is specified by a set of parse nodes and protocol tables. Parse nodes describe how to parse the header of a specific protocol and are annotated with ancillary customizable functions to process the results of parsing. Protocol tables define the links between parse nodes. The attributes of a parse node includes a protocol node, reference to a protocol table, metadata extraction rules, and backend processing handlers. FIG. 2 illustrates an example parse graph for parsing "plain" protocols A parse node includes a reference to a protocol node that provides the standard rules for parsing a protocol. Parsing a protocol requires two fundamental pieces of information: 1) the length of the protocol header (and hence the offset of the next header), and 2) the type of the next header protocol for non-leaf protocols.

A protocol node defines the min_len attribute to give the minimum length of a header; this must be non-zero. For variable length protocols, a len function is specified that returns the length of a protocol header. A length function can be specified by a parameterized function HLEN<pfield-off, pfield-len, pmask, pshift-right, pmultiplier, padd>=
[(READ(HDR, pfield-off, plen) & pmask)>>pshift-right]*
pmultiplier+padd Some variable length protocols lack an explicit header length field. For instance, in GRE [XX], header length is determined by summing the sizes of flag-fields. A FLAG_FIELDS_LENGTH function can be defined for this that takes flags and a flags descriptor table as input.

FIG. 2 illustrates an example instance of a PANDA parser. This example shows a parser for Ethernet, IPv4, IPv6, TCP, and UDP. The root of the parser is the Ethernet node. The next_proto function reads the EtherType field in an Ethernet header, and the value is looked up in the EtherType table. If the EtherType is 0x800 then the IPv4 header is parsed, if it's 0x86DD then the IPv6 header is parsed. In both IPv4 and IPv6 the next header is provided in a "next header" field that is read by the respective node's next_proto function. The value is looked up in the IP protocol table. If the next protocol is 6 then the TCP header is parsed, and if the next protocol is 19 then the UDP header is parsed.

The READ function reads data from the header (HDR). pfield-off is the offset of the length field, and pfield-len is the size of the length field in bytes. pmask is a mask, pshift-right is number of bits to shift right, pmultiplier is a multiplier value, and padd is a value added to the final result. An instance is given by <pfield-off, pfields-len, pmask, pshift-right, pmultiplier, padd>. For example, the function to compute the IPv4 header length is denoted by HLEN<0, 1, 0xf, 0, 4, 0>, and the function to compute the length of an IPv6 Hop-by-Hop Options Extension Header is denoted by HLEN<1, 1, 0xff, 0, 8, 8>.

Protocol nodes for non-leaf protocols specify a function to extract a protocol number from a field in a packet. This can be defined as a parameterized function (where the input parameters have same semantics as described above): PTYPE<pfield-off, pfield-len, pmask, pshift_right>=(READ (HDR, pfield-off, pfield-len) & pmask)>>pshift-right An instance is given by <pfield-off, pfields-len, pmask, pshift-right>>. For example, the function to derive the next protocol from an IPv4 header is denoted by PTYPE<9, 1, 0xff, 0>, and the function to derive the next header for an IPv6 Hop-by-Hop Options Header is denoted by PTYPE<0, 1, 0xff, 0>. 2.1.3 Other protocol node properties A protocol node contains additional optional attributes. The encap attribute is a boolean indicating that the protocol is a network encapsulation; this indicates that frame index (Section 2.3) is incremented when proceeding to the next protocol. The overlay attribute is a boolean indicating that the protocol is an overlay; this indicates that cur_ptr (Section 2.7) does not advance when proceeding to the next protocol. The check_fields attribute refers to a list of conditional expressions for validating a protocol.

Figure 3:
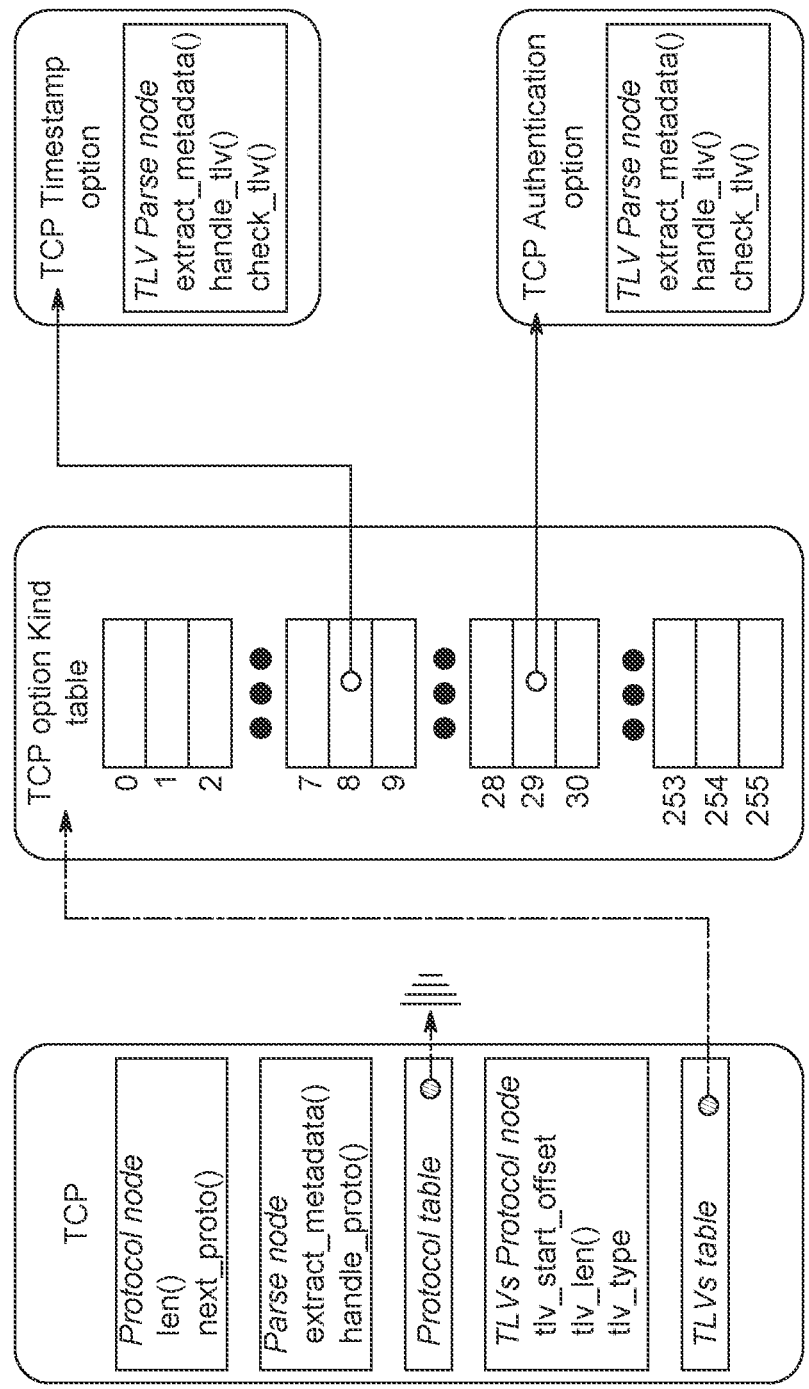
FIG. 3 illustrates an example of parsing TLVs in the PANDA parser.

FIG. 3 illustrates an example of parsing TL Vs in the PANDA parser. This example shows parse nodes for TCP options. On the left a TLVs parse node for TCP is shown. This node contains all the attributes of a parse node and additional ones that describe how to parse TCP options. When a TCP header is parsed by the TCP node, each TCP option is parsed. The "option kind" is determined by the tlv_type function, and a lookup is performed in the TCP option kind table. If the option type is 8 then a TCP Timestamp option is parsed by the TCP Timestamp option TLV node.

Protocol tables provide the links between parse nodes in a parse graph. A protocol table maps a protocol number to a parse node. Protocol tables may be implemented as arrays, hash tables, or CAMs (Content Addressable Memory). Metadata consists of data about packets that is collected and recorded as a packet is parsed. Metadata includes fields that are extracted from protocol headers, and also ancillary information such as header length or encapsulation level. Parse nodes may be annotated with rules to "extract" metadata and record it in a metadata buffer. Metadata is consumed by protocol handlers and post parser processing.

Figure 12:
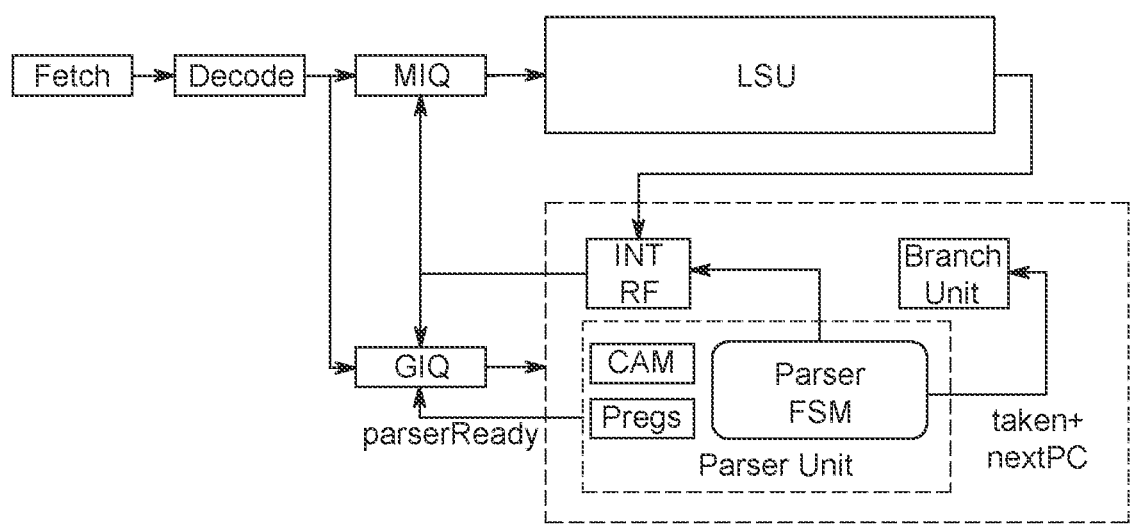
FIG. 12 illustrates a block diagram of the parser unit in avispado CPU.

A metadata buffer is composed of two sections: common metadata and metadata frames (FIG. 12). Common metadata is common across all protocol layers. A metadata frame contains data corresponding to one level of encapsulation. For instance, a packet may have several layers of network encapsulation where each encapsulation could have an IP header—a metadata frame could contain the IP addresses as metadata for each encapsulation layer. Metadata frames can be implemented as an array, where a frame index indicates the current metadata frame to which a protocol layer will write metadata. The metadata extracted from a protocol layer is specified as a set of metadata extract rules. Rules can be parameterized. For instance, to extract a field from a protocol header a rule could be defined as: from offset X in a protocol header, copy N bytes to offset Y in the current metadata frame.

A parse node may specify functions to perform backend processing of a protocol layer. These functions are invoked inline by the parser and the arguments to the function are a pointer to the protocol header, the length of the header, and a pointer to the metadata buffer for the packet. Handler functions can perform arbitrary protocol processing and they can run in parallel with the parser.

Figure 4:
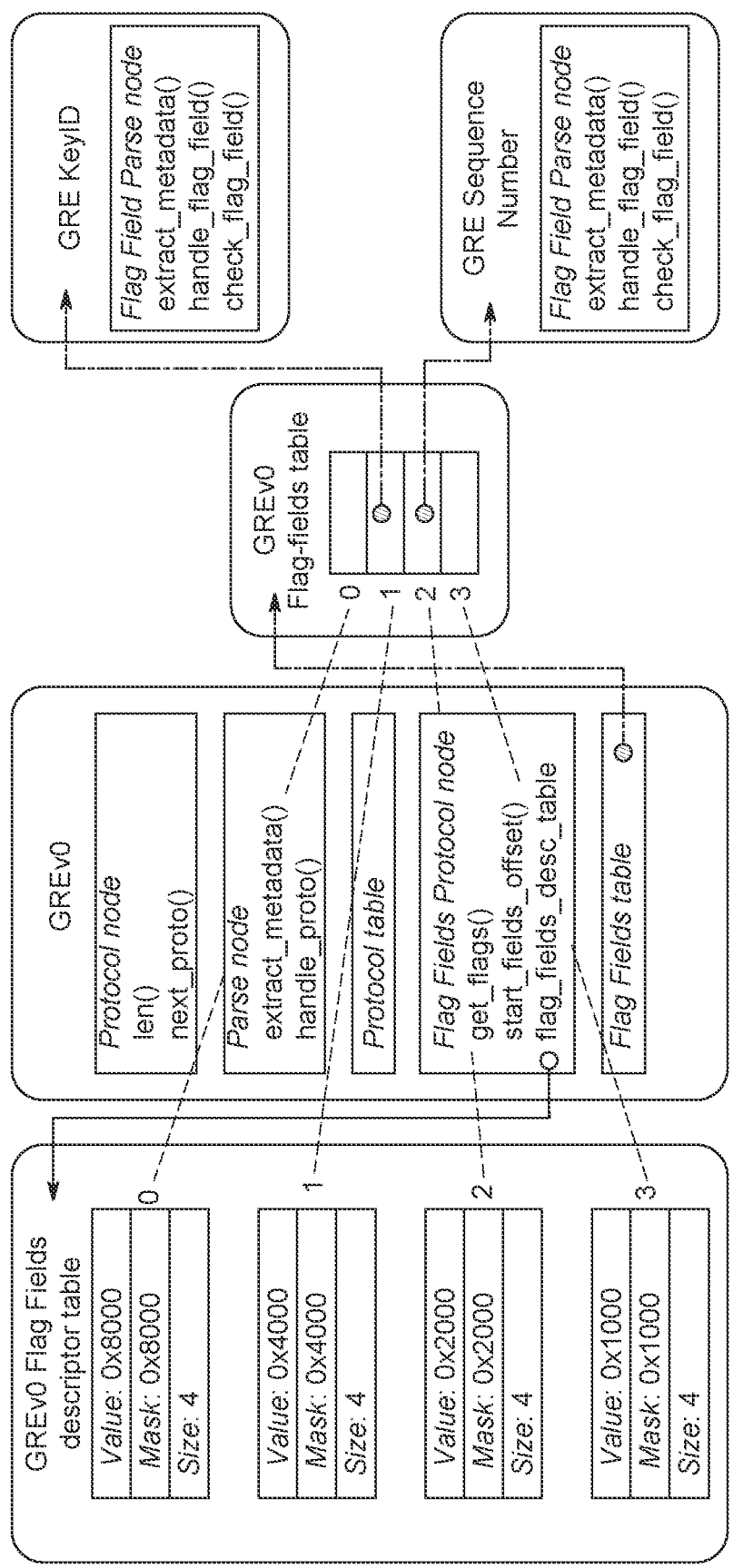
FIG. 4 illustrates an example of parsing flag fields in the PANDA parser.

FIG. 4 shows an example of parsing flag-fields in the PANDA parser. This example shows parse nodes for GRE flag-fields. GREv0 is a flag-fields parse node. On the left is the flag-fields descriptor table, this table has an entry for each of the GRE flags that describes the flag and the size of its associated field. When flag-fields are parsed, the descriptor table is consulted to identify the flags-fields in a packet. If a flag is matched then its index is returned, and that value is used to do a protocol lookup in the GREv0 Flag-fields table. If flag 0x4000 is set then index 1 is returned and the table lookup returns the flag-field parse node for the GRE KeyId which is invoked to process the GRE KeyId.

The PANDA Parser supports parsing Type Length Values (TLVs). TLVs parse nodes and TLVs protocol nodes extend parse nodes and protocol nodes with attributes for parsing TLVs. FIG. 3 shows an example of parsing TLVs. A TLVs protocol node contains additional attributes for parsing TLVs. The tlv_min_len attribute gives the minimum length of a TLV (typically, this is just the length covering the type and length fields of the TLV). start_offset gives the offset of the TL Vs from the current header. The tlv_len attribute is a length function that returns the length of a TLV. The tlv_type attribute is a protocol type function that returns the type of the TLV. A TLVs protocol node also contains TLV specific attributes including tlv_padl which specifies the type number for single byte padding, and tlv_eol which the type value for "end of list". A TLVs parse node includes a protocol table that maps TLV types to TLV parse nodes. A TLV parse node (note singular "TLV") contains functions for parsing a TLV including metadata extraction rules and handler functions. 2.6 Flag-fields parse nodes The PANDA Parser natively supports parsing flag-fields like in GRE [xx]. Flag-fields parse nodes and flag-fields protocol nodes extend parse nodes and protocol nodes.

FIG. 4 shows an example of parsing flag-fields. A flag-fields protocol node includes a flag-fields descriptor table. Each element in the table describes a flag that may be set by a value, mask, and size of the data field if its flag is present. When flag-fields are processed, the descriptor table is scanned. If the header's flags and'ed with the mask in an entry equals the value in the entry then the flag is matched; the index of the entry is returned. A flag-fields parse node includes a protocol table that maps indices to flag-field parse nodes. A flag-field parse node (note the singular "flag-field") contains functions for parsing a flag-field including metadata extraction rules and handler functions.

FIG. 5 illustrates a parser engine processing flow. (a) illustrates the flow processing for parsing plain top-level protocols in parse nodes, (b) shows the parse loop for parsing TLVs, (c) shows the parse loop for parsing for flag-fields.

Figure 5A:
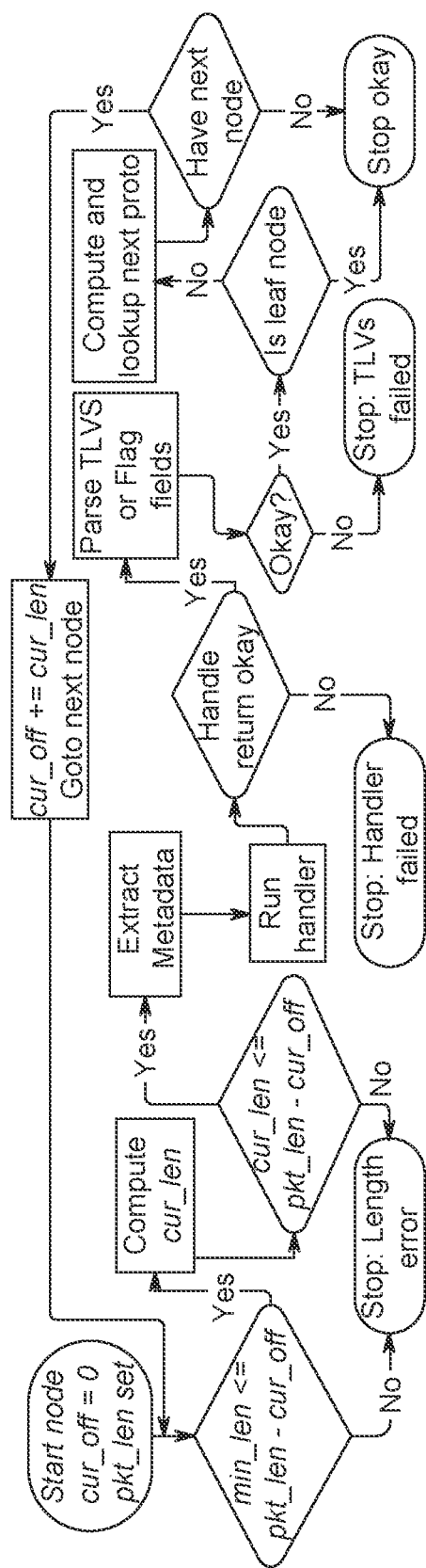
FIGS. 5A-C illustrates the parser engine processing flow.
Figure 5B:
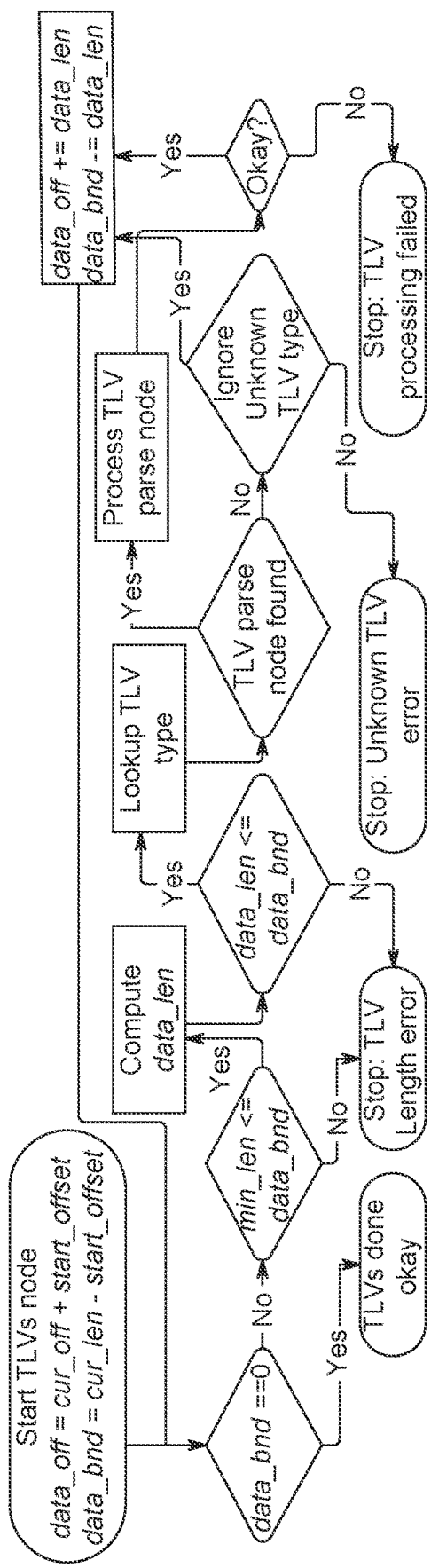
Figure 5C:
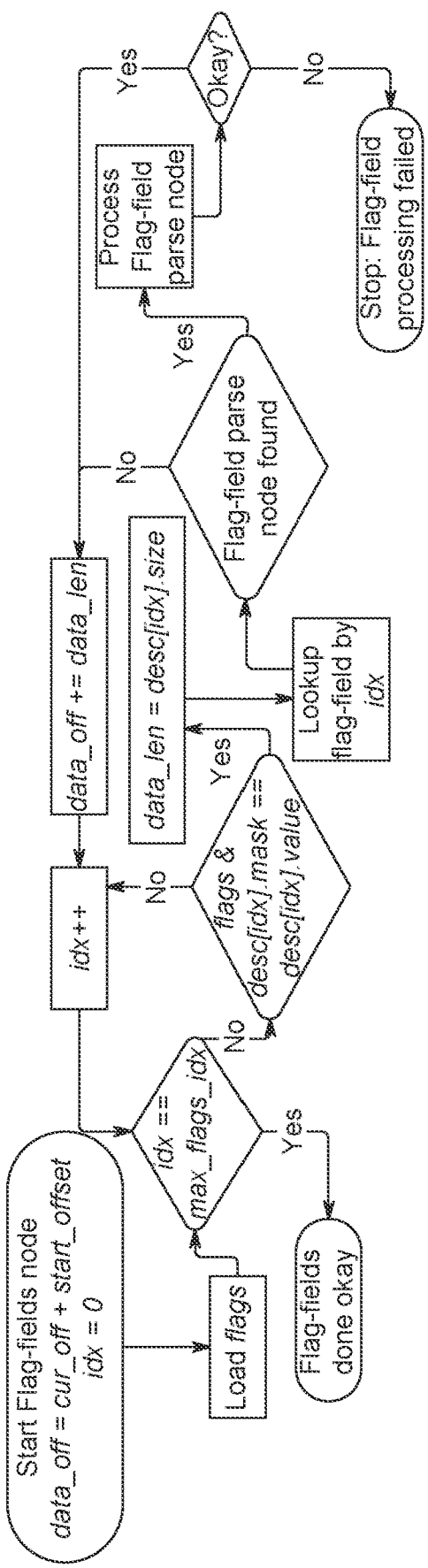

The parser engine in the PANDA parser performs the work of parsing protocols in packets. The processing flow of the parser engine is illustrated in FIGS. 5A-C. The parser engine maintains a few variables: cur_off is the offset (from the beginning of the packet) of the current header being parsed, cur_len is the computed length of the current header, and pkt_len is the length of the packet. FIGS. 5A-C shows the processing flow for parsing top level protocols. First the header length is computed and checked that it lies within the packet's bounds (cur_len<=pkt_len-cur_off). If the length is okay, then metadata extraction and handlers are called per the attributes of the parse node, and then any associated TLVs or flag-fields are parsed. If the node is for a non-leaf protocol, then the next protocol is determined and looked up in the parse node's protocol table. If the returned node is non-NULL then cur_len is added to cur_off and processing jumps to the next node.

The parser engine uses some variables for parsing TLVs (and flags-fields): data_off is the offset (from the beginning of the packet) of the current TLV being parsed, data_len is the computed length of the current TLV, and data_bnd is maximum extent of the TLVs. FIG. 5B shows the processing flow for parsing TLVs in a loop. For each TLV, the length and type are determined. The length is checked against the data bounds (data_len<=data_bnd). The type is looked up in the TLV table, and the returned TLV parse node is invoked. data_len is then added to data_off and subtracted from data_bnd and processing loops. The loop terminates when data_bnd is zero. 2.7.3 Parsing flag-fields FIGS. 5A-C shows the processing flow for parsing flag-fields. A loop is performed over the flag-fields descriptor table. If a flag is present in the protocol header, then the corresponding index is looked up in the flag-fields protocol table and the returned flag-field node is invoked. data_len is then added to data_off and processing loops.

Figure 6:
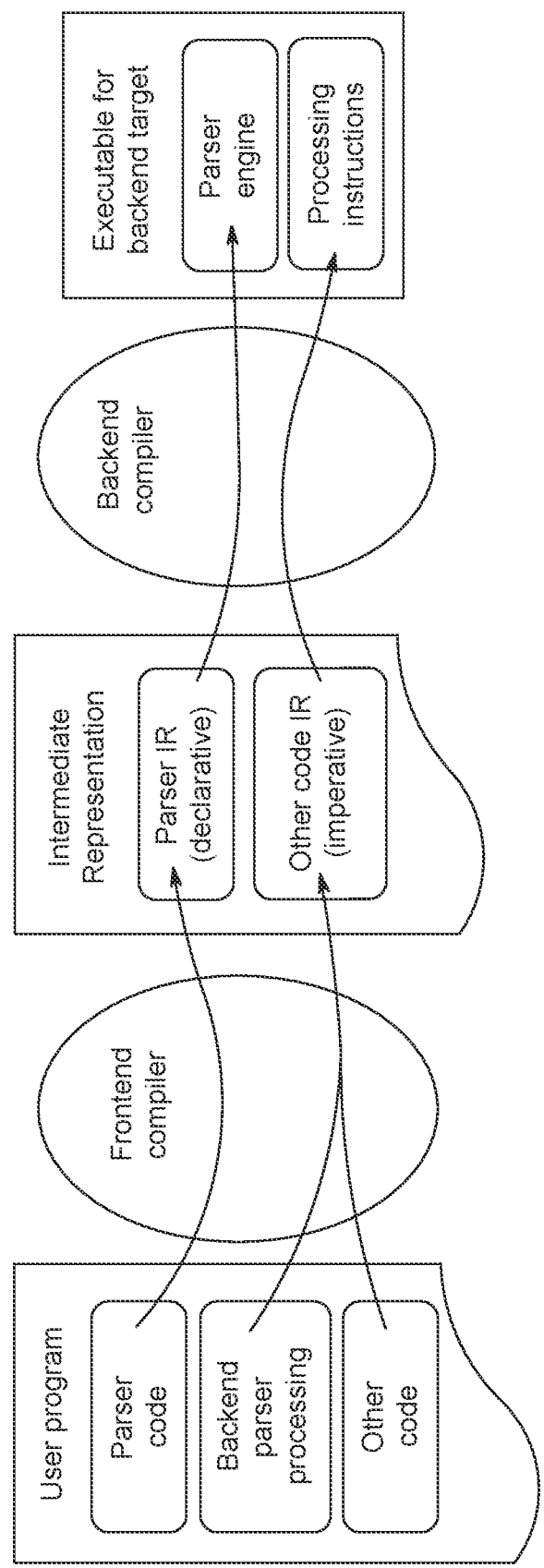
FIG. 6 illustrates compiling of a PANDA parser program.

FIG. 6 illustrates the compiling of a PANDA parser program. At the left the user writes source code for their parser program. The code is compiled into an Intermediate Representation. Backend compilers convert the IR into an executable binary for some target.

Figure 7:
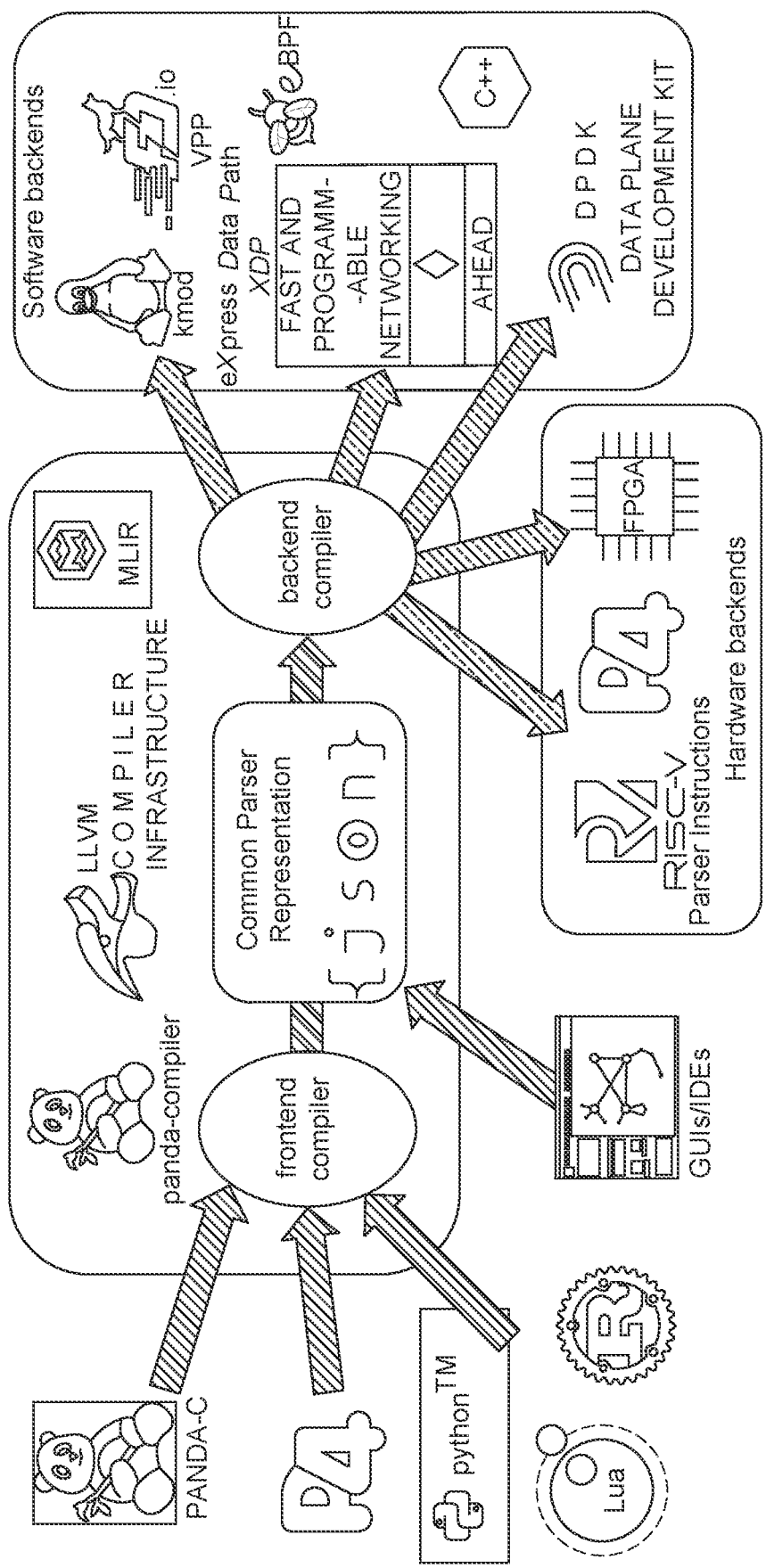
FIG. 7 illustrates the PANDA parser ecosystem.

The programming flow of the PANDA parser is depicted in FIG. 6. A user writes a parser program in a language with parser support. A frontend compiler compiles their program into an Intermediate Representation, or IR, and then backend compilers compile the IR into an executable image for a specific target. We have developed an IR and modified compilers for the PANDA Parser. FIG. 7 shows the PANDA parser programming ecosystem. The Common Parser Representation, or CPR, is a generic IR for parsers. This IR represents parsers in a declarative representation as opposed to an imperative representation. CPR maps the parser data structures described in Section 2 into a json [xx] representation.

The following illustrates CPR by an example: the json below describes a parser for Ethernet, IPv4, TCP with options, and GRE with flag-fields. The parsers property declares my_parser with root node eth_node (not shown) and okay-target indicates that the okay node (not shown) is invoked when the parser completes. Parse nodes are defined in parse-nodes. The protocol table for the eth_node parse node includes an entry that maps 0x800 EtherType to ipv4_node. In ipv4_node, min-hdr-len indicates the minimum header length (20 bytes for IPv4). hdr-length sets parameters for the IPv4 header length function, and next-proto gives the parameters for the next header type function. The ents sub-field of next-proto is an inlined protocol table that matches TCP and GRE to ipv4_node and gre_node The tlvs-parse-node in tcp_node provides the rules and attributes for parsing TCP options. tlv-type and tlv-length provide the function parameters to determine the type and length of a TCP option (the minimum TLV length is inferred). The starting offset of TLVs is taken to be the minimum header length (20 bytes). tcp_opt_table maps option type 8 to tcp_opt_tstamp_node, and that node records the timestamp value in the metadata. flag-fields-parse-node in gre_node gives the rules for parsing GRE flag-fields. For each possible GRE flag-filed there is an entry in gre_flags_table that specifies the flag value, mask, and field size. Flag value 0x4000, the KeyId flag, is mapped to gre_key_id node.

The code may be illustrated below

```
"parsers": [{
"name": "my_parser",
"root-node": "eth_node",
"okay-target": "okay"
}],
"parse-nodes": [
{
"name": "ipv4_node",
"min-hdr-length": 20,
"hdr-length": {
"field-off": 0, "field-len": 1,
"mask": "0xf", "multiplier" : 4
},
"next-proto": {
"field-off": 9, "field-len": 1,
"ents": [
{ "key": 6, "node": "tcp_node"},
{ "key": 47, "node": "gre_node"},
],
},
},{
"name": "tcp_node",
"tlvs-parse-node": {
"tlv-type":
{ "field-off": 0, "field-len": 1 },
"tlv-length":
{ "field-off": 1, "field-len": 1 },
"pad1": 1, "eol": 0,
"table": "tcp_opt_table"
},
# Other fields in TCP parse node
},{
"name": "gre_node",
"encap": true,
"hdr-length":
{ "flag-fields-length": true },
"flag-fields-parse-node": {
"flags-offset": 0, "flags-length": 2,
```

-continued

```
"flags-reverse-order": true,
"table": "gre_flags_table"
},
# Other fields in GRE parse node
},{
"name": "tcp_opt_tstamp_node",
"metadata": { "ents": [
{ "md-off": 4,"hdr-src-off": 2,
"length": 4,"endian-swap": true
}
]}
},{
"name": "gre_key_id",
"metadata": { "ents": [
{ "md-off": 8, "type": "hdr-off-len" }
]},
},
# ether node and okay parse nodes
],
"proto-tables": [
# tcp_opt_table and gre_flags_table
]
```

The PANDA parser ecosystem. A parser definition is coded by a user in some frontend language (shown on the left); The parser may be part of a larger data path program. The panda-compiler front-end compiles the user's code into the Common Parser Representation IR (shown in the middle), and non-parser code is compiled into a suitable IR like LLVM IR for a C++ program. A backend compiler then compiles both the parser IR and non-parser IR into an optimized binary executable for the desired hardware or software targets (shown on the right).

Figure 8:
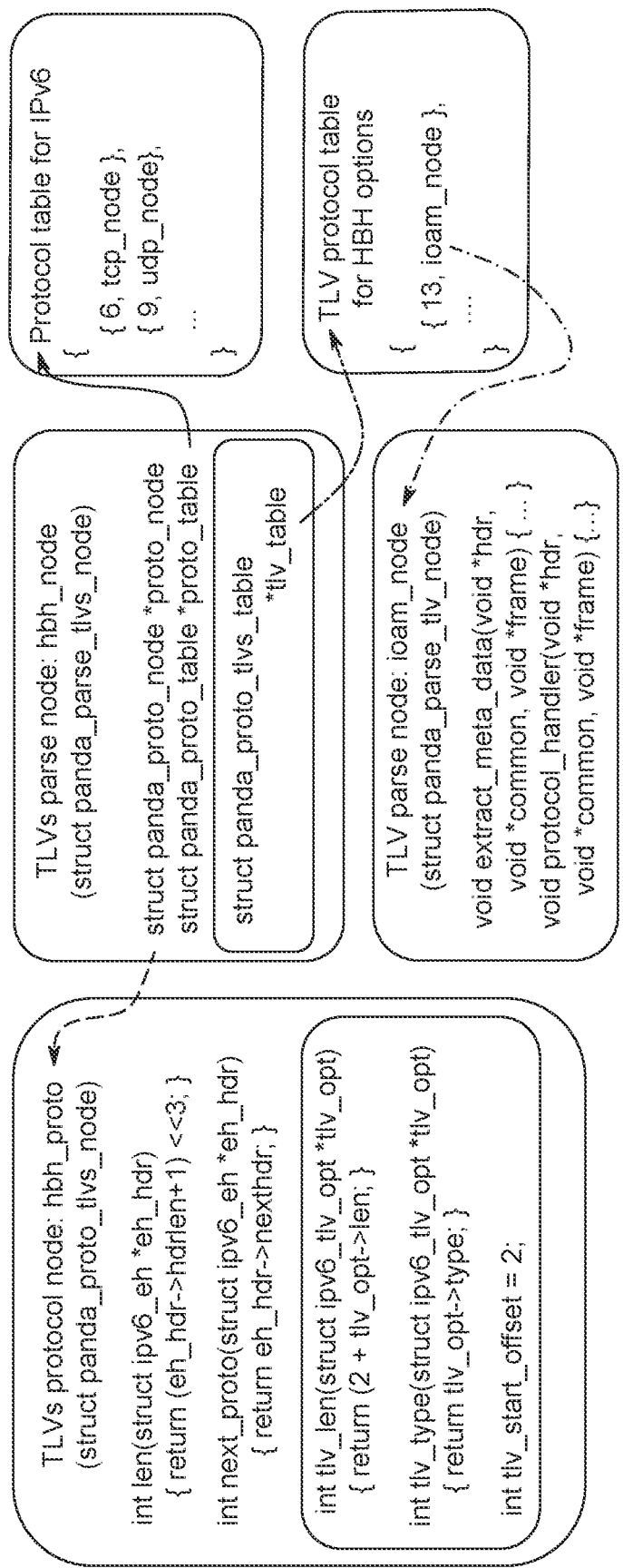
FIG. 8 illustrates an example of a TLVS parser mode in PANDA-C.

PANDA-C is an API and library to program parsers in C. A parser is specified by a set of C data structures for protocol nodes, parse nodes, and protocol tables. FIG. 8 shows an example of a TLVs node in PANDA-C. Field variables provide attributes for parse nodes. Parsing functions, such as those to get the next header or length of a header, are set as function pointers in the data structures. Functions are coded in C and take a pointer to the current header or data header as an argument. For example, a protocol node contains a len function pointer, and for an IPv4 protocol node that function could be defined as: int len(struct ip_hdr*iphdr) {return iphdr->ip_vhl & 0xf<<4;} Helper macros can be used to create parser data structures. PANDA_PARSER creates a parser instance with a root node argument; PANDA_MAKE_PARSENODE creates a parse node with arguments for the protocol node, protocol table, handler, and metadata functions; PANDA_MAKE_{TLVS|FLAG_FIELDS}_PARSENODE makes TLVs and flag-fields parse nodes. PANDA_MAKE_TABLE makes a protocol table. Protocol nodes contain rules for parsing protocols which are mostly invariant. The PANDA-C library includes a set of "canned" protocol node definitions that can be used when creating a parse node for a customized parser.

Figure 9:
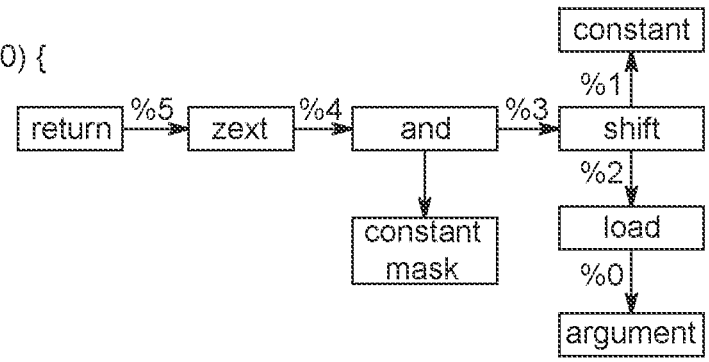
FIG. 9 illustrates pattern matching extensions in LLVM.

FIG. 9 illustrates a pattern matching extension in LLVM. On the left is an example of LLVM IR. On the right, it is one of the pattern matching expressions represented in a graphical form showing how instructions are matched, how the Static Single-assignment form variables interconnect the instructions and how this is represented in the pattern matching expression.

The PANDA parser compiler infrastructure consists of two phases: 1) A compiler frontend that converts parser source code or other representations of parsers to Common Parser Representation, and 2) A compiler backend that transforms CPR into executable images for different back-end targets. FIG. 4 illustrates the compiler frontend and backend for the PANDA parser. 3.3.1 PANDA-C Compiler The PANDA-C compiler is a frontend compiler to compile parsers written using the PANDA-C API. The compiler interprets the data structures and extracts parser semantics from imperative code to represent it in declarative CPR.

As shown in FIG. 9, we created a C++ extension to represent pattern matching directly in C++ code, and use this to match LLVM IR and Clang's ASTs [xx] in C++. The compiler extracts semantics of how the data in packets is accessed and how it is used in the parser. The pattern matching C++ extension is very powerful, and allows simple pattern matching expressions in C++, and uses concepts as in a generic programming paradigm to allow adapting it to every possible graph representation, such as LLVM IR and Clang AST trees.

The backend can be divided into two phases, this division allows flexibility and gives more optimization options to be applied at the right abstraction level for better performance. The backend starts with a simple conversion from CPR, a declarative intermediate representation, to an MLIR representation, with a dialect defined specifically to define parsers as a higher abstraction concept. This allows the MLIR output to be used for augmentation by other tools, such as debugging injection and optimization passes that can happen at a conceptual level of the parser definition. The second phase of the backend compiler reads the MLIR representation, applies optimization passes and translates MLIR to LLVM IR. If the target supports parser instructions, then the compiler will translate the high-level MLIR parser dialect into parser intrinsics (internal functions defined in LLVM). The LLVM backend will generate parser instructions from the intrinsics when it compiles the LLVM IR translated code.

The PANDA Parser is implemented in hardware as an Instruction Set Architecture (ISA) extension for RISC-V CPUs [XX]. The extension defines a set of domain specific parser instructions and a register file with parser registers that parser instructions act upon. Parser instructions are highly optimized for performance, and Section 5.2 provides a performance evaluation of parser instructions. Parser instructions are prefixed by prs. in assembly. There are thirty-two sixty-four-bit parser registers. Their logical names are in italics with the first letter capitalized in this paper, and their names in assembly start with a 'p' and are denoted in bold lowercase. Parser registers may have sub-fields that are denoted by Reg.Field. The full specification of PANDA Parser instructions is in [XX]. In this section we provide an overview and example assembly.

There are several classes of parser instructions. •Move instructions: prs.mv moves a parser register to another parser register, prs.mv.x.p moves an integer register to a parser register, prs.mv.p.x moves a parser register to an integer register. •Load instructions prs.load* loads a header field at some offset from the current header (pcurptr) or data header (pdatptr). Variants allow loading one, two, four or eight bytes. •Length instructions prs.lenset* set the length of the current or data header and perform a bounds check. There is a variant to compute the length function value. •Lookup instructions perform protocol number lookup to return the next node. prs.cam* does a CAM lookup, prs.arr* does an array lookup. •Loop ins. prs.loadtlvloop* and prs.*loop, support TLVs and flag-fields loops. •Store instructions store data in a metadata buffer. The destination can be common metadata or a frame. •Compare instructions (prs.cmpi*) compare values in the accumulator to immediate values.

• Run thread instruction. prs.runthread schedules an external thread to perform backend processing.

Parser instructions are used to manifest the parser engine. Parse nodes are processed as a sequence of instructions similar to a function, however, instead of being terminated by a return instruction, a .stp instruction indicates the "end-of-node". The Next register indicates the action to take at end-of node. If Next is not NULL then it contains the address of the next parse node to process, else if Next is NULL that indicates parsing is complete. CAM and array lookup instructions are used to lookup the next protocol and set the Next register.

Figure 10:
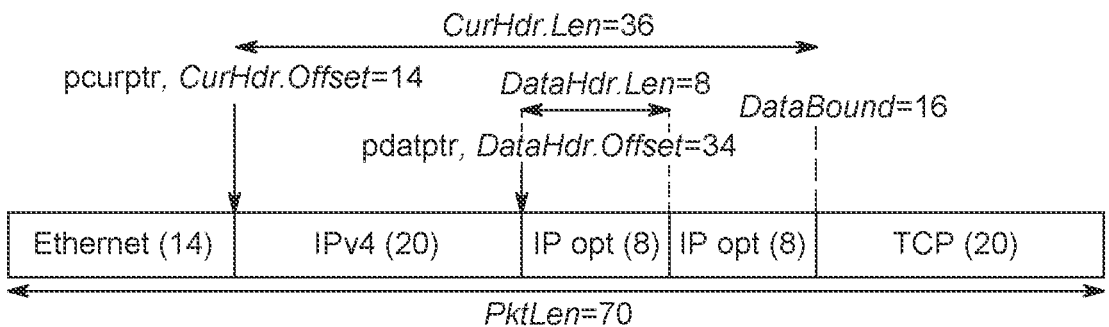
FIG. 10 illustrates parsing state registers.

Parsing state is mainly contained in a few parser registers. CurHdr.Offset and CurHdr. Len give offset and length of the current header. DataHdr.Offset and DataHdr. Len give the offset and length of the data header. PktLen holds the length of the packet, and DataBound holds the maximum length for data. FIG. 10 shows an example of how these registers might be set when parsing a packet. pourptr and pdatptr are pseudo registers used to refer to the pointer of the current header or data header and are used as operands in load instructions. TLVs and flag-fields parsing are implemented using loop instructions. prs.loadtlvloop and prs.flagsloop initiate loops for parsing TLVs and flag-fields. These instructions iterate over their respective data items, and following instructions process the items. These data items are referenced by DataHdr and pdatptr.

Figure 11:
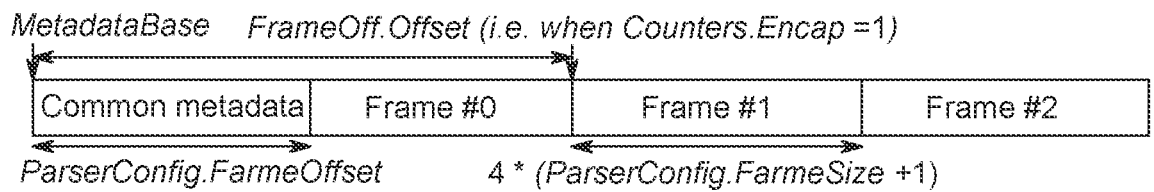
FIG. 11 illustrates metadata configuration.

A program may perform a lookup on the TLV type or flag-field and process the data item by invoking a TLV or flag-field parse node (similar to calling normal a function). .stp instructions indicate the last instruction in a node or loop iteration. Common end of node processing is done to jump to the next node, continue a loop, or exit when parsing is complete (jump to okay-target for instance). The metadata layout is given in the ParserConfig register, and FrameOff.Offset contains the offset of the current metadata frame (FIG. 11). For each encapsulation layer encountered in a packet, the frame size is added to the frame offset. Parse nodes for encapsulation are marked in protocol lookup table entries. Counters. Encap tracks the number of encapsulation levels in a packet. Other operational registers include PktInfo that contains meta information for packets, NodeLoopCnt that contains a count of loop iterations, Counters provides user defined counters, and Accum which is a general purpose register. Several registers contain target node addresses for exceptions, terminal nodes, and wildcard nodes. These include OkayTarget, FailTarget, Wildcard, AltWildcard, AtEncap, PostLoop, and CompareFalse.

Configuration registers are used to set various properties and limits. These include ParserConfig, LoopSpec, TlvSpec, Counter*Config, The example program below implements the parser defined in CPR in Section 3.1.

```
my_parser:
eth_node:
1 prs.load.h paccum, pcurptr+12
2 prs.cam.h.stp pnext, paccum[0], 1
ipv4_node:
3 prs.load.b paccum, pcurptr
4 prs.lensetmin.n pcurhdr, paccum[1], 4:20
5 prs.load.b paccum, pcurptr+9
6 prs.cam.b.stp pnext, paccum, 2
tcp_node:
7 prs.load.b paccum, pcurptr+12
8 prs.lensetmin.n pcurhdr, paccum[0], 4:20
9 prs.tlvfastloop pdathdr, pdatptr, 1:0
10 prs.cmpnei.h.stopsub paccum[1], 0xA08
11 prs.load.w paccum, pdatptr+2
12 prs.store.w.stp pmdbase+4, paccum
gre_node:
13 prs.load.w paccum, pcurptr
14 prs.cam.h pnext, paccum[1], 1
15 prs.andmask.b paccum[0], 0xF0
16 prs.flagsloop.rev pflags, paccum, paccum
17 prs.camjumploop.b.stp paccum[0], 3
gre_key_id:
18 prs.storereg pmdbase+8, dathdr
gre_flgfld_node
19 prs.lenset.stp pdathdr, 4
okay:
20 prs.runthread.stp 17
```

The CAM table would be programmed as below. Note the lookup key has two parts: the protocol number to match in the low order 16 bits, and a table identifier in the high order 4 bits. When a lookup is done the full key needs to be exactly matched—this allows one CAM table for all uses.

Before executing this sequence, a few configuration registers would be set. TLVSpec would be configured for TCP options. Okay Target would be set to the address of okay. Thread #17 refers to a backend processing function when the parser exits with an "okay" status. Parsing commences at the root node which is ether_node. Lines #1-2 load and lookup the Ethertype in CAM from sub-table 1; the load implicitly sets and checks the header length (14 for Ethernet). The .stp qualifier in Line #2 indicates the "end of node", and a jump is made to the Next node set by CAM lookup. In ipv4_node, Lines #3-4 compute and check the IPv4 header length—this implements the HLEN function for IPv4

Lines #5-6 look up the next protocol node, and a jump is made to the Next node set by CAM lookup since Line #6 is a .stp instruction. In tcp_node, lines #7-8 compute and check the TCP header length (implements the HLEN function for TCP). Lines #9-12 implement a TLV loop to parse TCP options per the processing in FIGS. 5A-C. prs.tlvfastloop in line #9 is an optimized instruction for looping over TLVs that have a single type byte and single length byte which is common in many IP protocols including IPv4 options, TCP options, and IPv6 Extension Header options; the instruction transparently handles single byte padding and EOL options, and computes and sets the TLV length in DataHdr.Length. For each option, prs.tlvfastloop sets the option type and length in Accum to be processed by subsequent instructions.

Line #10 compares the option type to 8 and the option length to 10 (type and length of the Timestamp option), if there is a not match then processing loops back to Line #9, else if there is a match then lines #11-12 record the timestamp in metadata. The .stp at line #12 indicates the end of the loop iteration and the thread loops back to line #9. When all options have been processed the parser exits at the prs.tlvfastloop instruction in line #9 since TCP is a leaf node. In gre_node, line #13 loads the base four GRE byte header which implicitly sets and checks the minimum length. Line #14 looks up the EtherType and sets the result in Next. Line #15 prepares the GRE flags by masking them, and lines #16-17 perform a flag-fields loop (per processing in FIGS. 5A-C. The prs.flagsloop.rev instruction loops over the GRE flags, and each set bit is looked up in a CAM table. If flag 0x40 is matched then gre_keyid_node is invoked and records the offset of the sequence number in metadata. Other flags map to gre_flgfld_node. Line #19 sets the data length to four bytes for all the GRE flag-fields (including the KeyID), this has a side effect that four bytes are added to the current header length to account for the flag-fields and is used in computing the length of the GRE header. When the loop completes, a jump is made to the next node set by the CAM lookup in Line #14. The okay node is invoked when the parser exits. In line 20, Function #17 is run in a thread to do post parser processing.

FIG. 12 illustrates a block diagram of the Parser Unit in Avispado CPU. The Parser Unit contains the parser register file (Pregs), a CAM for protocol lookup, and an FSM that drives instruction execution. The parser unit interacts directly with the Load/Store unit and Branch Units (for transitions between parse nodes).

Figure 13:
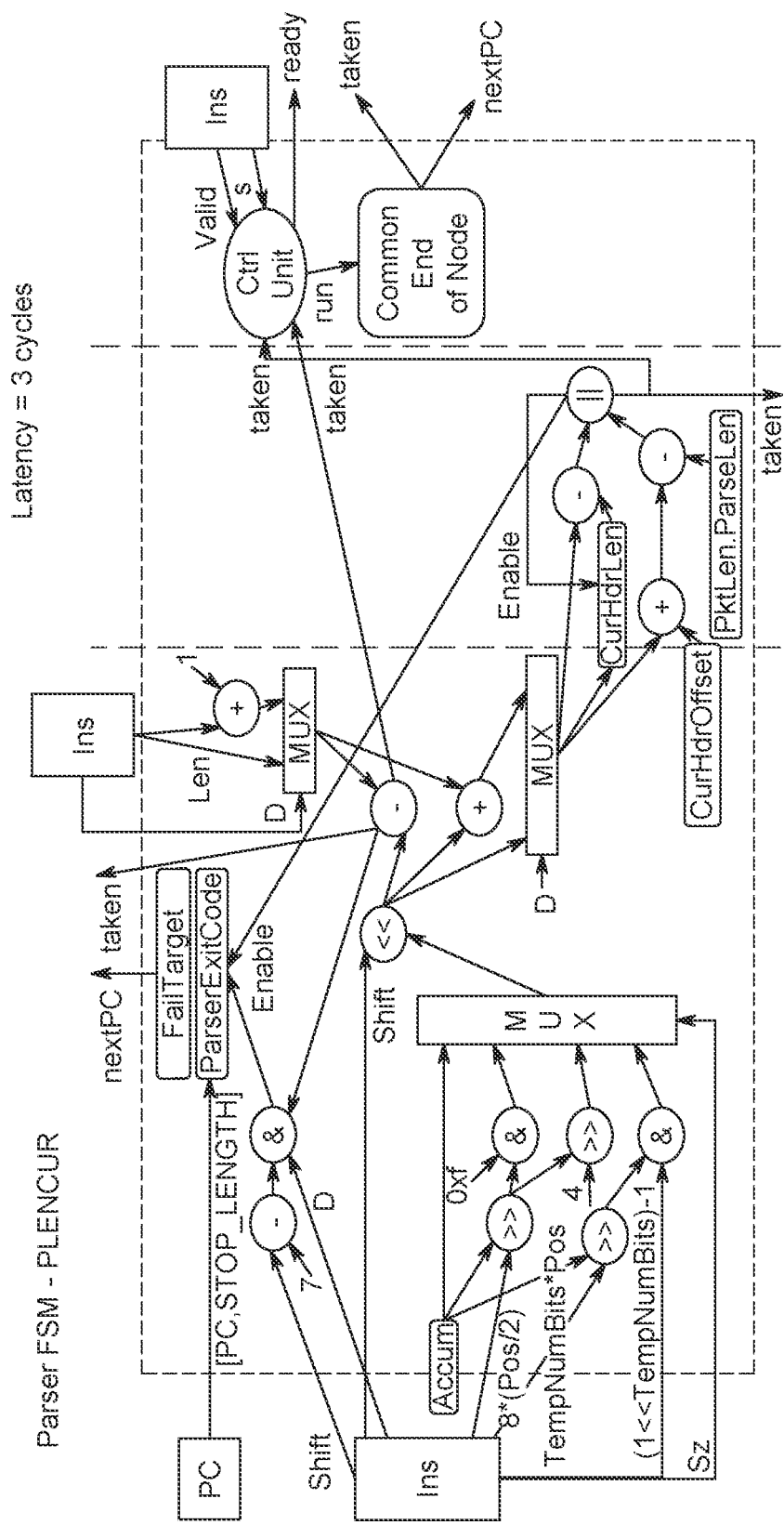
FIG. 13 illustrates a logic diagram.

FIG. 13 illustrates a Logic diagram for prs.lenset instruction. This diagram shows the execution logic for the instruction to compute and check the length of the current header. The instruction executes in 3 cycles: the first cycle computes the header length, the second checks that the length is in the bounds of the packet, and the third cycle sets the PC and performs Common End of Node processing (logic that handles .stp functionality).

System may include a hardware parser in a SemiDynamics Avispado RISC-V CPU in a Xilinx U200 FPGA [XX]. The design is shown in FIG. 12. The parser is implemented in a Parser Unit that acts as a co-processor to the main CPU. The Fetch stage of the RISC-V instruction pipeline decodes instructions, and if an opcode indicates a parser instruction then the Parser Unit is invoked. The Parser Unit implements the Execution stage of the pipeline for parser instructions. The Parser Unit is includes: •The Parser FSM that implements the logic of parser instructions. An example of instruction logic for prs.lenset is shown in FIG. 13. •The parser register file (Pregs in FIG. 12). •A CAM with a 20-bit key and a 32-bit target (see CAM encoding in Section 4.3). The parser unit requires a few critical interactions with core CPU logic: •Data can move between integer and parser registers. •Access to the Load and Store unit (LSU), for loading from the parse buffer, and storing to metadata buffers. •The parser sets the Program Counter (PC) (next instruction) for jumps to next node and exceptions.

Figure 14:
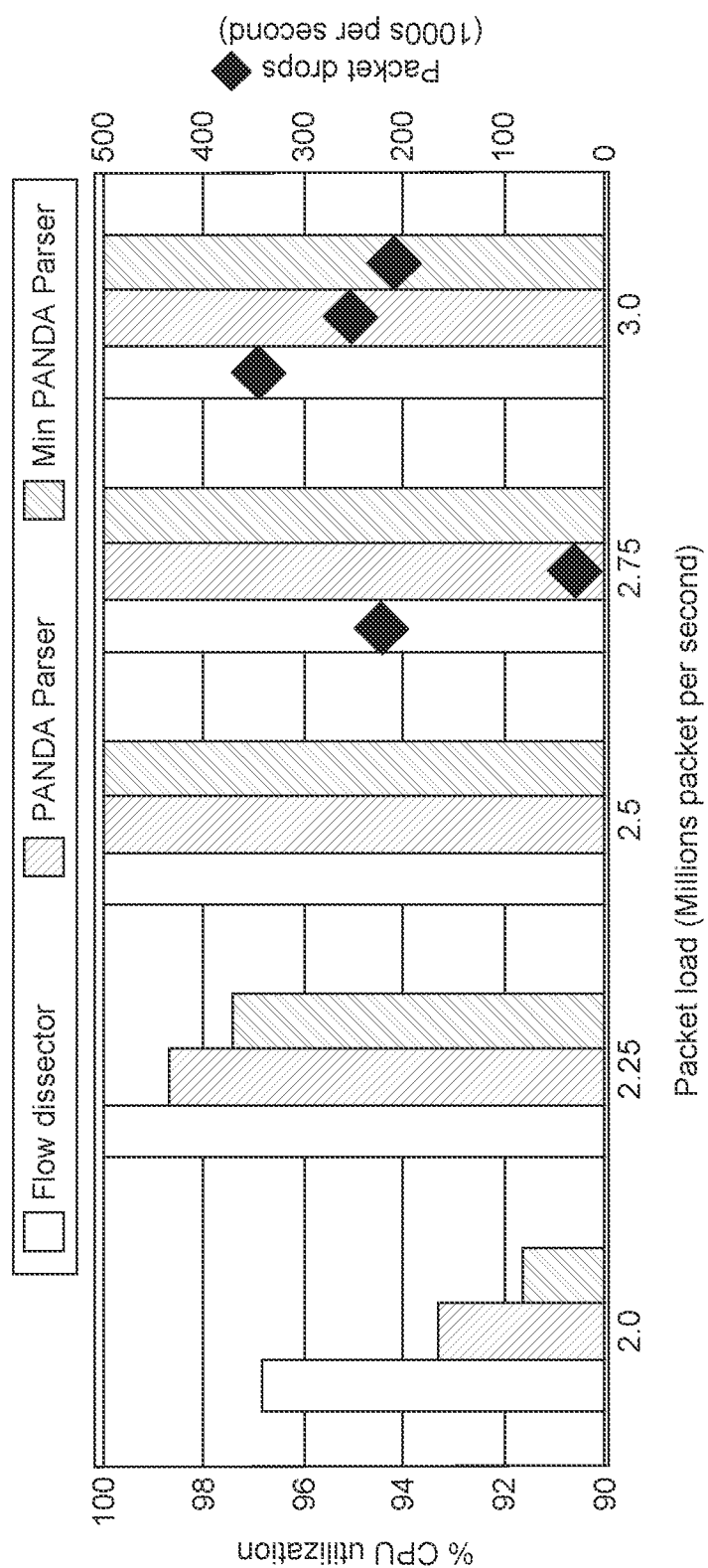
FIG. 14 illustrates a graph of the software parser performance.

FIG. 14 illustrates software parser performance. This graph compares parsing performance of flow dissector, the PANDA parser, and a minimal PANDA Parser that only implements protocols parsed in the test. Each of the three variants were subjected to various packet loads. In each case, CPU utilization and packet drops are reported (lower is better for both).

Figure 15:
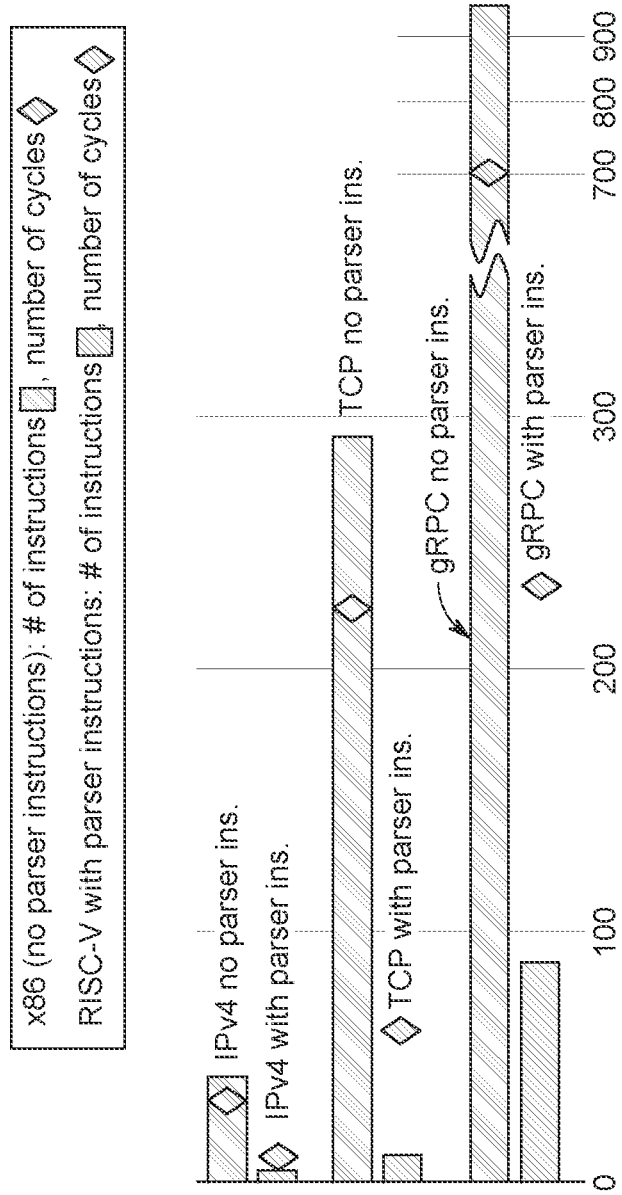
FIG. 15 illustrates a graph of the parser performance.

As a baseline for performance measurement, we ported the Linux kernel flow dissector to user space. Flow dissector [xx] is a software parser in C code that performs protocol parsing and metadata extraction in a similar manner as the PANDA parser. We implemented an equivalent parser with the PANDA parser that supports the same protocols and performs the same metadata extraction. The PANDA parser instance is compiled into user space C code, we employ a common test program to inject packets into both parsers, and all C code is compiled with the same options to make an "apples to apples" comparison. FIG. 15 shows that the PANDA parser outperforms flow dissector. There are several reasons for this: •A declarative parser representation facilitates compiler optimizations such as loop unrolling, constant folding, branch and dead code elimination, inlined functions, and switch statement optimizations. •The parser is easily customizable to only support the set of protocols needed for a particular use case. •Common processing and bookkeeping are abstracted out of the frontend source code so that the compiler handles these in a consistent and optimized fashion. •The compiler can optimize for the specific backend software target. For instance, when compiling to eBPF, the compiler optimizes for the eBPF VM and verifier.

The system extrapolates to make performance projections for parser instructions in CPU hardware. A single parser instruction replaces between five and three hundred standard RISC-V integer instructions, with an expected average ratio of parser instructions to equivalent integer instructions to be about 1:15 and expected instructions Per Cycle, or IPC, for parser instructions to be about 0.4 on average, and an IPC of 1.4 for integer instructions.

FIG. 15 illustrates parser performance. Test cases are IPv4, TCP with options, and a gRPC example with nested protobufs. For each case, the number of instructions and cycles are shown for an x86 implementation using plain instructions, and an implementation in RISC-V with parser instructions. Note that lower is better.

FIG. 15 compares parsing performance between the parser instructions and plain x86 for different protocols. FIG. 16 shows a detailed comparison for parsing the IPv4 header. There are several design characteristics in parser instructions that promote flexibility with high performance: •Parser instructions are Domain Specific so they can be optimized for a particular purpose. •A single instruction can perform multiple tasks, and can have side effects (like setting the PC). Instructions can have substantial gate-level internal parallelism. •Fewer instructions that perform the same amount of work reduces pressure on the CPU instruction cache. •Parser registers maintain parser specific state across instructions. •There are no explicit branch instructions. Branches are and exceptions are side effects of instructions. •The use of CAMs lookups is much faster than any approximation of the functionality in software. •Parser and integer instructions can be intermixed to help achieve the "Turing complete" goal in Section 1.

FIG. 16 illustrates CPU instructions for parsing IPv4. The blue boxes show the source code and assembly for plain x86, the orange boxes show the source code and assembly for the PANDA parser.

A good example of a well featured software parser is the Linux kernel flow_dissector [XX]. Flow dissector is a kernel function that parses packets to extract metadata and is used in various places including Receive Packet Steering [xx] and TC Flower [xx]. Flow dissector parse many protocols including several of those in FIG. 1. While flow dissector has proven useful, it has also been problematic. It has three major problems: 1) Flow dissector is written in imperative C code whereas a declarative representation is more suitable—this increases code complexity which has led to several bugs. 2) Modifying the kernel is a long process and there is no real support for parsing custom protocols. 3) There is no way to offload parsing to domain specific hardware.

The PANDA Parser provides an alternative that addresses the issues. It is proposed that a PANDA Parser compiled into eBPF could replace the Linux flow dissector [XX]. As discussed in section 5.1, the PANDA parser has better performance than flow dissector. The PANDA parser is also offloadable due to the Common Parser Representation that decouples the frontend language from backend targets. 6.2 P4 and the PANDA Parser Programming Protocol-Independent Packet Processors, or P4, is a high-level language and hardware environment for packet processing. P4 includes a parser that is programmed in the P4 language. While P4 has made inroads in datapath programmability, it has several drawbacks that impede adoption. P4 was originally designed for network routers that are concerned with a limited set of protocols, whereas host networking requires a wider range of protocol support, including support for TLVs and flag-fields that P4 naively lacks. P4 intertwines programming language with hardware so it is difficult to support new backend targets, or use alternative frontend languages. The biggest impediment is the use of a Domain Specific Language replete with its own build tool chain and debug tools—these tend be unfamiliar to programmers and have a steep learning curve resulting in high development and maintenance costs.

The PANDA Parser can productively augment P4. P4 could be compiled to the Common Parser Representation IR, and the CPR representation could be compiled to P4 hardware, thereby facilitating flexibility at both the frontend and the backend. If a user is already writing programs in P4, the model expands the set of potential hardware targets. Similarly, if a user has P4 hardware they could program it using alternative languages of their choice.

The SiPanda Parser is a domain specific hardware parser for parsing serial data headers such as network packets. The SiPanda Parser builds on top of the base SiPanda architecture and leverages the program flow it defines.

There are two variations of the SiPanda Parser: the first uses 32-bit RISC-V custom instructions mapped into the custom-0 primary opcode (0xb). The second uses 64-bit RISC-V custom instructions using the opcode space defined for instructions larger than 32-bits. This specification describes the 32-bit hardware parser instructions; the 64-bit variant will be specified in a companion document.

This specification introduces a new register file to RISC-V denoted "parser registers" or just p registers. An instruction to move data from an integer register to a parser register, and one to move data from a parser register to an integer register are defined per the coprocessor specification. Coprocessor instructions use custom-3 opcode (0x7b), and the parser specific coprocessor instructions are denoted by cpreg equal to zero.

This specification covers four topics: new parser registers, memory model, alignment, CAM, and helper macros, the normative description of the parser instructions including the instruction format, semantics, pseudo code, and assembly for the instructions, background information about the PANDA parser, mapping to hardware instructions, example of key parser parameters in action, pseudo data extraction instructions, and a sample program with disassembly, and description of the interaction between the Parser and SPDU. This includes the parser event loop, receiving "start parser" messages from the cluster frontend, and mechanisms to request scheduling of worker threads, and sending messages to the cluster scheduler to start a thread set for processing a PDU Pseudo code describes instruction semantics in courier font. Hardware names for parser registers have the first letter capitalized and are in bold; for example: Accum. Assembler ABI names for parser registers are lower case, start with a 'p' and are printed in italics; for example, paccum. Temporary variables in pseudocode are prefixed by "Temp". Field names in instructions are capitalized and italicized, for example: Address.

Hardware instructions are denoted by all capital letters, in bold and italics, and prefixed with 'P'; for example PSTORE. The mnemonics for assembler instructions and any fixed fields for instructions are in bold typeface and variable arguments for assembly instructions are in italics and enclosed by < > brackets; for example:

prs.loadsb paccum, pcurptr+<offset>, <blen>:<shift>

A one character selector in assembly descriptions is denoted by a set of characters enclosed by [ ] brackets—for example, prs.loadsb.[bhw] pflags, pdatptr+<offset>, <blen>: <shift> indicates [bhw] is replaced by b, h, or w. Optional components of an instruction are enclosed by { } brackets—for example prs.loadsb pflags, pdatptr+<offset>, <blen>{: <shift>} indicates that :<shift> is optionally present.

Some registers have a structure containing some number of bit fields. In pseudo code fields of structured registers are denoted by <register>.<field>; for example, LoopSpec. MaxNon refers to the half-word at bits 16 to 31 of register LoopSpec. Register fields can be read or written in pseudo-code where the appropriate bit operations are performed on the fields.

An example read operation could be denoted:
Temp=LoopSpec.MaxNon;
which is equivalent to:
Temp=(LoopSpec>>16) & 0xFFFF;
And an example store operation might be denoted:
LoopSpec.MaxNon=Temp;
which is equivalent to:
LoopSpec=(LoopSpec & ~(0xFFFF<<16)) ((Temp & 0xFFFF)<<16)

Common macros and functions may take some number of arguments that are used in the pseudo code. The notation for a macro argument is _ARG_Name, and if the argument is derived from an instruction field then the notation is _ARG_Name_. For example, the CAM lookup macro has logical prototype:

CommonCAMLookup(_ARG_Value_, _ARG_Sz_, _ARG_Pos_, _ARG_F_, _ARG_Share_)

where the arguments for _ARG_Sz_, _ARG_Pos_, _ARG_F_, and _ARG_Share_ are derived from the Sz, Pos, F, and Share fields in a CAM instruction.

In macros, ## is used to represent token substitution from arguments in variable names (this is similar to use of ## in the C preprocessor). For example, if a macro is invoked with the _ARG_Cntr_ argument set to 3 then the register field Counters.Cntr ##_ARG_Cntr_ would be Counters.Cntr3 after the substitution.

The parser works on data being delivered as a stream or serial data. It is assumed that this data will not be modified while the parser is working on it. This means that the parser can maintain a buffer of incoming streaming data with no coherency checking.

The parser's 32-bit instructions can only target 4-byte aligned targets. If 16-bit instructions are supported and being mixed in, then a 16-bit NOP may be required to make sure the target of any parser instruction is 4-byte aligned. Note that in an assembler, .balign 4 may be used to align 32-bit parser instructions.

The 64-bit instructions must be 8-byte aligned, which means that if they are mixed with 32-bit instructions a NOP may be required to meet alignment requirements. The target of 64-bit instructions are also 8-byte aligned. Note that in an assembler, .balign 8 may be used to align 64-bit parser instructions. 64-bit instructions and 32-bit instructions can branch to each other and fall through to each other in execution as long as alignment rules are followed.

Addresses are assumed to be sixty-four bits, including any PC targets, pointers to the packet payload in external memory, pointers to the metadata and parsing buffer header data, and pointers to other memory used by the parser such as the lookup array.

The CAM returns instruction addresses as relative offsets. These instruction base relative addresses are encoded in twenty-four bit values. For example, a fully qualified absolute address is derived from a twenty-four bit offset with the canonical base address for the parser as: ParserInstrBase|4*<24-bit address>

PC relative addresses, such as that expressed in the PNEXTNODE instruction, are encoded as sixteen bit values. A fully qualified absolute address is derived as:

$$PC + (\langle 16\text{-}bit \text{ address}\rangle \ll 2)$$

The PLOAD instructions load one byte, one halfword (two bytes), one word (four bytes), or one double word (eight bytes) into a parser register. The source memory is the "packet buffer" which has a base address in PktHdrBase. This memory is the only memory read by parser instructions and is not written (i.e. it is read-only memory from the parser instructions' perspective).

The PSTORE instructions store one byte, one halfword (two bytes), one word (four bytes), or one double word (eight bytes) from a parser register or immediate value. The destination memory is a "metadata frame" which has a base address derived by adding MetadataBase and 4*FrameOffFnunSeqno.FrameOffset register values, or the "common metadata" (general metadata for the whole object being processed) which has a base address in MetadataBase. This memory is the only memory written to by parser instructions and is not read (i.e. it is write-only memory from the parser instructions perspective).

Sub-registers allow referencing byte, nibble, and word components of a register explicitly in instructions. Several parser instructions use sub-registers. There are two parameters to describe a sub-register: size and position. Size and position are expressed in the assembly for an instruction and set the Sz and Pos fields in the instruction code.

Assembly Instructions using sub-register operands are annotated with size and position information. In an instruction mnemonic definition, size is indicated by [nbhw] and position is indicated by <reg>[<pos>]. For example, the mnemonic format for the prs.lenset instruction is:

prs.lenset.[nbhw]{.stp}pcurhdr, paccum{[<pos>]} and an example use might be:

prs.lenset.b pcurhdr, paccum[6]

which has the effect of computing the length of the current header based on byte number six in the Accum register.

If {[<pos>] is in the menonomic format and [<pos>] is not present in an instruction, then the sub-register position is taken to be zero. For instance:

prs.lenset.b pfcurhdr, paccum is equivalent to prs.lenset.b pcurhdr, paccum[0]

FIG. 17 provides the possible sizes with the value set in the Sz field for a sub-register instruction, the assembly mnemonic qualifier for the size, and the range of values for the position, and the Sz values for instructions allowing nibbles and those allowing full registers.

For most instructions that use sub-registers, the Sz field corresponds to 0 for nibbles, 1 for bytes, 2 for half-words, and 3 for words (shown in the second to last column of the above table); such that the number of bits in the sub-register value is:

$$4*(1 \ll Sz)$$

For parser load and store instructions, the Sz field corresponds to 1 for bytes, 2 for half-word, 3 for word, and 0 for double word (shown in the last column of the above table); such that the number of bits in the sub-register value is:

$$4*(1 \ll Sz) \text{ // For } Sz == 1, 2, \text{ or } 3 \text{ or } 64 \text{ // For } Sz == 0$$

The instructions that use the alternate meaning for Sz==0 are denoted as such below.

The position of a sub-register indicates the position of the nibble, byte, half-word or word. Sub-registers are counted from the first byte in memory being the zero position (low order byte in little endian word). Nibbles are numbered such that the high order four bits in a byte are a lowered number nibble than the four low order bits of a byte; e.g. nibble number zero is the four high order bits of the first byte, and nibble number one is the low order four bits of the first byte. FIG. 18 illustrates the position numbering for nibble, byte, half-word and word sub-registers.

A side effect of several parser instructions is that they may set the PC to perform a jump. The most common jumps occur at the end of a node when the stop bit (S-bit) is set in an instruction, and jumping to a handler returned by a CAM lookup. The stop bit processing is described in the "Common_End_of_Node" section below. The other cases of jumps are for exception and error handling. Note that there are no CPU generated traps or interrupts defined in this architecture.

The hardware parser assumes the data for parsing is streamed into cluster and CPU local memory using the data streaming mechanism defined by the SiPanda Base Architecture. The headers will be in the region of memory defined by the system with some base address. The PktHdrBase register contains a pointer to the base address for the packet headers of one packet in the stream receiving memory region, and the PktLen register contains the length of the whole packet in PktLen.AllLen, and the length of the packet headers in PktLen.ParseLen. As data streams in, these values are monotonically increasing until all the data is received or the limit of the parser buffer is reached in the case of PktLen.ParseLen. PktLen.F is a flag indicating that whole packet is received and PktLen.AllLen is at its final value, PktLen.P is a flag indicating that either whole packet is received of the size of the parsing buffer has been received (ParserConfig.PrsBuff) and PktLen.ParseLen is at its final value.

In the current design of the parser, it is assumed that packets are received in their entirety so when the parser runs PktLen.ParseLen and PktLen.AllLen are set to their final values and PktLen.F and PktLen.P are set.

The headers buffer, metadata block, and work item that the cluster front end sends to the parser constitute the packet state necessary for parsing. A parsing header buffer contains the headers of a packet for parsing. The size of an allocated buffer is in ParserConfig.PrsBuff (the real byte size is (ParserConfig.PrsBuff+1)*64). Metadata is any information that is derived from a packet as it is parsed and the data is saved in a "metadata block" for consumption by down stream processing. Metadata blocks are allocated by the cluster front end from shared cluster memory with some base address. The allocated size of a metadata block is (note rounding up to sixty-four bytes): ((4*ParserConfig.FrameOffset+4*(ParserConfig.FrameSize+1)+63)/64)*64.

Figure 19:
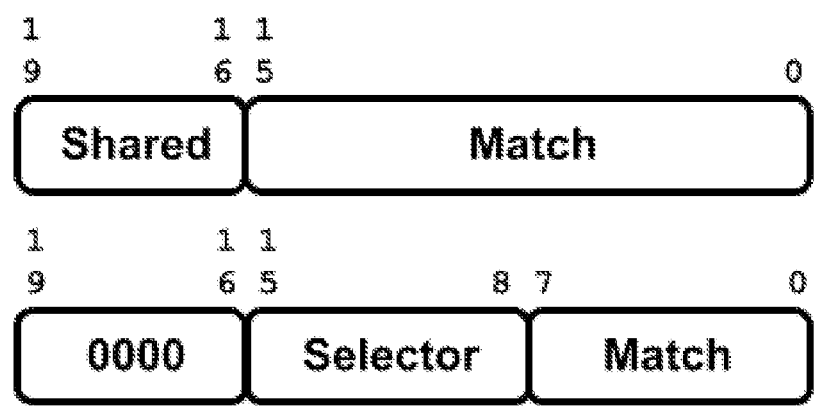
FIG. 19 illustrates one embodiment of the CAM Key structuring.

A high performance CAM is integrated into the CPU and is used for protocol number lookups to determine the next node, TLV type lookups for processing TLVs, flags lookup for processing flags, and general CAM lookup to load a value into Accum. A CAM entry has a 20-bit key and a 32-bit target. The target may be an encoded address or a parser code. The CAM Key is structured in one of two ways as indicated by FIG. 19 four high order bits:

```
union { struct { Match: 16 Shared: 4// Set to non-zero
} Shared
struct {
Match : 8
Selector: 8
Shared: 4   // Set to zero
} NonShared }
```

If the high order for bits of the key are non-zero, then the key is for a shared table and the Shared structure in the above union for the key is used. The Shared field indicates one of fifteen tables numbered one through fifteen, and the Match field is the primary field to be matched which can be up to sixteen bits in length (for instance this could be an 8-bit or 16 bit protocol field such as an IP protocol number or EtherType respectively). Shared tables are used for common lookups in different protocol nodes; for instance the lookup for EtherType might be shared between the root Ethernet node and a node for GRE encapsulated Ethernet. Also, if the protocol lookup requires more than eight bits to match then a shared table is used.

If the four high order bits of the key are zero, the Selector field is used to select a 8-bit logical, non-shared, CAM sub-table. The Match field is the primary field to be matched which can be up to eight bits in length (this could be an 8-bit protocol field such as an IP protocol number). The selector for a non-shared table is derived from the PC of the instruction for a CAM lookup as:

$$TempSelector = (PC \ll 6) \& 0xFF00$$

The selector for two different non-shared tables must be unique. If the PC derived selector for two different tables is identical, meaning the addresses of the respective instructions invoking the CAM are equal in the second through the ninth bit, then this is a non-shared keyed collision and it is not allowed. If a non-shared collision occurs then one mitigation is to insert nop's before the second instruction to increase the value of the PC and selector.

Figure 20:
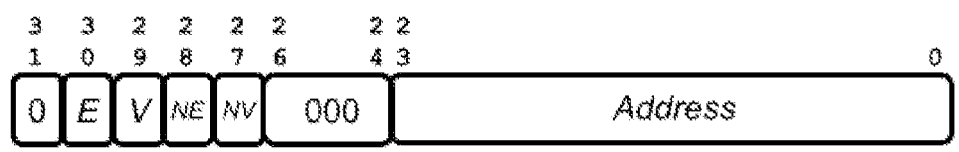
FIG. 20 illustrates formatting for the address of the next node instruction.

When the target of a CAM entry is an address, for instance the address of the next node instruction, then it is commonly formatted as FIG. 20 whereby Address is an encoded 24-bit relative address of an instruction. The fully qualified address can be derived by: TempAddress=ParserInstrBase|(4*Address) Bits 24 through 30 are control bits. They include: E: the "encapsulation bit" indicates that when transitioning to the next node the encapsulation level is incremented V: the "overlay bit" indicates that when transitioning to the next node overlay processing is performed (don't change pointers or offsets) NE: the "next-encapsulation bit" indicates that when transitioning from the next node to its next node the encapsulation level is incremented NV the "next-overlay bit" indicates that when transitioning from the next node to its next node, overlay processing is performing (don't change pointers or offsets)

Figure 21:
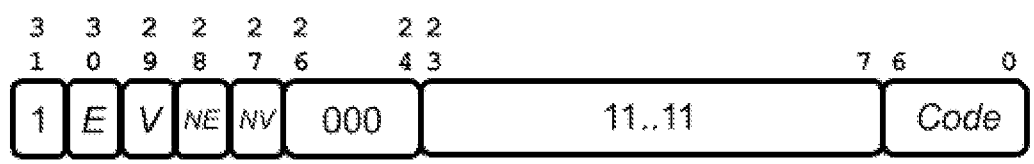
FIG. 21 illustrates formatting when target of a CAM entry is a code.

When the target of a CAM entry is a code, it is formatted as FIG. 21:

Code is a seven bit code as defined in the Parser Codes section below. The E, V, NE, NV have the same meaning as described above. Maintaining the set of control bits when a code is conveyed allows setting control bits before an address is determined. If the code is returned to the caller, e.g. being set in ParserExitCode.Error, the control bits are filled in with 1's so that the whole value is a number between −1 and −127 (i.e. the code is a negative value sign extended to the width of the data type in use).

In addition to the CAM, a high performance lookup array is integrated into the CPU and is used for protocol number lookups to determine the next node, TLV type lookups for processing TLVs, flags lookup for processing flags, and general Array lookup to load a value into Accum. Array lookups are appropriate where the key value space is a small number of bits (about one to eight bits). The advantage of an array over a CAM is that an array is a simple indexed memory lookup; the downside is that all possible index values need to be set in the array.

The lookup array is an array of 32-bit values. The array value may be an encoded address or a parser code. The encoding of an address or code in the target is the same as the encodings described for the CAM above. A single lookup array can hold multiple sub-arrays for different uses. A sub-array is identified by a base index and the number of entries in the sub-array. There is no concept of an "array miss" so all possible values in the index range for a table must be set. The default array value is PANDA_STOP_OKAY code.

FIG. 22 shows a lookup array with two sub-arrays. The first take a two bit key as the index, and hence there are four possible values; the send has a three bit key so there are eight possible values.

The Hardware Parser defines a new set of 64-bit registers, referred to as p regs. In assembly these registers are preceded by 'p' as illustrated in FIG. 23 and FIG. 24.

Several parser registers employ an encoding to contain either an address or a parser code. The base encoding is thirty-two bits where the high order bit, bit 31, indicates an address or code is encoded. When bit 31 is zero a twenty-four bit relative address is encoded, and when bit 31 is one a code is encoded. To represent the encoding in a sixty-four bit value, bit 31 is signed extended (PANDA parser codes are negative values −1 to −128 such that a code can be cast as a 16 bit, 32 bit, or 64 bit value by simple sign extension of the code in a signed byte). This is illustrated in FIG. 25. CAM and lookup array targets are thirty-two bits. The above encoding is used for CAM and lookup array target values to encode an address or a code in the thirty-two bit target value.

ObjectRef (p0, pobjrej) This register holds a fully qualified sixty-four bit opaque object reference (typically a pointer to the PvBuf in external memory for the current PDU). This value is initialized when the parser starts a new packet and is not changed as the packet is parsed.

Figure 26:
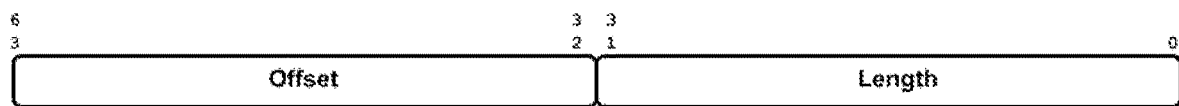
FIG. 26 illustrates an offset of the current header in the header data.

CurHdr (p1, pcurhdr This register holds the current header offset from the beginning of the packet for the current node being processed, and the header length of the current node being processed Offset, as illustrated in FIG. 26 is the offset of the current header in the header data, it is relative to PktHdrBase. To derive a pointer to the current header add PktHdrBase and CurHdr.Offset Length is the length of the current header. PktHdrBase plus CurHdr.Offset plus CurHdr.Length gives a pointer to the next header following the current header DataHdr (p2, pdathdr). This register holds the data offset from the beginning of the packet for the current node being processed, and the data length of the current node being processed (e.g. the offset is the offset of a TLV and length is the length of the TLV).

Figure 27:
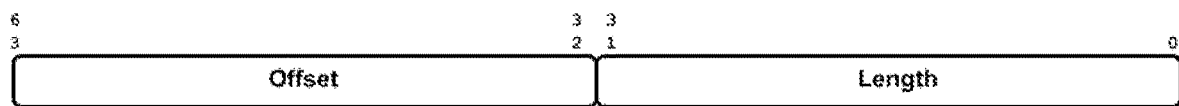
FIG. 27 illustrates an offset of the current data header in the header data.
Figure 28:
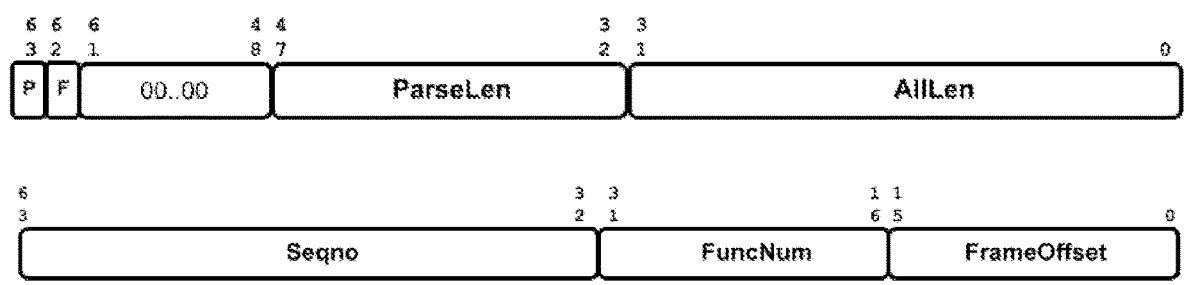
FIG. 28 illustrates encoding of both the parse buffer length and also the length of the whole PDU.

As illustrated in FIG. 27, Offset is the offset of the current data header (like a TLV) in the header data, it is relative to PktHdrBase. To derive a pointer to the current data header add PktHdrBase and DataHdr.Offset. Length is the length of the current data header. PktHdrBase plus DataHdr.Offset plus DataHdr.Length gives a pointer to the next data header, e.g. the next TLV, following the current one PktLen (p3, ppktlen) Length of the packet. This encodes both the parse buffer length (length of header data the parse can process) and also the length of the whole PDU. This is illustrated in FIG. 28.

```
struct { AllLen: 32 // Whole packet length
ParseLen: 16 // Length in the parsing buffer
Rsvd: 7
F: 1 // Final length of the packet
P: 1 // Final length of the parse length}
AllLen is the length of the packet
ParseLen is the length of the packets headers in the parsing buffer
F indicates that the final length of the packet is set
P indicates that the final length of the packet headers is set
```

FrameOffFnumSeqno (p4, pfofnsq)

This register holds the offset of the current metadata frame, the sequence number of the packet, and the function number to run. To derive a pointer to the current frame add MetadataBase and FrameOffFnumSeqno.FrameOffset. The sequence number is only set in the work item and not used operationally by the parser as illustrated in FIG. 28.

FrameOffset is the byte offset divided by four of the current metadata frame from the beginning of the metadata for the packet being processed. To derive a pointer to the current frame add MetadataBase and 4*FrameOffFnumSeqno.FrameOffset FuncNum is the function number to run in a worker thread. This is set by prs.runthread instruction before sending the work item to the cluster scheduler.

Seqno is the sequence number assigned to the packet by the dispatcher

Figure 29:
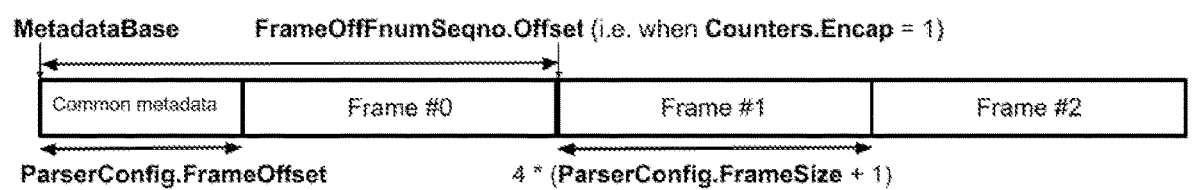
FIG. 29 illustrates format of the metadata and the relationship between MetadataBase, ParserConfig.FrameSize, ParserConfig.FrameOffset, Counters.Encap, and FrameOffsetSeqno.

The example diagram in FIG. 29 illustrates the format of the metadata and the relationship between MetadataBase, ParserConfig.FrameSize, ParserConfig.FrameOffset, Counters.Encap, and FrameOffsetSeqno.

In this example there is some space reserved for meta metadata which contains generic metadata for the whole packet, and three metadata frames of some configured size. MetadataBase plus 4*FrameOffFnumSeqno.Offset points to the second frame which indicates that the parser is currently processing the first level of an encapsulation and hence Counters.Encap is currently set to one.

PktInfo (p5, ppktinf)

Figure 30:
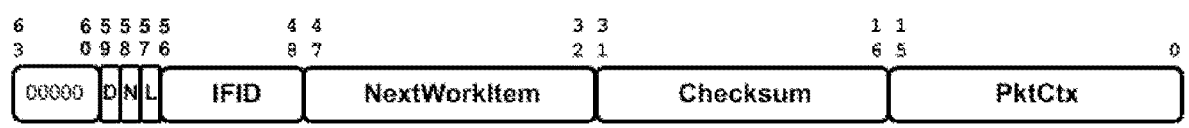
FIG. 30 illustrates general packet information for a created work item.

General packet information for a created work item. PktCtx is used to initialize PktHdrBase and MetadataBase. These values may be set by the parser, but otherwise are not operationally used in parsing. This is illustrated in FIG. 30

```
struct
PktCtx: 16 // Reference to packet state for the current object
Checksum: 16 // Packet checksum
NextWorkItem: 16 // Next work item in list
IFID: 8 // Interface ID
L: 1 // Last thread in thread set
N: 1 // Dont't kill thread
D: 1 // Data header
Rsvd: 5}
```

PktCtx is set by the cluster frontend. This refers to the allocated packet state for the packet being parsed. The value is used as an index in the packet header base memory and metadata base memory to get the header parsing buffer (where the header data is) and the metadata block, which are respectively PktHdrBase and MetadataBase. When the parser starts parsing a packet, these are initialized from PktInfo.PktCtx as:

PktHdrBase=SysHeadersBase()+ (PktInfo.PktCtx*size_of_parsing buffer)

MetadataBase=SysMetadatBaseo+ (PktInfo.PktCtx*size_of_metdata block) where SysHeadersBase( ) returns the base address of header buffers, and MetadataBase returns the base address metadata blocks (see description of SysHeadersBase( ) and SysMetadataBase( ) in "Helper macros and functions" section below.

$$size\_of\_parsing\_buffer = (ParserConfig.PrsBuff + 1) * 64$$

$$size\_of\_metdata\_block =$$
$$((4 * ParserConfig.FrameOffset + 4 * (ParserConfig.FrameSize + 1) + 63) /$$
$$64) * 64$$

Checksum is the packet checksum computed at ingress
NextWorkItem is the next work item index in a list of work items. This is used by the clustr scheduler and not the parser
IFID is the ingress interface identifier. This is set by the dispatcher and passed to the cluster scheduler in work items. The parser does not process this field otherwise.
L: Last thread in the thread set. The parser set this in the work item for the last thread requested for a packet (i.e. the last instance of prs.runthread for a packet)
N: Indicates that the worker thread cannot be killed (that is, it is run to completion and impervious to the kill threads signal). This is set by prs.runthread.nokill
D: Indicates that the current header is a data header when set, and a current header if not set. This is used by worker threads to compute the pointer to the header to be processed
NodeLoopCnt (p6, pndlcnt)
Holds the running node count and various counters for iterating in a loop as illustrated in FIG. 31

```
struct {
NumLoops: 16; // Number of loop iterations
NonPadCnt; // Consecutive non-padding options
PadLen: 8; // Consecutive bytes of padding
ConPad: 8; // Consecutive padding options
NodeCnt: 8; // Node encountered]
```

Figure 32:
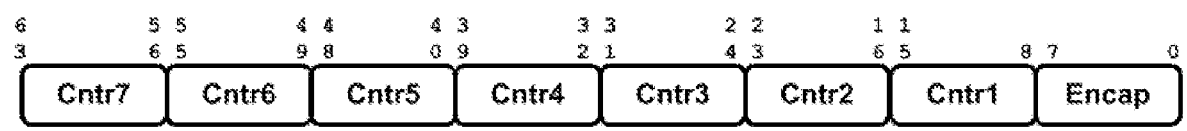
FIG. 32 illustrates encapsulation level and parser counters.

NumLoops counts all iterations of a loop; it works in conjunction with LoopSpec.MaxCnt to enforce a limit on the number of iterations through a loop
NonPadCnt counts the number of non-padding TLVs encountered when processing a TLV loop. This works in conjunction with LoopSpec.MaxNon to enforce a limit on the number of non-padding TLVs to process
PadLen counts the number of consecutive bytes of padding encountered in a TLV loop; this works in conjunction with LoopSpec.MaxPlen to enforce a limit on the number of consecutive bytes of padding in a TLV loop ConPad counts the number of consecutive padding encountered options in a TLV loop; this works in conjunction with LoopSpec.MaxCPad to enforce a limit on the number of consecutive bytes of padding in a TLV loop NodeCnt counts the number of nodes encountered in the current parse walk; this works in conjunction with ParserConfig.MaxNodes to enforce a limit on the number of nodes processed in a parse walk Counters (p7, pcount) This register contains user defined counters for the current parse walk. This includes the encapsulation level and parser counters (Cntr1-Cntr7) as illustrated in FIG. 32

```
struct {
  Encap: 8  // Encapsulation depth
  Cntr1: 8  // Counter 1
  Cntr2: 8  // Counter 2
  Cntr3: 8  // Counter 3
  Cntr4: 8  // Counter 4
  Cntr5: 8  // Counter 5
  Cntr6: 8  // Counter 6
  Cntr7: 8  // Counter 7
}
```

Encap contains the current encapsulation layer. For each protocol encapsulation encountered, this value is incremented. This works in conjunction with ParserConfig.MaxEncap to limit the number of encapsulation levels processed.

Cntr1, Cntr2, Cntr3, Cntr4, Cntr5, Cntr6, and Cntr7 are user defined counters. These counters are incremented by the prs.inc.cntr instructions. These work in conjunction with CounterLimitsConfig.Cntr* to limit the counters. These counters may be used as an array index in the prs.store and prs.storereg instructions, and these work in conjunction with CounterArrayConfig.Cntr* to limit the number of elements that can be indexed in an array.

PktHdrBase (p8, phdrbas) This register holds a fully qualified sixty-four bit base address of packet headers for the current packet being processed. Basically, this is a pointer to the first byte of the first packet header. This value is initialized when the parser starts a new packet and is not changed as the packet is parsed.

MetadataBase (p9, pmdbase)

This register holds a fully qualified sixty-four bit base address of the metadata block for the packet being processed. The metadata block is composed for the "common metadata" followed by an array of metadata frames; see diagram below. This value is initialized when the parser starts a new packet and is not changed as the packet is parsed.

ParserInstrBase (p10, pinbase)

The 64-bit fully qualified base address for parser code, this is a 64M aligned address. That is: ParserInstrBase & 0x3FFFFFF==0.

Next (p11, pnext)

The next node in the parse graph that the parser should go to at the end of this node. This register contains an address/code encoded value.

The fully qualified address is derived by:
if (!IS_RET_CODE(NextNode))
TempAddress=ParserInstrBase|(NextNode & 0xFFFFFF)

PendingWork (p12, ppendwk).

Figure 33:
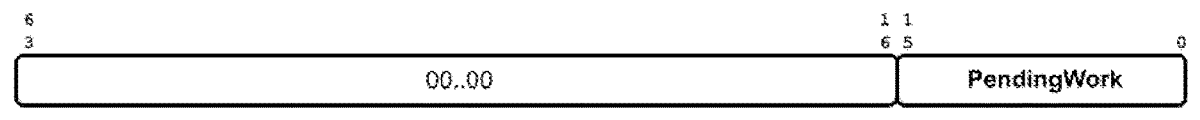

This register holds the index of the pending work for prs.runthread, as illustrated in FIG. 33. PendingWork is an index to a work item. If this equals 0xFFFF then there is no pending work.

DataBndLoop (p13, pdbndlp.

Figure 34:
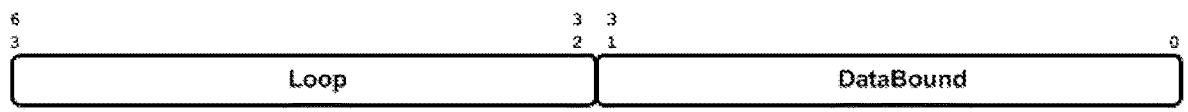
FIG. 34 illustrates the data bound register.

This register holds the data bound which is the maximum length allowed for data in subnodes; and the address of the first instruction of a loop or a code to terminate a loop, as illustrated in FIG. 34.

Figure 35:
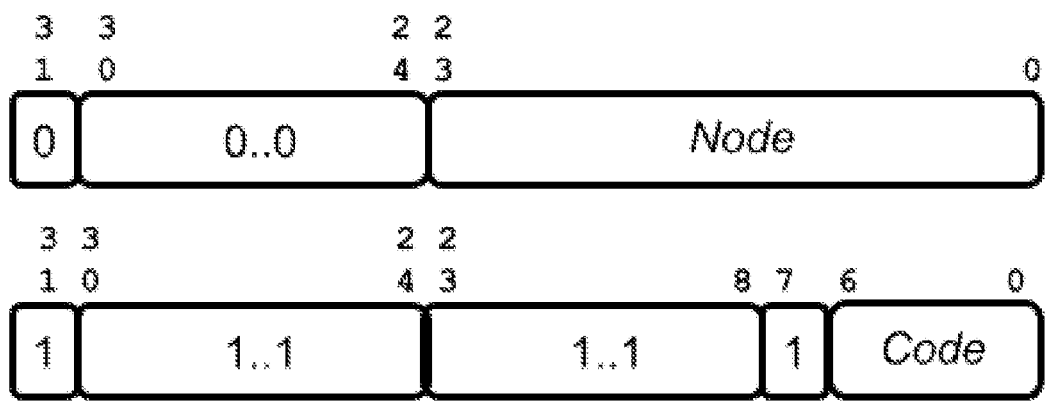
FIG. 35 illustrates node and code encodings.

DataBound is the databound length. Initially, this value is set to infinity (0xFFFFFFFF). As the parser processes data headers, like TLVs, this register is updated accordingly Loop is the beginning of an iterative loop for processing flags or TLVs. When a loop is executing this register holds the address of the first instruction for a loop, or a code to terminate the loop. This register contains an address/code encoded value. The default value, meaning not in loop execution, is the OKAY_RET code. Node and code encodings are illustrated in FIG. 35:

The fully qualified address is derived by:
if (!IS_RET_CODE(DataBndLoop.Loop))
TempAddress=ParserInstrBase|
(DataBndLoop.Loop & 0xFFFFFF)

ParserExitCode (p14, pexcode)

Figure 36:
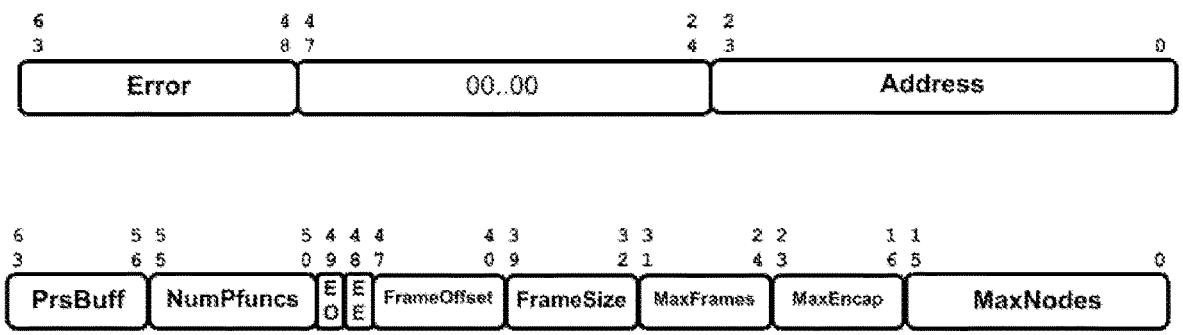
FIG. 36 illustrates registers containing parameters.

This register holds the exit code for the parser when it exits. This register contains a parser code, see "Parser Codes" table, and the address of the parser instruction where the parser exited, as illustrated in FIG. 36.

```
struct { Address: 24 // Relative address of ins. Where parser exited
  Rsvd: 24
  Error: 16 // Parser code
}
```

Address is the address offset of the instruction that caused the parser to exit relative to ParserInstrBase. The sixty-four bit address for the instruction can be derived by: TempAddress=ParserInstrBase|(4*ParserExitCode.Address) Error is a parser exit code, this will be a 16-bit representation of a value from the "Parser Codes".

Accum

Accumulator register for working values.

Flags

Register for holding the flags being processed in a flags loop. The register also serves a second accumulator in some instructions ParserConfig (p17, pconfig)

Register containing parameters for parser configuration, as illustrated in FIG. 36.

```
struct {
  MaxNodes: 16   // Limit for maximum number of nodes to visit
  MaxEncap: 8    // Maximum encapsulation levels
  MaxFrames: 8   // Maximum number of metadata frames
  FrameSize: 8   // (Number of bytes in a metadata frame / 4 ) − 1
  FrameOffset: 8 // Offset of first metadata frame / 4
  EE: 1          // Error when max encaps is exceeded
  EO: 1          // Overwrite last frame at max frames
  NumPfuncs: 6   // Number of parser functions
  PrsBuff: 8     // (Size of parser buffer / 64) − 1}
```

MaxNodes is the maximum number of nodes to visit. This works in conjunction with NodeLoopCnt.NodeCnt to enforce a limit MaxEncap is the maximum number of encapsulation levels. This works in conjunction with Counters.Encap to enforce a limit MaxFrames is the maximum number of metadata frames FrameSize specifies the frame size that is calculated by:
RealFrameSize=4*(ParserConfig.FrameSize+1)

FrameOffset specifies the byte offset of the first metadata frame from MetaDataBase. Offset is calculated by: RealFrameOffset=4*MetaDataBase EE: Bit flag that when set indicates that if the maximum number of encapsulations is exceeded then it is an error EO: Bit flag that when set indicates that the last metadata frame is overwritten when the encapsulation level exceeds the maximum number of frames. If the bit is not set, stores to metadata when the encapsulation level exceeds the maximum number of frames have no effect.

NumPfuncs: Number of encapsulation functions in the ParserFuncs array

PrsBuff indicates the size of the parsing buffer in units of sixty-four bytes. The size of the parsing buffer is (PrsBuff+1)*64. Note that PrsBuff may be set by hardware and so this field could be read only CounterLimitsConfig (pcntlim)

Figure 37:
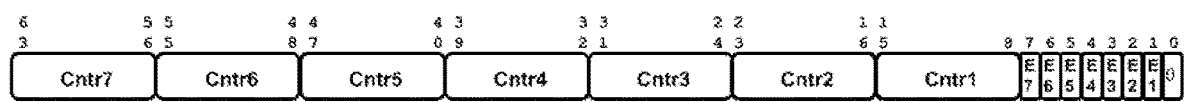
FIG. 37 illustrates configuration for maximum counter values

Configuration for maximum counter values. This contains the maximum value for each of the seven user counters and an indication for each counter as to whether it is an error when the counter value exceeds the maximum value, as illustrated in FIG. 37.

```
struct {
Rsvd: 1
E1: 1 // Error if counter 1 exceeds the maximum value
E2: 1 // Error if counter 2 exceeds the maximum value
E3: 1 // Error if counter 3 exceeds the maximum value
E4: 1 // Error if counter 4 exceeds the maximum value
E5: 1 // Error if counter 5 exceeds the maximum value
E6: 1 // Error if counter 6 exceeds the maximum value
E7: 1 // Error if counter 7 exceeds the maximum value
Cntr1: 8 // Maximum value for Cntr1
Cntr2: 8 // Maximum value for Cntr2
Cntr3: 8 // Maximum value for Cntr3
Cntr4: 8 // Maximum value for Cntr4
Cntr5: 8 // Maximum value for Cntr5
Cntr6: 8 // Maximum value for Cntr6
Cntr7: 8 // Maximum value for Cntr7}
```

CounterArrayConfig (pctarcf) Configuration for maximum counter index values. This contains the maximum value for each of the seven user counters when they are used to index an array in prs.store instructions. There is also an indication for each counter as to whether the last element of an array should be overwritten when a counter exceeds the maximum array index value, as illustrated in FIG. 38.

```
struct { Rsvd: 1
O1: 1 // Overwrite last element when limit exceeded for Cntr1
O2: 1 // Overwrite last element when limit exceeded for Cntr2
O3: 1 // Overwrite last element when limit exceeded for Cntr3
O4: 1 // Overwrite last element when limit exceeded for Cntr4
O5: 1 // Overwrite last element when limit exceeded for Cntr5
O6: 1 // Overwrite last element when limit exceeded for Cntr6
O7: 1 // Overwrite last element when limit exceeded for Cntr7
Cntr1: 8 // Maximum array index value for Cntr1
Cntr2: 8 // Maximum array index value for Cntr2
Cntr3: 8 // Maximum array index value for Cntr3
Cntr4: 8 // Maximum array index value for Cntr4
Cntr5: 8 // Maximum array index value for Cntr5
Cntr6: 8 // Maximum array index value for Cntr6
Cntr7: 8 // Maximum array index value for Cntr7}
```

O1, O2, O3, O4, O5, O6, and O7 indicate that if the respective counter exceeds the maximum array index value then the last element in the array is overwritten.

Cntr1, Cntr2, Cntr3, Cntr4, Cntr5, Cntr6, and Cntr7 provide the maximum index for the respective counter. The work in conjunction Counters.Cntr* with to enforce limits on counter array indices.

CouterArraySzResEncConfig. Configuration for the array element sizes associated with the seven user counters. Each field is the element length minus one so that the possible array sizes are in the range one through 256. The array element size is applied in an indexed reference in prs.store instructions. Additionally, there is a flag bit for each counter that indicates the counter is to be reset when encapsulation is encountered. This is illustrated in FIG. 39.

```
struct {
Rsvd: 1
R1: 1 // Reset Cntr1 when encapsulation is encountered
R2: 1 // Reset Cntr2 when encapsulation is encountered
R3: 1 // Reset Cntr3 when encapsulation is encountered
R4: 1 // Reset Cntr4 when encapsulation is encountered
R5: 1 // Reset Cntr5 when encapsulation is encountered
R6: 1 // Reset Cntr6 when encapsulation is encountered
R7: 1 // Reset Cntr7 when encapsulation is encountered
Cntr1: 8 // Size of element minus one for Cntr1
Cntr2: 8 // Size of element minus one for Cntr2
Cntr3: 8 // Size of element minus one for Cntr3
Cntr4: 8 // Size of element minus one for Cntr4
Cntr5: 8 // Size of element minus one for Cntr5
Cntr6: 8 // Size of element minus one for Cntr6
Cntr7: 8 // Size of element minus one for Cntr7}
```

R1, R2, R3, R4, R5, R6, and R7 indicates that the respective counter (Counters.Cntr*) is to be reset to zero when an encapsulation layer is encountered Cntr1, Cntr2, Cntr3, Cntr4, Cntr5, Cntr6, and Cntr7 provide array element size minus one so that the range of element size is one to 256 bytes.

LoopSpec

Figure 40:
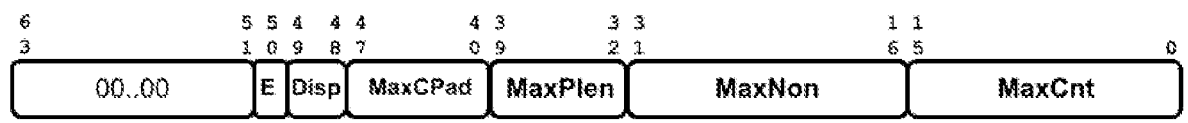
FIG. 40 illustrates holding the configuration parameters for processing a loop.

Holds the configuration parameters for processing a loop as illustrated in FIG. 40.

```
struct {
MaxCnt: 16   // Maximum number of loop iterations
MaxNon: 16   // Maximum number of non-padding TLVs
MaxPlen: 8   // Maximum num. of consecutive bytes of TLV padding
MaxCPad: 8   // Maximum number of consecutive padding options
Disp: 2      // Action to take when limit is exceeded
E: 1         // Exceeding loop count is an error
Rsvd: 13     // Reserved }
```

MaxCnt is the limit for the maximum number of loop iterations. In conjunction with NodeLoopCnt.NumLoops, a simple for loop can be logically implemented as in:

for (NodeLoopCnt.NumLoops=0; NodeLoopCnt.NumLoops<LoopSpec.MaxCnt; NodeLoopCnt.NumLoops++) { ... }

Figure 41:
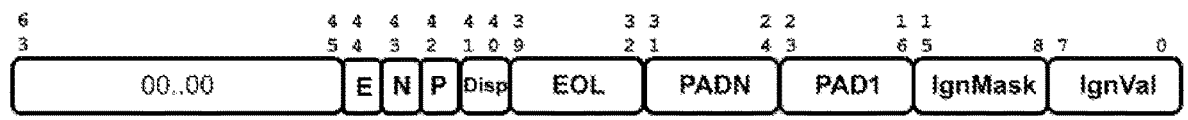
FIG. 41 illustrates a structured register and works with the PTLVFASTLOOP and PCAMJUMPTLVLOOP instructions.

MaxNon is the limit for the maximum number of TLVs encountered in a TLV loop. This works in conjunction with NodeLoopCnt.NonPadCnt to enforce the limit MaxPlen is the limit for the maximum number of consecutive bytes of padding in a TLV loop. This works in conjunction with NodeLoopCnt.PadLen to enforce the limit MaxCPad is the limit for the maximum number of consecutive padding options in a TLV loop. This works in conjunction with NodeLoopCnt.ConPad to enforce the limit Disp: Disposition when a loop limit is exceeded. See loop Common_Loop_Limit_Exceeded section for usage E: Indicates that when loop count limit is exceeded it is an error TLVSpec Holds the TLV parameters for TLV processing. This is a structured register and works with the PTLVFASTLOOP and PCAMJUMPTLVLOOP instructions, as illustrated in FIG. 41.

```
struct {
  Ign Val: 8    // Ignore value for an unknown TLV match
  IgnMask: 8    // Mask of type for ignore unknown TLV
  PAD1: 8       // One byte TLV type for one padding (PAD1)
  PADN: 8       // One byte TLV type for multi byte padding (PADN)
  EOL: 8        // One byte TLV type for End of List (EOL)
  Disp: 2       // Action to take when a limit is exceeded
  P: 1          // PAD1 enabled flag
  N: 1          // PADN enabled flag
  E: 1          // EOL enabled flag
  Rsvd: 19}
```

IgnVal specifies a value in the type that indicates an unknown option is to be ignored.

IgnMask indicates a mask applied to the TLV type before comparing it to IgnVal. If the value is zero then the ignore value is ignored PAD1: Indicates the type number for one byte padding. Valid when P bit is set.

PADN: Indicates the type number for multi-byte padding. Valid when the N bit is set.

EOL: Indicates the type number for one byte "end of list". Valid when the E bit is set.

Disp: Disposition when a loop limit is exceeded. See loop Common_Loop_Limit_Exceeded.

P: PAD1 field is valid.

N: PADN is valid.

E: EOL field is valid.

OkayTarget

This register holds the fully qualified address to jump to when the parser exits normally.

FailTarget

This register holds the fully qualified address to jump to when the parser exits normally.

Wildcard

Wildcard for CAM lookups. This register contains an address/code encoded value.

The fully qualified address is derived by if (!IS_OKAY_RET(WildCard))
TempAddress=ParserInstrBase (WildCard & 0xFFFFFF)

AltWildcard

Alternate wildcard for CAM lookups. This register contains an address/code encoded value.

The fully qualified address is derived by if (!IS_OKAY_RET(AltWildCard))
TempAddress=ParserInstrBase (AltWildCard & 0xFFFFFF)

AtEncap

This register holds the fully qualified PC address to jump to for "at encapsulation" processing when an encapsulation node is encountered. A value of zero (NULL) indicates no "at encapsulation" processing is set.

PostLoop

This register holds the fully qualified PC address to jump to for post loop processing in a node. A value of zero (NULL) indicates no post loop processing is set.

CompareFalse

This register holds the fully qualified PC address for code to execute when a comparison instruction evaluates to false.

DataExtractBase (p30, pdexbas)

This register holds the fully qualified base of pseudo instructions for the data extraction pseudo instructions.

Timestamp

This register returns a high precision object received timestamp. The timestamp is generated at ingress and set in the work item from the dispatcher to the cluster scheduler. Register initialization is illustrated in FIG. 42

SiPanda Parser CoProcessor Instructions

The p registers can be read to integer registers and written from integer registers using the coprocessor read and write instructions CPPRSRD and CPPRSWR instructions where CoP is set to zero to indicate the parser coprocessor. The cpreg specifies the p register. This illustrated in FIG. 43

Moving values between the integer registers and p registers allows software to perform any transformations that are not directly supported by the parser instructions. CPPRSRD reads a value from a p register into an integer register. CPPRSWR writes a value from an integer register into a p register. CPPRSWRIMM writes an eleven bit immediate to a p register. CPPRSWRCAM writes or removes an entry in the protocol CAM by its index: if D is not set Cpreg register contains the key, and the Rs register contains the target; if D is set then the Cpreg register contains the key of a CAM entry to be removed. CPPRSRDCAM reads an entry from the CAM lookup (performs a lookup on the input key).

```
Pseudo Code for CPPRSRD:
regs[Rd] = parse_regs[Cpreg]
Pseudo Code for CPPRSRDCAM:
regs[Rd] = CAMIndexLookup(regs[Rs])
Pseudo Code for CPPRSRDARRAY:
regs[Rd] = ArrayRead(regs[Rs])
Pseudo Code for CPPRSWR:
parse_regs[Cpreg] = regs[Rs]
Pseudo Code for CPPRSWRIMM:
Temp = Imm1 + (Imm2 << 5
Temp = SignExtend(Temp, 11)
parse_regs[Cpreg] = Temp
Pseudo Code for CPPRSWRCAM:
if (D)
RemoveCAMEntryByIndex(regs[Rs])
Else
WriteCAMEntryByIndex(regs[Rs],
parse_regs[Cpreg] >> 32, parse_regs[Cpreg])
Pseudo Code for CPPRSWRARRAY:
if (D)
Remove Array Entry (regs[Rs]
Else
WriteArrayEntry(regs[Rs], parse_regs[Cpreg])
```

Assembly for Parser coprocessor read and write instructions is illustrated in FIG. 44

<ireg> is an integer register x0-x31 (ABI names zero, ra, sp, gp, tp, t0-t6, s0-s11, a0-a7)

<preg> is a parser register p0-p31 (ABI names pobjref phdrbas, pmdbase, pcurhdr, pdathdr, ppktlen, pfofnsq, ppktinf pinbase, pnext, ppendwk, pdbndlp, pexcode, paccum, pflags, pndlcnt, pcount, pconfig, pcntlim, pctarcf pctarsz, ploopsp, ptlvsp, pokay, pfail, pwild, palwild, patent, ppostlp, pcmpfal, ptimstp). <imm> is a value between −1028 to 1027 inclusive (<imm> is sign extended when moving to a register. <offset> is a relative PC offset in range shift right by two so effective range is −4096 to 4092 (note that targets in parser instructions are assumed to be four byte aligned)

Parser Codes

The hardware parser has a standard set of codes to indicate failure conditions, and okay conditions. Codes are negative bytes from −1 to −127, or 0xFF to 0x80. Codes are naturally represented in half word, word, and double words simply by extending the sign bit. A check for a code is performed by checking the high order bit is set (i.e. check for a negative value). This is illustrated in FIG. 45

STOP_* codes greater than STOP_FAIL (−12) are considered normal parser exit codes, codes less than STOP_FAIL are considered abnormal conditions to stop the parser.

32-bit Parser Instructions

The 32-bit Hardware Parser instructions use custom-0 for the opcode and have a 4-bit function field that specifies the specific instruction. This is illustrated in FIG. 46

This section describes macros for common pseudo code. These are helper macros used in the specification:

define IS_RET_CODE(X)((X)<0)
define IS_NOT_OK_CODE(X)((X)<=PANDA_STOP_FAIL)
define IS_OK_CODE(X)(IS_RET_CODE(X) && (X)>PANDA_STOP_FAIL)

These are hardware helper functions mentioned in the pseudo code for instructions:

LoadFromMemory(<Address>, <NumberOfBytes>)
Load number of bytes into a register from the memory address referred to by <Address>. <NumberOfBytes> may be 1 (byte), 2 (half-word), 4 (word), or 8 (double word). Returns the loaded value.
StoreToMemory(<Register>, <Address>, <NumberOfBytes>)
Store the contents of a register to the memory address referred to by <Address>. <NumberOfBytes> may be 1 (byte), 2 (half-word), 4 (word), or 8 (double word)
Wait_for_more_data( )
Logical hardware function to wait for more data to arrive. This is invoked when data is streaming in such that PktLen.F or PktLen.P is not yet set. (In the current design this not required since it is assumed that whole packet is received before starting the parser)
CAMLookup(<Key>)
Perform a CAM lookup and return the result or 0xFFFFFFFFFFFFFFFF on a miss
RemoveCAMEntryByIndex(<Index>)
Remove the CAM entry corresponding to the index in the CAM table
WriteCAMEntryByIndex(<Index>, <Key>, <Value>)
Write the CAM entry corresponding to the index
ArrayLookup(<Index>)
Return the value from the lookup array corresponding the index
RemoveArrayEntry(<Index>)
Set the array entry corresponding to the index to 0xFFFFFFFF
WriteArrayEntry(<Index>, Value>)
Write the array entry corresponding to the index with a value
(TempWorkItem,TempWorkItemIndex)=AllocWorkItemo;
Calls the external work item object allocator to get a sixty-four byte thread work item. A pair is returned: the first value is a sixty-four bit pointer to a work item, the second value is the sixteen bit index of the work item. The index will be sent in a "start thread set" message to the cluster scheduler
BlockStoreP0_TO_P7(TempWorkItem);
Perform a block store of registers p0 through p7 to the target memory address. This stores a work item in the memory allocated by AllocWorkItem
Fifo_Enqueue(TempFifo, TempMessage)
Enqueue a sixty-four bit message on the indicated FIFO. The parser enqueues messages on the pars_to_clussched_fifo in the prs.runthread instruction and when the parser completes parsing a packet Fifo_Dequeue(TempFifo)
Dequeue a sixty-four bit message on the indicated FIFO. The parser dequeues messages from the clusfend_to_pars_fifo in the parser event loop
Fifo_Dequeue(TempFifo)
Dequeue a sixty-four bit message on the indicated FIFO. The parser dequeues messages from the clusfend_to_pars_fifo in the parser event loop
ASSERT(TempCod);
Assert an invariant condition is true. If the condition is false this considered a fatal error and the system should take appropriate action such as a reset. This is for debugging, and may be disabled a well tested system from production
SysMetadataBase( )
Returns the base metadata address for the system. The metadata base contains an array of metadata blocks that are allocated via a cluster allocator. PktInfo.PktCtx references a metadata object as an index into the array. Presumably, the metadata base address is a system constant that doesn't need to be exposed as a register
SysHeadersBase( )
Returns the base headers address for the system. The headers base contains an array of header buffers that are allocated via a cluster allocator. PktInfo.PktCtx references a header buffer as an index into the array. Presumably, the headers base address is a system constant that doesn't need to be exposed as a register
SysWorkItemsBaseo
Returns the base work items address for the system. The work items base contains an array of work items that are allocated via a cluster allocator. PktInfo.PktCtx references a work item as an index into the array. Presumably, the work items base address is a system constant that doesn't need to be exposed as a register
SysParserFunctionsBaseo
Returns the base memory address for parser functions array. Presumably, the parser functions base address is a system constant that doesn't need to be exposed as a register
Convert Relative Instruction Address (Relative_Ins_Addr_to_FQA)

FIG. 47 shows some examples of how the nibbles are copied considering whether the first nibble offset is odd or even, whether the number of nibbles is odd or even, and if endian swap is performed.

Pseudo registers. In addition, the registers described above there are some pseudo registers used in Assembly instruction as illustrated in FIG. 48

Load from Header Instructions

These instructions load a value from the header. The header is assumed to be streamed into the packet memory space via the SiPanda streaming datagram infrastructure. They are illustrated in FIG. 49.

The Offset is relative to the address specified by either the current header pointer (PktHdrBase+CurHdr.Offset) or the data header pointer (PktHdrBase+DataHdr.Offset). Specifically, if the X bit is set the address loaded from (PktHdrBase+DataHdr.Offset+Offset). If the X bit is not set the address loaded from is (PktHdrBase+CurHdr.Offset+Offset). The number of bytes is specified by Sz. If Sz equals zero, then the number of bytes is eight, else the number of bytes is 1<<(Sz−1) (1, 2, or 4 bytes).

Once the value is fetched from memory the E-bit specifies if the byte ordering should be swapped (only applicable if more than one byte is being loaded). If the E-bit is set the target is treated as a big endian value that is swapped before being set in the register; if the E-bit is not set the target is treated as a little endian value that is set in the register as is.

The Shift and Blen fields specify transformations performed on the loaded value (after optional byte swapping). The fetched value is left shifted by the value in Shift and then masked to zero for the number of high order bits specified by Blen. If Sz is 0, that is 8 bytes is being fetched, then Blen is multiplied by two so as to allow masking to zero up to thirty high order bits with a multiple of two.

The load instructions check if there is sufficient length to perform the load. If the load is performed from the current header pointer (PktHdrBase+CurHdr.Offset) the check is that CurHdr.Offset+Offset+number_of_bytes is less than or equal to PktLen.ParseLen, and when the load is from the data pointer (PktHdrBase+DataHdr.Offset) the checks are that Offset +number_of_bytes is less than or equal to DataBndLoop.DataBound and DataHdr.Offset+Offset+number_of_bytes is less than or equal to PktLen.ParseLen.

If the extent of bytes being loaded is greater than CurHdr.Length when loading from the current header pointer (PktHdrBase+CurHdr.Offset), or greater than DataHdr.Length when loading from the data header pointer (PktHdrBase+DataHdr.Offset) then CurHdr.Length or DataHdr.Length is increased to the extent of the bytes being loaded. This effectively allows the load instruction to perform a header length check up to the length covering the last byte being loaded.

PLOAD Instruction
Loads a value from the header buffer into the Accum register.
Pseudo Code PLOAD:
if (Sz == 0)
TempNumberBytes = 8;
Else
TempNumberBytes = (1 << (Sz − 1));
TempAddress = Get_Load_src_addr(Offset, TempNumberBytes, X);
Accum = LoadReadBytes(TempAddress, TempNumberBytes, Shift, Blen, E);

PLOADTLVLOOP Instruction
Loads a value from the header buffer into the accum register to be used as TLV type. It also is the head of the TLV loop. Note that the load may include additional bytes such as the TLV length field.

Pseudo Code for PLOADTLVLOOP:
Common_Loop_Head( ); // May not return
if (DataBndLoop.DataBound == 0) {
/* Normal end of TLV loop, exit loop */
DataBndLoop.Loop = STOP_SUB_NODE_OKAY;
Common_End_of_Node(); // No return
}
if (Sz == 0)
TempNumberBytes = 8;
Else
TempNumberBytes = (1 << (Sz −1));
TempAddress = Get_Load_Src_Addr(Offset, TempNumberBytes, 1);
Accum = LoadReadBytes(TempAddress, TempNumberBytes, Shift, Blen,
E);
// TLV data loaded, type should be in Accum Assembly for Load Instructions as Illustrated in FIG. 50

If a size qualifier is present in [bhw] or [hw]; then if b is present Sz instruction field is set to 1, if h is present Sz instruction field is set to 2, if w is present Sz instruction field is set to 3, else Sz instruction field is set 0. Blen is set based on <blen> or defaults to zero if the <blen> is not present in the arguments. If b or h is in the instruction mnemonic then <blen> is a value in the range 0 to 7 inclusive; if w is in the mnemonic then <blen> is a value in the range 0 to 15 inclusive; else <blen> is a value in the range 0 to 30 inclusive and must be a multiple of two. <shift> is a value in the range 0 to 7 inclusive. If .swp is present then the E bit is set indicating that bytes being loaded are swapped for endianness.

PFLAGSLOOP Instruction

As illustrated in FIG. 51, this is the loop head for a Flags parsing loop. At each iteration, Accum is set to the bit position of the first non-zero bit in Flags. The number of bytes loaded is specified by Sz. If Sz equals zero, then the number of bytes is eight, else the number of bytes is 1<<(Sz−1) (1, 2, or 4 bytes). If the R bit is set the flag bits are reversed so that the flags are processed from order bit to low order (for FFS processing). In the first iteration, Accum is expected to be loaded with the flags value.

Pseudo Code for PLOADFLAGSLOOP:
// No common loop head code, number iterations is naturally bounded
if (DataBndLoop.Loop == OKAY_RET) // Start a flag-fields loop
if (Sz == 0)
TempVal = Accum;
Else
TempVal = ExractSubReg(Accum, Sz, Pos);
TempVal = (TempVal & Mask) | (Temp Val & ~0xFFFF);
if (R)
TempVal = ReverseByteBits(TempVal, 2)
Flags = Tempval;
DataBndLoop.Loop = PC & 0xFFFFFF;
// Loop counts unused by flags loop, clear for consistency
NodeLoopCnt &= FFFF000000000000;
}
if (Flags == 0) { // Normal flag-fields loop termination
DataBndLoop.Loop = STOP_SUB_NODE_OKAY;
Common_End_of_Node( ); // No return
}
TempWhich = FFS(Flags); // First non-set bit indexed from zero
Accum = TempWhich;
Flags & = ~(1 << TempWhich); // Consume first flag
// Accum contains the index of the next flag to process.

Assembly for PFLAGSLOOP Instruction as Illustrated in FIG. 52

If a size qualifier is present in [bhw] then if b is present Sz instruction field is set to 1 and <pos> if present is in the range 0 to 7 inclusive, if h is present Sz instruction field is set to 2 and <pos> if present is in the range 0 to 3 inclusive, if w is present Sz instruction field is set to 3 and <pos> if present is in the range 0 to 1 inclusive else Sz is set to 0 and. If .rev is present then the R bit is set and the order of the bits are reversed to match the logical numbering. <mask> is in the range 0 to 0xFFFF inclusive and is set in the Mask field. If <Mask> is not present then the Mask field is set of 0xFFFF PTLVFASTLOOP Instruction This is a specialized instruction to handle the common case of TLVs where the first byte is the type and the second byte is the length. This format is common in several protocols with TLVs including IPv4 options, IPv6 Hop-by-Hop Options, IPv6 Destination Options, SRv6 options, TCP options, etc. This is a loop head instruction for TLV loop processing.

The instruction does several things:
    If this the first instruction in the loop then DataBndLoop.Loop and NodeLoopCnt loop values are initialized (note that the Common_Loop_Head is not used)
    Check DataBndLoop.DataBound is zero which signifies normal end of TLV processing. If it is equal to zero then proceed to Common_End_of_Node handling Load two bytes frompdatptr (PktHdrBase+DataHdr.Offset). If only one byte is available it is loaded to check for single byte TLVs (PAD1 and EOL).

Check if the type is PAD1 or EOL. If type is PAD1 check padding limits, increment data pointers, and continue loop with next TLV; if the type is EOL then normally exit loop.

If type is not EOL or PAD1 and only one byte was loaded then exit the parser on STOP_TLV_LENGTH Compute the TLV length as the second loaded byte left shifted by Shift plus Len Check if type is PADN; if it is then check padding limits, increment data pointers, and continue loop with next TLV Otherwise a well formed non-padding option is found. Check non-padding option limit, set DataHdr.Length to the computed TLV length, and fallthrough to next instruction which is typically a PCAMJUMPTLV-LOOP instruction. This illustrated in FIG. 53

Shift is the number of bits to shift the extracted length field by, and Len is the number to add to the length after being shifted.

```
Pseudo Code for PTLVFASTLOOP:
_padding_loop: // Goto target for PAD1 or PADN padding processed
TempAddr = PktHdrBase + DataHdr.Offset;
if (IS_RET_CODE(DataBndLoop.Loop)) {
// Starting a TLV loop, treat all values as OKAY_RET
NodeLoopCnt &= 0xFFFF000000000000; // Clear loop counts
DataBndLoop.Loop = PC & 0xFFFFFF;
}
if (DataBndLoop.DataBound == 0) {
DataBndLoop.Loop = STOP_SUB_NODE_OKAY;
// Normal end of TLV loop, exit loop
Common_End_of_Node( ); // No return
}
TempLast = DataHdr.Offset + 2; // Load two bytes (type and length)
while (PktLen.ParseLen < TempLast && !PktLen.P)
Wait_for_more_data( ); // Still streaming header bytes
if (DataBndLoop.DataBound == 1 || (PktLen.ParseLen < TempLast)) {
// Not even two bytes are available
if ((PktLen.ParseLen - DataHdr.Offset) >= 1) {
// Read one byte for EOL or PAD1
Temp = LoadFromMemory(TempAddr, 1);
TempRead = 1;
} else { // Can't even read the TLV type byte
Fail_Parser(STOP_TLV_LENGTH);
}
} else { // Hurray!, we can read both bytes
Temp = LoadFromMemory(TempAddr, 2);
TempRead = 2;
}
Accum = Temp; // Accum contains type in first byte, length in second
TempType = Temp & 0xFF; // Check for EOL, PAD1, PADN
if (TLVSpec.E && (TempType == TLVSpec.EOL)) {
DataBndLoop.Loop = STOP_SUB_NODE_OKAY;
// Normal end of TLV loop on EOL
Common End_of_Node( ); // No return
} else if (TLVSpec.P && (TempType == TLVSpec.PAD1))
TempLen = 1; // PAD1, advance data ptr one byte and iterate
goto_have_padding; // Continue as padding processing below
} else if (TempRead == 1) { // Only one byte and not EOL or PAD1
Fail_Parser(STOP_TLV_LENGTH);
}
TempLen = (((Temp >> 8) & 0xFF) << Shift) + Len // Compute length
If (TempLen < 2) // Length must be at least two
Fail_Parser(STOP_TLV_LENGTH);
if (TLVSpec.N && TempType == TLVSpec.PADN) { // Padding
_have_padding: // Goto target for PAD1 case above
TempAllPadlen = NodeLoopCnt.PadLen + TempLen;
if (NodeLoopCnt.ConPad >= LoopSpec.MaxCPad ||
TempAllPadlen > LoopSpec.MaxPLen) {
// Does not return
Common_Loop_Limit_Exceeded(STOP_PADDING_LIMIT);
}
// Check and increment NodeLoopCnt.NumLoops here since we don't
// use common loop head
if (NodeLoopCnt.NumLoops >= LoopSpec.MaxCnt) {
// Reached end of loop
Common_Loop_Limit_Exceeded(STOP_LOOP_CNT); // Does not return
}
NodeLoopCnt.NumLoops++; // Counter for all loops
NodeLoopCnt.ConPad++;
NodeLoopCnt.PadLen = TempAllPadLen;
DataHdr.Offset += TempLen; // Move data pointers for padding
DataBndLoop.DataBound -= TempLen;
GOTO _padding_loop; // Process next TLV
}
// We have what appears to be a non-padding option
if (NodeLoopCnt.NonPadCnt >= LoopSpec.MaxNon) // Limit on loop iters
Common_Loop_Limit_Exceeded(STOP_OPTION_LIMIT); // Does not return
// Check and increment NodeLoopCnt. Num Loops here since we don't call
// use common loop head
if (NodeLoopCnt.NumLoops >= LoopSpec.MaxCnt) {
// Reached end of loop
Common_Loop_Limit_Exceeded(STOP_LOOP_CNT); // Does not return
}
NodeLoopCnt.NumLoops++; // Counter for all loops
NodeLoopCnt.NonPadCnt++; // Counter for non-padding options
NodeLoopCnt.ConsPad = 0; // Clear consecutive padding counters
NodeoopCnt.PadLen = 0;
DataHdr.Length = TempLen;
```

Assembly for PTLVFASTLOOP Instruction as Illustrated in FIG. 54

<len> is a value in the range 0 to 511 inclusive and <len> is set in the Len field of instruction. <mult> is 1, 2, 4, 8, 16, or 32 and is set in the Shift field of the instruction as $\log_2$(<mult>). If <mult> is not present then Shift is set to 0.

Store to Memory Instructions

The store instructions move data from a p register or an immediate value to a metadata frame (MetadataBase plus 4*FrameOffFnumSeqno.FrameOffset) structure or the common metadata (MetadataBase) at some offset.

PSTORE Instruction

PSTORE stores the contents of the Accum or Flags register or sub-register at an offset from Metadata Base or Metadata Base plus 4*FrameOffFnumSeqno.FrameOffset and an optional array index from user defined counters #1, #2, #3, #4, #5, #6, or #7. This illustrated in FIG. 55

If the F bit is not set then the target destination base address is Metadata Base, else the des address is the frame pointer, Metadata Base plus 4*FrameOffFnumSeqno.FrameOffset. The Offset is relative to the address specified by the base destination address. The number of bytes to store is specified by Sz; if Sz is 0 then eight bytes are stored, else the number of bytes stored is 1<<(Sz-1) (1, 2, or 4 bytes). Pos in indicates the sub-register (e.g. if Sz=1 and Pos=5 then the fifth byte in the Accum of Flags register is stored). The J-bit indicates the source is Accum if not set, and Flags if set. If Sind is non-zero, an array offset is added to the offset and Sind corresponds to counter Cntr1, Cntr2, . . . , Cntr7 where the counter's value serves as the array index. CounterArraySzResEncConfig.Cntr<cntr> contains the array element size of the counter. The S-bit is a stop bit that indicates that this instruction is the end of a node.

```
Pseudo Code for PSTORE:
TempAddress = Get_Store_Dest_addr(Offset, F, Sind);
if (TempAddress = NULL)
```

```
    goto _leave;
    if (J)
       TempVal = Flags;
    Else
       TempVal = Accum;
    if (Sz == 0) {
       Temp = Temp Val;
       TempNumberBytes = 8;
    } else {
       Temp = ExtractSubReg(Temp Val, Sz, Pos);
       TempNumberBytes = (1 << (Sz - 1))
    }
    if (E)
       Temp = ByteSwap(Temp, Sz);
    StoreToMemory(Temp, TempAddress, TempNumberBytes);
    _leave_:
    if (S)
       Common_End_of_Node( );
    PSTOREREG Instruction
```

PSTOREREG stores the contents of a p register or sub-register at an offset from Metadata Base or Metadata Base plus 4*FrameOffFnumSeqno.FrameOffset and an optional array index from user defined counters #1, #2, #3, #4, #5, #6, or #7. This is illustrated in FIG. 56.

If the F bit is not set then the target destination base address is Metadata Base, else the dest base address is the frame pointer, Metadata Base plus 4*FrameOffFnumSeqno.FrameOffset.

The Offset is relative to the address specified by the base destination address. The number of bytes to store is specified by Sz; if Sz is 0 then eight bytes are stored, else the number of bytes stored is 1<<(Sz-1) (1, 2, or 4 bytes). Reg indicates the source p register. If Sind is non-zero, an array offset is added to the offset and Sind corresponds to counter Cntr1, Cntr2, . . . , Cntr7 where the counter's value serves as the array index. The element size of the array associated with a counter index is in CounterArraySzResEncConfig.Cntr<cntr>. The S-bit is a stop bit that indicates that this instruction is the end of a node.

```
    Pseudo Code for PSTOREREG:
    TempAddress = Get_Store_Dest_addr(Offset, F, Sind);
    if (TempAddress = NULL)
       goto _leave;
    if (Sz == 0)
       TempNumberBytes = 8;
    Else
       TempNumberBytes = (1 << (Sz - 1));
    TempNumBits = TempNumberBytes * 8;
    Temp = ParserRegister[Reg] & ((1 << TempNumBits) - 1)
    if (E)
       Temp = ByteSwap(Temp, Sz);
    StoreToMemory(Temp, TempAddress, TempNumberBytes);
    _leave_:
    if (S)
       Common_End_of_Node( );
    PSTOREIMM Instruction
```

PSTOREIMM stores an immediate byte at an offset from Metadata Base or Metadata Base plus 4*FrameOffFnumSeqno.FrameOffset. This is illustrated in FIG. 57

If the F bit is not set then the target destination base address is Metadata Base, else the dest base address is the frame pointer, Metadata Base+4*FrameOffFnumSeqno.FrameOffset.

The Offset is relative to the address specified by the base destination address. The number of bytes to store is specified by Sz; if Sz is 0 then eight bytes are stored, else the number of bytes stored is 1<<(Sz-1) (1, 2, or 4 bytes). Value is the immediate byte value to store. The S-bit is a stop bit that indicates that this instruction is the end of a node.

```
    Pseudo Code for New PSTOREIMM:
    TempAddress = Get_Store_Dest_addr(Offset, F, 0);
    if (TempAddress = NULL)
       goto _leave_;
    Temp = SignExtend(Value, 7, Sz);
    if (Sz == 0)
       TempSize = 4
    Else
       TempSize = Sz
    if (TempSize != 0) {
       Temp = SignExtend(Value, 7, Sz)
    Else
       Temp = Value
    TempNumBytes = 1 << (Sz - 1)
    StoreToMemory(TempAddress, Temp, TempNumBytes);
    _leave_:
    if (S)
       Common_End_of_Node( );
```

Assembly for store instructions is illustrated in FIG. 58

If a size qualifier is present in [bhw]; then if b is present Sz instruction field is set to 1 and <pos> if present is in the range 0 to 7 inclusive, if h is present Sz instruction field is set to 2 and <pos> if present is in the range 0 to 3 inclusive, if w is present Sz instruction field is set to 3 and <pos> if present is in the range 0 to 1 inclusive, else size instruction field is set 0. If [<pos>] is not present, Pos is set to zero in the instruction. If stp is in mnemonic then S=1 else S=0. <offset> is an unsigned value in the range of 0 to 511 inclusive and is set in the Offset instruction field. <reg> is a parser register p0-p31 (ABI names pobjref phdrbas, pmd-base, pcurhdr, pdathdr, ppktlen, pfofnsq, ppktinf pinbase, pnext, ppendwk, pdbndlp, pexcode, paccum, pflags, pndlcnt, pcount, pconfig, pcntlim, pctarcf pctarsz, ploopsp, ptlvsp, pokay, pfail, pwild, palwild, patent, ppostlp, pcmpfal, ptimstp). If [cntr[1234567]] is present, then one of the seven user counters (Cntr1, Cntr2, Cntr3, Cntr4, Cntr5, Cntr6, or Cntr7) is being used as an array index where Sind is set as the corresponding value in the instruction. Note that pframe and pmdbase are virtual registers only used in this instruction; when pframe is the destination of the store the target address is Metadata Base plus 4*FrameOffFnumSeqno.FrameOffset, and when pmdbase is the destination of the store the base target address is Metadata Base.

Length Instructions

The hardware parser length instruction performs a number of different operations. There are two basic variants that determine how the Len field is processed: 1) If D is not set, the operation works by taking the value in the Accum register, shifting it by the value in and adding it to Len with all arithmetic truncated to 9 bits; if Shift is 7 then the operation is a constant length check against the value in Len, the data offset is then set to CurHdr.Offset plus Len. 2) else when D is set, the length field is the minimum length, the computed length is checked that it is greater than or equal to Len; if the minimum length check is okay then the data offset is set to CurHdr.Offset plus Len. The length field is taken from a sub-register (nibble, byte, half-word, or word)

as indicated by Sz and Pos. The S-bit is a stop bit that indicates that this instruction is the end of a node. This is illustrated in FIG. 59

PLENCUR Instruction

This instruction sets the CurHdr.Length based on Accum.

```
Pseudo Code for PLENCUR:
TempILen = Len;
if (D)
TempILen++; // Minimum length check at least 1
TempLen = ExtractLenFromArgs(D, Accum, Sz, Pos, Shift,
TempILen, STOP_LENGTH); // May not return
TempLast = CurHdr.Offset + TempLen;
while (PktLen.ParseLen < TempLast && !PktLen.P)
Wait_for_more_data( ); // Still streaming header bytes
if (PktLen.ParseLen < TempLast || TempLen < CurHdr.Length) {
// Not enough bytes in packet
Fail_Parser(STOP_LENGTH);
}
CurHdr.Length = TempLen;
if (D || Shift == 7) {
// Set data offset to end of minimum length
DataHdr.Offset = CurHdr.Offset + TempIlen;
}
DataBndLoop.DataBound = CurHdr.Offset + CurHIdr.Length −
DataHdr.Offset;
if (S) Common_End_of_Node( );
```

PLENDATA Instruction

This instruction sets the DataHdr.Length for a non-TLV sub-node.

```
Pseudo Code for PLENDATA:
TempILen = Len;
if (D)
TempILen++; // Minimum length check at least 1
TempLen = ExtractLenFromArgs(D, Accum, Sz, Pos, Shift, TempILen,
STOP_TLV_LENGTH); // May not return
TempLast = DataHdr.Offset + TempLen;
while (PktLen.ParseLen < TempLast && !PktLen.P)
Wait_for_more_data( ); // Still streaming header bytes
if (PktLen.ParseLen < TempLast) {
if (TempLen > DataBndLoop.DataBound ||
(PktLen.ParseLen - < TempLast) ||
(TempLen < DataHdr.Length)) {
// Not enough bytes in packet
Fail_Parser(STOP_TLV_LENGTH);
}
DataHdr.Length = Temp;
if (S)Common_End_of_Node( );
PLENDATABND Instruction
```

This instruction sets the DataBndLoop.DataBound relative to the current DataHdr.Offset. It must set it to a lesser value than that already set to or it causes an error.

```
Pseudo Code for PLENDATABND:
TempILen = Len;
if (D)
TempILen++; // Minimum length check at least 1
TempLen = ExtractLenFromArgs(D, Accum, Sz, Pos, Shift, TempILen,
STOP_TLV_LENGTH); // May not return
TempLast = DataHdr.Offset + TempLen;
while (PktLen.ParseLen < TempLast && !PktLen.P)
Wait_for_more_data( ); // Still streaming header bytes
if (TempLen > DataBndLoop.DataBound || PktLen.ParseLen <
TempLast) {
// Not enough bytes in packet
Fail_Parser(STOP_TLV_LENGTH);
}
DataBndLoop.DataBound = TempLen;
PLENDATATLV Instruction
```

This instruction sets the DataHdr.Length for a non-padding TLV option. This should be called at most once for processing a TLV.

```
Pseudo Code for PLENDATATLV:
TempILen = Len;
if (D)
TempILen++; // Minimum length check at least 1
// Increment and check non-options loop count
if (NodeLoopCnt.NonPadCnt >= LoopSpec.MaxNon)
Common_loop_Limit_Exceeded(STOP_OPTION_LIMIT); // Does not
return
NodeLoopCnt.NonPadCnt++;
TempLen = ExtractLenFromArgs(D, Accum, Sz, Pos, Shift, TempILen,
STOP_TLV_LENGTH); // May not return
TempLast = DataHdr.Offset + TempLen;
while (PktLen.ParseLen < TempLast && !PktLen.P)
Wait_for_more_data( ); // Still streaming header bytes
if (TempLen > DataBndLoop.DataBound ||
PktLen.ParseLen < TempLast || TempLen < DataHdr.Length)
// Not enough bytes in packet
Fail_Parser(STOP_TLV_LENGTH);
}
DataHdr.Length = TempLen;
NodeLoopCnt.ConPads = 0;
NodeLoopCnt.PadLen = 0;
if (S)
Common_End_of_Node( );
```

PLENDATAPAD Instruction

This instruction sets the DataHdr.Length for padding. Note that PLENDATAPAD should be called at most once for a TLV and should not be called if PLENDATA is called (lest the number of consecutive padding bytes is undercounted).

```
Pseudo Code for PLENDATAPADTLV:
TempILen = Len;
if (D)
TempILen++;
TempLen = ExtractLenFromArgs(D, Accum, Sz, Pos, Shift, TempILen,
STOP_TLV_LENGTH); // May not return
// Increment and check non-options loop count
TempAllPadLen = NodeLoopCnt.PadLen + TempLen;
if (NodeLoopCnt.ConPad >= LoopSpec.MaxCPad ||
TempAllPadLen > LoopSpec.MaxPlen)
Common_loop_Limit_Exceeded(STOP_OPTION_LIMIT); // Does not
return
NodeLoopCnt.ConPad++;
NodeLoopCnt.PadLen = TempAllPadLen;
TempLast = DataHdr.Offset + TempLen;
while (PktLen.ParseLen < TempLast && !PktLen.P)
Wait_for_more_data( ); // Still streaming header bytes
if (TempLen > DataBndLoop.DataBound || PktLen.ParseLen <
TempLast) {
// Not enough bytes in packet
Fail_Parser(STOP_TLV_LENGTH);
}
DataHdr.Length = TempLen;
if (S)
Common_End_of_Node( );
```

PLENDATATLVEOL Instruction

This instruction processes an "End of List" or EOL option. Perform length checks for options, and then do a normal stop of the sub-node.

```
Pseudo Code for PLENDATATLVEOL:
TempILen = Len;
if (D)
TempILen++;
TempLen = ExtractLenFromArgs(D, Accum, Sz, Pos, Shift, TempILen,
STOP_TLV_LENGTH); // May not return
TempLast = DataHdr.Offset + TempLen; while (PktLen.ParseLen <
```

-continued

```
TempLast && !PktLen.P)
  Wait_for_more_data( ); // Still streaming header bytes
  if (TempLen > DataBndLoop.DataBound || PktLen.ParseLen <
TempLast) {
  // Not enough bytes in packet
  Parser_Fail(STOP_TLV_LENGTH);
  }
  DataHdr.Length = TempLen;
  DataBndLoop.Loop = STOP_SUB_NODE_OKAY;
  if (S)
  Common_End_of _Node( );
```

Assembly for length instructions are illustrated in FIG. 60

If a size qualifier is present in [bhw] then if b is present Sz instruction field is set to 0 and <pos> if present is in the range 0 to 7 inclusive, if h is present Sz instruction field is set to 1 and <pos> if present is in the range 0 to 3 inclusive, if w is present Sz instruction field is set to 2 and <pos> if present is in the range 0 to 1 inclusive, else Sz instruction field is set 3. If stp is in mnemonic then S=1 else S=0. <pos> refers to the sub-register and is set in the Pos instruction field. <len> is an unsigned value in the range of 0 to 255 inclusive and is set in the Len instruction field. <mult> is 1, 2, 4, 8, 16, or 32 and is set in the Shift field of the instruction as $\log_2$(<mult>). If <mult> is not present then Shift is set to 0. <len min> is an unsigned value in the range of 1 to 256 inclusive and is set in the Len instruction field. <mult min> is 1, 2, 4, 8, 16, 32, or 64 and is set in the Shift field of the instruction as $\log_2$(<mult min>). If <mult min> is not present then Shift is set to 0.

16-Bit Immediate Instructions

The next instruction, set immediate instruction, set code, and the and-mask instruction perform operations that have a 16-bit argument in the instruction. The V-bit for PNEXTNODE indicates the next node is an overlay, the V-bit for PANDMASK and PSETIMM indicates to operate on Flags or Accum. The S-bit (stop bit) indicates the instruction is an end of the current node. Pos is the sub-register half-word position for PANDMASK. Next is the next node address or code for PNEXTNODE, Mask is the mask for PANDMASK. This is illustrated in FIG. 61.

PNEXTNODE Instruction

This instruction sets the Next register with the value from the Next field, preserving the encapsulation and next-encapsulation bits. The V bit indicates to set the overlay bit.

```
Pseudo Code for PNEXTNODE:
Temp = Next & ((1 << 28) | (1 << 30))
Next = (PC + (Next << 2)) | (V << 29) | Temp;
if (S)
Common_End_of_Node( );
```

PSETIMM Instruction

This instruction loads a 16-bit immediate value into the Flags or Accum register as indicated by the V bit. Note that the immediate value is not sign extended

```
Pseudo Code for PSETIMM:
Temp = Imm
if (V)
Flags = Imm;
Else
Accum = Imm
if (S)
Common_End_of_Node( );
```

PSETCODE Instruction

This instruction sets Next to a code value

```
Pseudo Code for PSETCODE
Next = SignExtend(Imm, 15)
if (S)
Common_End_of_Node( );
```

PSTP Instruction

This instruction performs a stop node.

Pseudo Code for PSTP
  Common_End_of_Nodeo;

PVARINT Instruction

This instruction reads an integer from the DataHdr that is a variant Protocol Buffers type. If the V bit is set then this indicates that a zigzag operation is done on the return value.

```
TempResult = 0;
// The maximum number of bytes for a variant is 10. Determine the
// minimum of 10, the data bound, and the available number of bytes in
// the packet
TempMaxBytes = PktLen.ParseLen − DataHdr.Offset;
if (DataBndLoop.DataBound < MaxBytes)
TempMaxBytes = DataBndLoop.DataBound;
if (TempMaxBytes > 10)
TempMaxBytes = 10;
for (TempIndex = 0; TempIndex < TempMaxBytes; TempIndex++) {
  // Read each byte and compose the varint value
  LoadFromMemory(TempVal, 1);
  TempResult = TempResult + ((TempVal & 0x80) << (TempIndex * 7))
  if (!(TempVal & 0x80)) {
  // Marks the last byte of a varint
  goto _varint_success;
  }
}
// We never saw the last byte of the varint, this is a parser error
Fail_Parser(STOP_TLV_LENGTH);
_varint_success: // Successfully read a varint
if (V) {
  // Perform zigzag operation
  TempVal = (TempVal >> 1) ^ (~(TempVal & 1) + 1);
}
Accum = Temp Val;
if (S)
Common_End_of_Node( );
```

PANDMASK Instruction

This instruction ANDs a mask with Flags or Accum as indicated by the V bit and stores the value in Flags or Accum respectively. It is used to consume flags (such as from a secondary CAM handler for a multi-bit flag).

```
Pseudo Code for PFLAGSMASK:
TempBitPos = Pos * 16;
TempVMask = (Mask << TempBitPos) | ~(0xFFFF << TempBitPos);
if (V)
Flags = Flags & TempVMask;
Else
Accum = Accum & TempVMask;
if (S)
Common_End_of_Node( );
```

Assembly for next instructions, as illustrated in FIG. 62.

If stp is in mnemonic then S=1 else S=0. If ov, indicating the next node is an overlay, is in the mnemonic for PNEXTNODE then V=1 else V=0. <reloc-address> is in the range 0 to 0x3FFFC and must be a multiple of four; this is set in the Next instruction field with the value right shifted by two bits. If alt is in the mnemonic then the V bit set; this indicates the alternate value is returned by PVARINT.

<mask> is a sixteen bit mask value set in Mask, <imm> is a sixteen bit mask value set in Imm.

Extract and Loop Instructions

The PEXTRACT instruction extracts an arbitrary set of contiguous bits from a parser register, and the PLOOP instruction starts a general loop. This is illustrated in FIG. 63

PEXTRACT Instruction

This instruction extracts an arbitrary set of contiguous bits from a parser register, and stores them in pflags or paccum based on the V-bit.

```
Pseudo Code for PEXTRACT:
Temp = parse_regs[Preg];
if (BitLen < 64)
TempVal = (Temp >> BitPos) & ((1ULL << BitLen) – 1)
Else
TempVal = (Temp >> BitPos)
if (V)
Flags = Temp Val;
Else
Accum = Temp Val;
if (S)
Common_End_of_Node( );
```

PLOOP Instruction

This instruction starts a general loop (simple counter loop for instance).

Pseudo Code for PLOOP:

Common_Loop Heado;

Assembly for extract and loop instructions. This illustrated in FIG. 64.

If stp is in mnemonic then S=1 else S=0. <preg> is a parser register p0-p31 (ABI names pobjref phdrbas, pmdbase, pcurhdr, pdathdr, ppktlen, pfofnsq, ppktinf pinbase, pnext, ppendwk, pdbndlp, pexcode, paccum, pflags, pndlcnt, pcount, pconfig, pcntlim, pctarcf pctarsz, ploopsp, ptlvsp, pokay, pfail, pwild, palwild, patent, ppostlp, pcmpfal, ptimstp). <bit-pos> is a value in the range 0 to 63 inclusive, and <bit len> is a value in the range 1 to 64 where <bit_pos>+<bit len> is less than or equal to sixty-four.

Counter Instructions

There are three instructions to manipulate the seven user defined counters. PINCCNTR increments a counter, PSETCNTRBIT sets a bit in a counter (as a flag for instance), and PRESETCNTR resets a counter to zero. Optionally, the value of the counter before or after the operation (indicated by ValO) may be returned in Flags or Accum (as indicated by F). The S-bit is a stop bit that indicates that this instruction is the end of a node. This illustrated in FIG. 65.

PINCCNTR Instruction

This instruction increments the encapsulation depth or one of the seven user defined counters. Cntr indicates the counter where a value of zero is for encapsulation depth and values one to seven correspond to counters 1 to 7. ValO indicates if the per or post operation value in the counter is returned. If ValO is one then the pre operation value is returned, if ValO is two then the post operation value is returned, else no value is returned. If a counter value is returned, it is set in Accum if F is zero, or Flags if F is one. The S-bit is a stop bit that indicates that this instruction is the end of a node.

```
Pseudo Code for PINCCNTR:
if (Cntr == 0) {
// Increment encapsulation depth
```

-continued

```
TempOldVal = Counters.Encap;
Common_Increment_Encap( );
TempNewVal = Counters.Encap;
} else { // Cntr <= 7
// Increment a user define counter
(TempOldVal, TempNewVal) = Common_Increment_Counter(Counter);
}
if (ValO == 1) // Return pre-op value
if (F)
Flags = TempOldVal
Else
Accum = TempOldVal
} else if (ValO == 2) // Return post-op value
if (F)
Flags = TempNewVal
Else
Accum = TempNewVal
}
if (S)
Common_End_of_Node( );
```

PSETCNTRBIT Instruction

This instruction sets a bit in a counter for one of the seven user defined counters. Cntr indicates the counter where values one to seven correspond to counters 1 to 7 (if Cntr is zero no operation is performed). Bnum is the bit position to set in the counter. ValO indicates if the per or post operation value in the counter is returned. If ValO is one then the pre operation value is returned, if ValO is two then the post operation value is returned, else no value is returned. If a counter value is returned, it is set in Accum if F is zero, or Flags if F is one. The S-bit is a stop bit that indicates that this instruction is the end of a node.

This instruction can be used to track occurrences of an event such as an instance of a particular TCP option when parsing a packet. For instance, bit #0 might be set when the MSS option is seen, bit #1 might be set when the window scaling option is seen, etc. If the limit exceeded bit is set for the counter, that is CounterLimitsConfig.E<cntr>, then if a bit is already set in the counter it is considered an error. This is useful to enforce that only one occurrence of an event is allowed, for instance in the TCP options case the parser could be configured to fail if two MSS options are in the same TCP packet.

```
Pseudo Code for PSETCNTRBIT:
if (Counter != 0)
// Set bit in a user define counter
TempBits = 1 << Bnum;
(TempOldVal, TempNewVal) =
Common_SetBit_Counter(Counter, TempBits);
if (ValO == 1) { // Return pre-op value
if (F)
Flags = TempOldVal
Else
Accum = TempOldVal
} else if (ValO == 2) // Return post-op value
if (F)
Flags = TempNewVal
Else
Accum = TempNewVal
}
}
if (S)
Common_End_of_Node( );
```

PRESETCNTR Instruction

This instruction resets one of the seven user defined counters. Cntr indicates the counter where values one to seven correspond to counters 1 to 7 (if Cntr is zero no operation is performed). If ValO is one then the pre operation value is returned, else no value is returned. If a counter value is returned, it is set in Accum if F is zero, or Flags if F is one.

```
Pseudo Code for PRESETCNTR:
if (Cntr != 0) {
  if (Cntr == 1) {
    TempOldVal = Counters.Cntr1;
    Counters.Cntr1 = 0;
  } else if (Counter == 2) {
    TempOldVal = Counters.Ctr2;
    Counters.Cntr2 = 0;
  } else if (Counter == 3) {
    TempOldVal = Counters.Cntr3;
    Counters.Cntr3 = 0;
  } else if (Counter == 4) {
    TempOldVal = Counters.Cntr4;
    Counters.Cntr4 = 0;
  } else if (Counter == 5) {
    TempOldVal = Counters.Cntr5;
    Counters.Cntr5 = 5;
  } else if (Counter == 6) {
    TempOldVal = Counters.Cntr6;
    Counters.Cntr6 = 0;
  } else if (Counter == 7) {
    TempOldVal = Counters.Cntr7;
    Counters.Cntr7 = 0;
  }
  if (ValO == 1) { // Return pre-op value
    if (F)
      Flags = TempOldVal
    Else
      Accum = TempOldVal
  }
  // No need to return post-op value since it's always zero
  if (S)
    Common_End_of_Node( );
```

Assembly for counter instructions is illustrated in FIG. 66.

If stp is in mnemonic then S=1 else S=0. [1234567] indicates one of the seven user-defined counters. <bit-pos> is a value between zero and seven and is set in Bnum. If preval is present in the mnemonic then ValO is set to 1, else if postval is present in the mnemonic then ValO is set to 2, else ValO is set to 0. If paccum is present as the destination register then F is set to 0, if pflags is present as the destination register then F is set to 1, else F is set to 0.

Content Addressable Memory (CAM) Instructions

One of the key features of the hardware parser is a CAM structure that can be used for quickly looking up what should be the next node. The CAM structure has a 20-bit key and returns a 32-bit value. If Share is non-zero then that indicates one of fifteen shared subtables numbered one to fifteen; the key is composed of the four bit Share value followed by a sixteen bit match value. If Share is zero then that indicates a non-shared sub-table; the key is composed of four zero bits, followed by an eight bit subtable selector that is derived from the PC address of the CAM instruction, followed by an eight bit match value. The match value, either up to eight bits for a non-shared table, or up to sixteen bits for a shared table, is taken from a sub-register of the Accum of Flag register, depending on the F bit, as indicated by Sz and Pos. The S bit is the stop bit, the A bit indicates the alternate wild card is selected. This illustrated in FIG. 67.

PCAM Instruction

This instruction does a CAM lookup on either an Accum or Flags sub-register and places the result in the Accum register so it can be used for comparison or length computations. It also has a stop bit to potentially signal the end of a node.

```
Pseudo Code for PCAM:
TempRes = CommonCamLookup(Sz, Pos, F, Share);
if (TempRes == 0xFFFFFFFFFFFFFFFF) // CAM miss
  TempRes = CommonCamMiss(Miss); // May not return
Accum = TempRes;
if (S)
  Common_End_of_Node( );
```

PCAMNEXT Instruction

This instruction performs a CAM lookup on either an Accum or Flags sub-register and places the result in the Next register thereby setting the next node to process. It also has a stop bit to potentially signal the end of a node.

```
Pseudo Code for PCAMNEXT:
TempRes = CommonCamLookup(Sz, Pos, F, Share);
if (TempRes == 0xFFFFFFFFFFFFFFFF) // CAM miss
  TempRes = CommonCamMiss(Miss); // May not return
// Set Next to the new value, preserve and control bits that
// are set in the old value for Next
Next = (TempRes & 0xFFFFFF |
  ((Next & 0x7F000000) | TempRes) & ~0xFFFFFF);
if (S)
  Common_End_of_Node( );
```

PCAMJUMP Instruction

This instruction performs a CAM lookup on a sub-register for either Accum or Flags and jumps to the resultant address. It also has a stop bit to potentially signal the end of a node.

```
Pseudo Code for PCAMJUMP:
TempRes = CommonCamLookup(Sz, Pos, F, Share);
if (TempRes == 0xFFFFFFFFFFFFFFFF) // CAM miss
  TempRes = CommonCamMiss(Miss); // May not return
if (!IS_RET_CODE(TempRes)) { // Have a valid address to jump to
  Goto_Relative_Ins_Addr(TempRes & 0xFFFFFF);
} else if (TempRes == OKAY_RET)
  ; // Just continue
else if (TempRes == STOP_OKAY)
  Okay_Parser( );
else if (TempRes == STOP_NODE_OKAY)
  Common_End_of_Node( ); // Does not return
else if (TempRes == STOP_SUB_NODE_OKAY) { // Loop break
  DataBndLoop.Loop = STOP_SUB_NODE_OKAY;
  Common_End_of_Node( ); // Does not return
} else { // Abnormal stop of parser
  Parser_Exit(TempRes);
}
if (S)
  Common_End_of_Node( );
```

PCAMJUMPLOOP Instruction

This instruction performs a CAM lookup and jumps to the resultant address in the context of a loop iteration. It also has a stop bit to potentially signal the end of a node.

PCAMJUMPLOOP is called for plain loops, TLV loops, and Flags fields loops. Accum or Flags is expected to contain the lookup value. In the case of a TLV loop this will be a TLV type that was loaded by PLOADTLVLOOP, and for a Flags loop the Accum register contains the index of the flag to lookup that was determined by PFLAGSLOOP.

```
Pseudo Code for PCAMJUMPLOOP:
TempRes = CommonCamLookup(Sz, Pos, F, Share)
if (TempRes == 0xFFFFFFFFFFFFFFFF) // CAM miss
  TempRes = CommonCamMiss(Miss); // May not return
if (!IS_RET_CODE(TempRes)) { // Have a valid address to jump to
  Goto_Relative_Ins_Addr(TempRes & 0xFFFFFF);
} else if (TempRes != OKAY_RET) {
```

```
// Treat everything except OKAY_RET as a loop exit
Loop = TempRes;
Common_End_of_Node( )
}
if (S)
Common_End_of_Node( );
```

PCAMJUMPTLVLOOP Instruction

This instruction performs a CAM lookup and jumps to the resultant address in the context of a TLV iteration. PCAMJUMPTLVLOOP is called in conjunction with PTLVFASTLOOP. It also has a stop bit to potentially signal the end of a node.

```
Pseudo Code for PCAMJUMPTLVLOOP:
TempRes = CommonCamLookup(Sz, Pos, F, Share);
if (TempRes == 0xFFFFFFFFFFFFFFFF) { // CAM miss
  if (!F) {
    // We're not setting flags so assume that the lookup
    // value is a TLV type that was not matched in the CAM.
    // Check if the type is to be ignored per TLVSpec
    TempType = ExractSubReg(Accum, Sz, Pos);
    if (TLVSpec.IgnMask &&
        (TLVSpec.IgnMask & TempType) == TLVSpec.IgnMask)) {
      // Ignore unknown TLV per type bits
      TempRes = OKAY_RET;
    } else
      TempRes = CommonCamMiss(Miss); // May not return
  } else
    TempRes = CommonCamMiss(Miss); // May not return
}
if (!IS_RET_CODE(TempRes)) // Have a valid address to jump to
  Goto_Relative_Ins_Addr(TempRes & 0xFFFFFF);
else if (TempRes != OKAY_RET) {
  // Treat everything except OKAY_RET as a loop exit
  Loop = TempRes;
  Common_End_of_Node( );
}
// TempRes == OKAY_RET
if (S)
Common_End_of_Node( );
```

Assembly for CAM instructions as illustrated in FIG. 68. {\*\*miss\*\*} indicates an action to take on a CAM miss and is one of:

{\*\*miss\*\*} not present: indicates to continue
.wild: indicates to use WildCard
.alt: indicates to use AltWildCard
.stop: indicates to stop the parser with success
.stopsub: indicates to stop the current sub-node or loop iteration with success
.fail: indicates to stop the parser on with failure
.failsub: indicates to stop the current sub-node or loop iteration with failure If a size qualifier is present in [nbh] then if n is present Sz instruction field is set to 0 and <pos> if present is in the range 0 to 15 inclusive, if b is present Sz instruction field is set to 1 and <pos> if present is in the range 0 to 7 inclusive, if h is present Sz instruction field is set to 2 and <pos> if present is in the range 0 to 3 inclusive. <pos> refers to the sub-register and is set in the Pos instruction field. <share> is a value in the range 1 to 15 inclusive and is set in the Share instruction field if present. If pc is the share argument then Share is set to 0 (indicating that the PC is used to derive table specifier)

Index Array Instructions

These instructions are used to lookup a table of thirty-two bit entries in an array. The match index is taken from a sub-register of the Accum of Flag register, depending on the F bit, as indicated by Sz and Pos. The array memory is contained in the hardware at base address in SysArrayBase( ) and for each lookup a Base offset is provided that is an element offset into a subarray. The S-bit is a stop bit that indicates that this instruction is the end of a node. This is illustrated in FIG. 69.

PARR Instruction

This instruction does an array lookup on either an Accum or Flags sub-register and places the result in the Accum register so it can be used for comparison or length computations. It also has a stop bit to potentially signal the end of a node.

```
Pseudo Code for PARR:
if (F)
  TempVal = Flags;
Else
  TempVal = Accum;
Temp = ExractSubReg(TempVal, Sz, Pos);
TempRes = CommonArrayLookup(Base, TempVal)
Accum = TempRes;
if (S)
Common_End_of_Node( );
```

PARRNEXT Instruction

This instruction does an array lookup on either an Accum or Flags sub-register and places the result in the Next register thereby setting the next node to process. It also has a stop bit to potentially signal the end of a node.

```
Pseudo Code for PARRNEXT:
if (F)
  TempReg = Flags;
Else
  TempReg = Accum;
Temp = ExractSubReg(TempReg, Sz, Pos);
TempRes = CommonArrayLookup(Base, Temp)
Next = (TempRes & 0xFFFFFF
  ((Next & 0x7F000000) | TempRes) & ~0xFFFFFF);
if (S)
Common_End_of_Node( );
```

PARRJUMP Instruction

This instruction performs an array lookup on a sub-register for either Accum or Flags and jumps to the resultant address. It also has a stop bit to potentially signal the end of a node.

```
Pseudo Code for PARRJUMP:
if (F)
  TempReg = Flags;
Else
  TempReg = Accum;
Temp = ExractSubReg(TempReg, Sz, Pos);
TempRes = CommonArrayLookup(Base, Temp)
if (!IS_RET_CODE(TempRes)) // Have a valid address to jump to
  Goto_Relative_Ins_Addr(TempRes & 0xFFFFFF);
else if (TempRes == OKAY_RET)
  ; // Just continue
else if (TempRes == STOP_OKAY)
  Parser_Okay(STOP_OKAY);
else if (TempRes == STOP_NODE_OKAY) {
  Common_End_of_Node( ); // Does not return
```

```
} else if (TempRes == STOP_SUB_NODE_OKAY) { // Loop break
Loop = STOP_SUB_NODE_OKAY;
Common_End_of_Node( ); // Does not return
} else { // Abnormal stop of parser
Parser_Fail(TempRes);
}
if (S)
Common_End_of_Node( );
```

PARRJUMPLOOP Instruction

This instruction performs an array lookup and jumps to the resultant address in the context of a loop iteration. It also has a stop bit to potentially signal the end of a node.

PARRJUMPLOOP is called for plain loops, TLV loops, and Flags fields loops. Accum or Flags is expected to contain the lookup value. In the case of a TLV loop this will be a TLV type that was loaded by PLOADTLVLOOP, and for a Flags loop the Accum register contains the index of the flag to lookup that was determined by PFLAGSLOOP.

```
Pseudo Code for PARRJUMPLOOP:
if (F)
TempReg = Flags;
Else
TempReg = Accum;
Temp = ExractSubReg(TempReg, Sz, Pos);
TempRes = CommonArrayLookup(Base, Temp)
if (!IS_RET_CODE(TempRes)) // Have a valid address to jump to
Goto_Relative_Ins_Addr(TempRes & 0xFFFFFF);
else if (TempRes != OKAY_RET) {
// Treat everything except OKAY_RET as a loop exit
Loop = TempRes;
Common_End_of_Node( );
}
if (S)
Common_End_of_Node( );
```

Assembly for array instructions. This is illustrated in FIG. 70.

If a size qualifier is present in [nbh] then if n is present Sz instruction field is set to 0 and <pos> if present is in the range 0 to 15 inclusive, if b is present Sz instruction field is set to 1 and <pos> if present is in the range 0 to 7 inclusive, if h is present Sz instruction field is set to 2 and <pos> if present is in the range 0 to 3 inclusive. <pos> refers to the sub-register and is set in the Pos instruction field. <base> is the base offset in units of words (thirty-two bits) and is in the range 0 to 511 inclusive.

Compare Immediate Half Word Instructions

Compare a half word in a sub-register of the Accum to an 16-bit immediate value. Pos field indicates the halfword sub-register (0, 1, 2, or 3). Value is the value for comparison. Er describes action to take when the compare evaluates to false. If the N bit is not sent the compare is for inequality, when N is not set the compare is for equality. This is illustrated in FIG. 71.

```
Pseudo Code for PCMPIH:
Temp = ExractSubReg(Accum, 2, Pos2);
if (N) {
if (Temp == Value) // Test for inequality
Common2BitError(Er2); // Does not return
} else {
if (Temp != Value) // Test for equality
Common2BitError(Er2); // Does not return
}
// Compare succeeded
```

Assembly for compare halfword immediate instructions. This is illustrated in FIG. 72.

<pos> indicates the half word sub-register position and is a value from 0 to 3 inclusive and is set in the Pos field in the instruction. <value> is a value in the ranges 0 to 0xFFFF inclusive and is set in Value in the instruction. If stop is present in the mnemonic then er is set to 0, if stopsub is present in the mnemonic then er is set to 1, fail is present in the mnemonic then er is set to 2, if cmpfail is present in the mnemonic then er is set to 3.

Compare Immediate Byte Instruction

Compare a byte in a sub-register of the Accum to an 8-bit Value with a Mask. If Mask is 0xFF then the instruction performs a simple comparison to Value. Er describes action to take when the compare evaluates to false. Pos is the position of the byte sub-register. This is illustrated in FIG. 73.

PCMPIB instruction

Compare a byte sub-register in Accum with a mask applied to an immediate value for equality.

```
Pseudo Code for PCMPIB:
Temp = ExractSubReg(Accum, 1, Pos2);
if ((Temp & Mask) != Value) // Test for equality
Common2BitError(Er2); // Does not return
// Compare succeeded
```

PCMPINEB Instruction

Compare a byte sub-register in Accum with a mask applied to an immediate value for equality.

```
Pseudo Code for PCMPNEIB:
Temp = ExractSubReg(Accum, 1, Pos2);
if ((Temp & Mask) == Value) // Test for inequality
Common2BitError(Er2); // Does not return
// Compare succeeded
```

Assembly for compare byte immediate instructions. This is illustrated in FIG. 74.

<pos> indicates the byte sub-register position and is a value from 0 to 7 inclusive and is set in the Pos field in the instruction. <value> is a value in the ranges 0 to 255 inclusive and is set in Value in the instruction, <mask> if present is in the range 0 to 0xFF inclusive and is set to the Mask field in the instruction, it <mask> is not present the default value of 0xFF is set in the Mask field of the instruction. If stop is present in the mnemonic then er is set to 0, if stopnode is present in the mnemonic then er is set to 1, if stopsub is present in the mnemonic then er is set to 2, otherwise if no descriptor is present in the mnemonic then er is set to 3.

Compare for Inequality Instructions

Compare a nibble, byte, half-word, or word sub-register in Accum, as indicated by Sz and Pos, to an immediate byte Value for inequality (less than, less than or equal to, greater than, or greater than or equal to). Er describes action to take when the compare evaluates to false. The S-bit is a stop bit that indicates that this instruction is the end of a node. This is illustrated in FIG. 75.

PCMPILTB

Compare a sub-register in Accum to be less than a byte immediate value.

PCMPILEB

Compare a sub-register in Accum to be less than or equal to a byte immediate value.

PCMPIGTB

Compare a sub-register in Accum to be greater than a byte immediate value.

PCMPIGTEB

Compare a sub-register in Accum to be greater than or equal to a byte immediate value.

Pseudo Code for PCMPI{LT,LTE,GT,GTE}:

```
TempVal = ExractSubReg(Accum, Sz, Pos);
if (Func3 == 0)
Temp = (TempVal < Value);
else if (Func3 == 1)
Temp = (TempVal <= Value);
else if (Func3 == 2)
Temp = (TempVal > Value);
else if (Func3 == 3)
Temp = (TempVal >= Value);
if (!Temp) // Check boolean value
Common2BitError(Er2); // Does not return
// Compare succeeded
```

Assembly for compare byte immediate instructions. This is illustrated in FIG. 76.

If a size qualifier is present in [nbhw] then if n is present Sz instruction field is set to 0 and <pos> if present is in the range 0 to 15 inclusive, if b is present Sz instruction field is set to 1 and <pos> if present is in the range 0 to 7 inclusive, if h is present Sz instruction field is set to 2 and <pos> if present is in the range 0 to 3 inclusive, else Sz instruction field is set 3 (for w) and <pos> if present is in the range 0 to 1 inclusive. <pos> refers to the sub-register and is set in the Pos instruction field. <value> is in the range 0 to 255 inclusive. If stop is present in the mnemonic then er is set to 0, if stopnode is present in the mnemonic then er is set to 1, if stopsub is present in the mnemonic then er is set to 2, otherwise if no descriptor is present in the mnemonic then er is set to 3.

Initialize Parser for Next Packet Instruction

The PINITPARSER instruction initializes the parser state to process a PDU. This is illustrated in FIG. 77.

The arguments to this instruction are in the "a" registers following standard C calling conventions in RISC-V. Note the "a" registers are registers number 10 through 17.

The arguments are:
a0: <address_of_packet>, base address of the packet headers
a1: <packet len>, full length of the packet
a2: <metadata_address>, base address for metadata
a3: (<seqno><<32)|<checksum>, sequence number assigned by the dispatcher and full packet checksum computed on ingress
a4: <IFID>, interface identifier of the ingress
a5: <object_reference>
a6: <timestamp>
a7: <pkt_ctx>: Packet context received in the work item Pseudo Code for PINITPARSER:
InitializeParser(regs[10], regs[11], regs[12], regs[13], regs[14], regs[15], regs[16], regs[17]);

Assembly for initialize parser instruction. This is illustrated in FIG. 78.

SDPU Runthread and Event Loop Instructions

PRUNTHREAD, EVENTLOOP, and PEVENTLOOPEND are specialized instructions to implement worker thread scheduling and the parser event loop in the SDPU. See section below "SiPanda Parser and the SDPU" for a description of the parser's place in the SDPU architecture.

PRUNTHREAD

The PRUNTHREAD instruction requests that work be performed to process a protocol layer in a worker thread. A work item indicates a function to run in a worker thread to process a protocol layer and includes the parser state describing the protocol layer to be processed. When PRUNTHREAD is executed, a snapshot of the material parser state is taken and placed in an allocated work item which is a memory object. To simplify this, parser registers zero through seven are overlaid with the work item data structure such that taking the snapshot is done by a block copy for the parser registers, sixty-four bytes, to the address of an allocated work item in memory. The parser sends these messages to the cluster to initiate scheduling of the worker threads. The cluster scheduler processes the message and schedules threads to run all the work items in the list. This is illustrated in FIG. 79.

FuncNum indicates the function number that indexes into a table of functions to run. S is the stop bit.

Pseudo Code for PRUNTHREAD:

```
// Write the function number to register so then we can just do block
// to create the work item
FrameOffFnumSeqno.FuncNum = FuncNum
(TempWorkItem, TempWorkItemIndex) =
AllocWorkItem( );
BlockStoreP0_TO_P7(TempWorkItem); // Copy work item (in registers)
if (PendingWork.PendingWork != 0xFFFF) {
// Create a sixty-four bit message. This has two fields to set
// Type and Work
TempMessage = THREAD_START_MSG
TempMessage |= (TempWorkItemIndex << 48);
TempMessage.Work = PendingWork.PendingWork;
// Send the work to the cluster scheduler
Fifo_Enqueue(parser_to_clussched_fifo, TempMessage);
}
PendingWork.PendingWork = TempWorkItemIndex;
if (S)
Common_End_of_Node( );
```

Assembly for run thread instructions. This is illustrated in FIG. 80.

PENVENTLOOP and PEVENTLOQEND

The PEVENTLOOP instruction implements the start of the parser event loop for the SDPU. The instruction listens on FIFOs for "start parser" messages from the cluster frontend, initializes the parser for the next packet, and parses packets as requested by the cluster frontend by jumping to a parsing function. PEVENTLOOPEND performs the event loop end processing upon return from a parser. The instruction checks for pending work in PendingWork.PendingWork, and if there it sends a "last thread in thread set" message on a FIFO to the cluster scheduler; if there is no pending work item then the packet is simply freed (i.e. this is a silent drop). The instruction then loops to the head of the event loop. This is illustrated in FIG. 81.

Return address is a signed PC relative branch address that is set as the return address when a parser function is run. This is set as <address_offset>/4.

The pseudo code for these instructions is in the "SiParser and the SDPU" section below.

Assembly for Parser Event Loop instructions. This is illustrated in FIG. 82.

<return address> is the return address when the parser completes. If the value is four, then the return address is the next instruction after prs.eventloop.

prs.eventloop and prs.eventloopend work in conjunction to implement the parser event. The code for the tightest possible loop would be:

j prs_start
prs_end: prs.eventloopend
prs_start: prs.eventloop prs_end

The first time this code is run, the jump to prs_start starts the parser event loop for the first iteration. When the parser invokes a parser function, the return address is prs_end which is the prs.eventloopend instruction. Subsequently, when the prs.eventloopend completes the next instruction is prs.eventloop thus starting the next iteration of the event loop.

Data Extract Instructions

PDATAEXTRACT runs a set of pseudo instructions to optimize metadata extraction. The pseudo instructions are specialized thirty-bit instructions that are not in RISC-V format. A pseudo instruction performs a copy from header data to metadata to perform data extraction. These instructions encapsulate both the load and store operations, and they can move more than eight bytes in one instruction.

An example pseudo instruction to save the IPv6 addresses to metadata is:

prs.pseudo.move pmdbase+24, pcurptr, 32

```
Pseudo Code for PDATAEXTRACT: This is illustrated in FIG. 83.
// Compute the address of the first pseudo instruction
TempPseudoAddr = DataExtractBase;
TempPseudoAddr += InsIndex * 8;
// Run the pseudo instructions. The pseudo instruction
Execute_Pseudo_Instruction(TempPseudoAddr, InsNum + 1);
```

Assembly for Data ExtractInstructions. This is illustrated in FIG. 84.

InsIndex indicates the index of the first pseudo instruction to execute, NumIns plus one is the number of pseudo instructions to run. S is the stop bit.

Data Extraction Pseudo Instructions

Data Extraction pseudo instructions are specialized non-RISC-V instructions that perform metadata extraction, or writes of immediate data to metadata. These are thirty-two bit instructions that don't use canonical RISC-V opcodes.

PSEUDOMOVE moves data from the current header or data header to metadata for some number of bytes. The destination may use a counter array index, and endian swap before a store may be requested. This instruction would be used in lieu of pairs of PLOAD and PSTORE instructions. PSEUDONIBBMOVE and PSEUDONIBBMOVE moves a nibbles from data from the current header or data header to metadata for some number of nibbles. The destination may use a counter array index, and endian swap before a store may be requested. The instructions are used in lieu of pairs of PLOAD and PSTORE instructions where Shift and Blen are set appropriately in PLOAD to load nibbles. PSEUDO-MOVEI16 and PSEUDOMOVEI16 store an eight or sixteen bit immediate value. These instructions can be used in lieu of PSTOREIMM instructions. This is illustrated in FIG. 85.

If the F bit is not set then the target destination base address is Metadata Base, else the dest address is the frame pointer, Metadata Base plus 4*FrameOffFnumSeqno.FrameOffset. The DstOffset is relative to the address specified by the base destination address. The SrcOffset is relative to the address specified by either the current header pointer (PktHdrBase+CurHdr.Offset) or the data header pointer (PktHdrBase+DataHdr.Offset). Specifically, if the X bit is set the address loaded from (PktHdrBase+DataHdr.Offset+Offset). If the X bit is not set the address loaded from is (PktHdrBase+CurHdr.Offset+Offset). If Sind is non-zero, an array offset is added to the offset and Sind corresponds to counter Cntr1, Cntr2, . . . , Cntr7 where the counter's value serves as the array index. The element size of the array associated with a counter index is in CounterArraySzResEncConfig.Cntr<cntr>. For PSEUDEO-MOVE length is in bytes, for PSEUDONIBBMOVE and PSEUDONIBODMOVE, length is number of nibbles. E indicates that bytes are endian swapped before being stored.

```
Pseudo Code for PSEUDOMOVE
// Determine source and destination addresses
TempSrcAddress = Get_PSLoad_Src_Addr(SrcOffset, Length,
CurHdr.Offset, CurHdr.Length,
DataHdr.Offset, DataHdr.Length);
TempDstAddress = Get_Store_Dest_Addr(DstOffset_, F, Sind);
// If the source address is NULL that is because there are not enough
// bytes to perform the load. The caller of the pseudo instruction is
// expected to check this and raise an error if necessary. Here we'll
// just return without performing the move
if (TempSrcAddress != NULL && TempDstAddress != NULL) {
for (i = 0; i < Length; i++) {
TempByte = LoadFromMemory(TempSrcAddress + i, 1);
if (E) // Endian swap bytes
StoreToMemory(TempByte, TempDstAddress + Length -
) - i,
1);
Else
StoreToMemory(TempByte, TempDstAddress + i, 1);
}
}
```

```
Pseudo Code for PSEUDONIBBMOVE and PSEUDONIBODMOVE
if (Type == 1 || (Length & 1) == 1) {
// Even nibble offset, or odd nibble offset and odd length
TempSrcByteLength = (Length+ 1) / 2;
} else // Odd nibble offset and even length
TempSrcByteLength = (Length / 2) + 1;
}
// Determine source and destination addresses
TempSrcAddress   =   Get PSLoad_Src_Addr(SrcOffset,
TempSrcByteLength,
CurHdr.Offset, CurHdr.Length,
DataHdr.Offset, DataHdr.Length);
TempDstAddress = Get_Store_Dest_Addr(DstOffset_, F, Sind);
// If the source address is NULL that is because there are not enough
// bytes to perform the load. The caller of the pseudo instruction is
// expected to check this and raise an error if necessary. Here we'll
// just return without performing the move
if (TempSrcAddress != NULL && TempDstAddress != NULL) {
if(Type == 1)
TempO = 0;
else // Type == 2
TempO = 1;
CopyNibbles(TempDestAddress, TempSrcAddress, Length, E);}
```

```
Pseudo Code for PSEUDOSTOREI16
// Determine destination addresses
TempDstAddress = Get_Store_Dest_addr(DstOffset, F, Sind);
if (TempDstAddress != NULL)
StoreToMemory(TempDstAddress, Imm16, 2);
```

| Pseudo Code for PSEUDOSTOREI8 |
|---|
| // Determine destination addresses<br>TempDstAddress = Get_Store_Dest_addr(DstOffset, F, Sind);<br>if (TempDstAddress != NULL)<br>StoreToMemory(TempDstAddress, Imm8, 1) |

Pseudo Assembly for Data Extraction Pseudo Instructions

These pseudo instructions. These are not normal RISC-V instructions so an assembler would treat these as a different ISA. This is illustrated in FIG. 86. If pframe is the destination target then the F is set to one in the instruction opcode, if pdatptr is the source then X is set to one in the instruction opcode. If [cntr[1234567]] is present, then one of the seven user counters (Cntr1, Cntr2, Cntr3, Cntr4, Cntr5, Cntr6, or Cntr7) is being used as an array index where Sind is set as the corresponding value in the instruction. <SrcOffset> is an unsigned value in the range of 0 to 511 inclusive and is set in the SrcOffset instruction field. <DstOffset> is an unsigned value in the range of 0 to 511 inclusive and is set in the DstOffset instruction field. <Imm16> is a value in the ranges 0 to 0xFFFF inclusive and is set in Imm16 in the instruction. <Imm8> is a value in the ranges 0 to 0xFF inclusive and is set in Imm8 in the instruction.

Running Pseudo Instructions

The pseudo instructions are expected to be run in a near accelerator. The pseudo code for this is:

```
// Function:
//   Execute_Pseudo_Instruction(_ARG_Pseudo_Addr_,
_ARG_Num_Ins_);
//
// where _ARG_Pseudo_Addr_is the address of the first pseudo
// instruction, and _ARG_Num_Ins_is the number of pseudo
// instructions to run
  for (i = 0; i < _ARG_Num_Ins_; i++) {
    TempPseudoIns = LoadFromMemory(_ARG_Pseudo_Addr_ + (i * 4),
4);
    // Parse and execute pseudo instruction
    ParseAndRunPseudo(TempPseudoIns);
  }
Concurrency
```

The data extraction pseudo instructions are invoked by the PDATAEXTRACT instruction. The pseudo instruction can run in a coprocessor. It is also possible for the pseudo instructions to execute concurrently with other parser instructions subject to the following rules.

When PDATAEXTRACT a snapshot of CurHdr and DataHdr registers is saved for processing the pseudo instructions. This is done to allow CurHdr and DataHdr to be updated by subsequent parser instructions When PRSRUNTHREAD runs (specifically when a work item message is sent to the cluster scheduler), the pseudo operations for any preceding PDATAEXTRACT must be complete. This ensures that when a work thread runs it is able to see the metadata.

The PANDA Parser is a framework and API for programming protocol parser pipelines that utilizes the mechanisms and PANDA API for parallelism and serial data processing as described in this architecture. Protocol parsing is a fundamental operation in serial data processing such as networking processing. A protocol parser can be represented as a parse graph that shows various protocol layers that may be parsed and the relationships between layers. The processing of one data object can be thought as one "walk in the parse graph". At each node in the graph the corresponding protocol layer of a data object (protocol header in networking parlance) is parsed and processed. Processing may include validations, extracting of metadata from the protocol layer, and arbitrary protocol processing. Parsing is driven by a parser engine that performs the parse walk and calls processing functions for each layer. The parser engine parsers top level protocols, TLVs, and flag-fields.

The fundamental data structures of the PANDA parser are:
 Protocol nodes
 Parse nodes
 Protocol tables
 Parsers Protocol nodes provide the properties and functions needed to parse one protocol in a parse graph to proceed to the next protocol in the parse graph for a packet. A parse node contains common characteristics that reflect the standard protocol definition (for instance there is only one standard procedure to determine the length of an IP header). The parse walk over a protocol node requires determining the protocol type of the next node and the length of the current node. A protocol node has two corresponding functions that are implemented per a specific protocol:
 len: Returns the length of the current protocol layer (or protocol header)
 next_proto: Returns the protocol type of the next layer A parse node is an instantiation of one node in the parse graph of a parser being defined. A parse node includes a reference to the protocol node for the specific protocol, as well as customizable processing functions. A parse node allows defining two optional functions:
 extract_metadata: Extracts metadata, e.g. protocol fields, from a protocol header and saves it in the metadata memory and perform arbitrary protocol processing. This function might implement the full logic of protocol processing FIG. 87 is an example of a PANDA parser and relationships between related structures.

A protocol table is a lookup table that takes a protocol number as input as the protocol type of the next protocol layer, and returns the parse node for the next layer. The protocol numbers can be the canonical protocols numbers, for instance a protocol number might be an IP protocol number where the table contains parse nodes for various IP protocols (e.g. for TCP, UDP, etc.). Non-leaf parse nodes have a reference to a corresponding protocol table, for instance, a parse node for IPv6 would refer to a protocol table that takes an IP protocol number as input and returns the parse node for the corresponding IP protocol.

A parser defines a parser and includes a set of parse nodes, each having a reference to a protocol node. Non-leaf parse nodes have a reference to a protocol table. The parse nodes are connected to be a graph via the relationships set in the protocol tables. The parser can be represented as a declarative data structure in C and can equivalently be viewed as a type of Finite State Machine (FSM) where each parse node is one state and transitions are defined by next protocol type and associated protocol tables. A parser defines a root node which is the start node for parsing an object (for networking the root is typically Ethernet).

Figure 87:
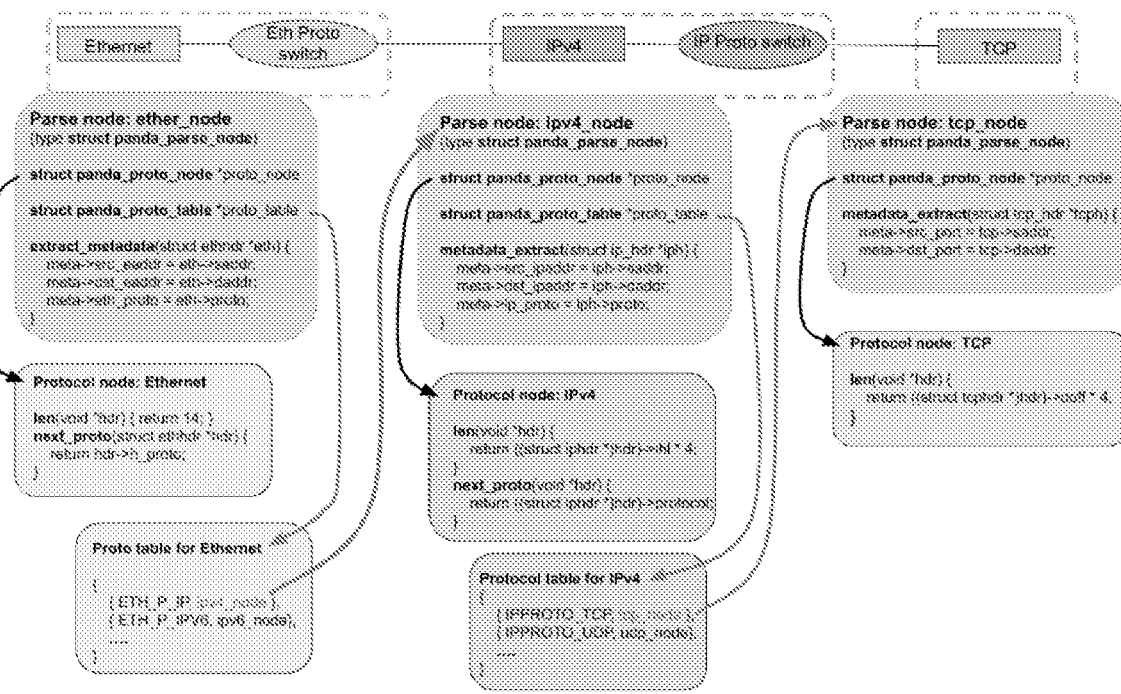
FIG. 87 illustrates a simple parser for canonical TCP/IP over Ethernet

FIG. 87 illustrates a simple parser for canonical TCP/IP over Ethernet including example parse nodes and protocol nodes for Ethernet, IPv4, and TCP.

Type-Length-Value tuples (TLVs) are a common networking protocol construct that encodes variable length data in a list. Each datum contains a Type to discriminate the type of data, a Length that gives the byte length of the data, and a Value that is the bytes of data. TLVs are parsed in the context of a top level protocol, for instance TCP options and IPv4 options are represented by TLVs parsed in the context of a TCP header and IPv4 header respectively.

A protocol node with TLVs is an extended protocol node that describes a protocol that includes TLVs. A protocol node with TLVs provides the properties and functions to parse TLVs in the context of a top level protocol and includes three operations: tlv_len, tlv_type, and tlv_data_offset. The tlv_len function returns the length of a TLV (and therefore the offset of the next TLV), tlv_type returns the type of a TLV, and tlv_data_offset returns the offset of the data within a TLV. Note that tlv_len returns the length of the whole TLV including any TLV header, so the length of just the data in a TLV is the total length of the TLV as given by tlv_len minus the offset of the data as given by tlv_data_offset.

A parse node with TLVs is an extended parse node that has reference to a protocol node with TLVs and a TLV table. A TLV table is a lookup table that takes a TLV type as input and returns a TLV parse node for the TLV.

A TLV parse node describes the processing of one type of TLV. This includes two optional operations: extract_tlv_metadata and handle_tlv. These have the same function prototypes as the similarly named functions defined for a parse node (see above) where extract_tlv_metadata extracts metadata from a TLV and places it into the metadata structure, and handle_tlv allows arbitrary processing of the TLV.

Figure 88:
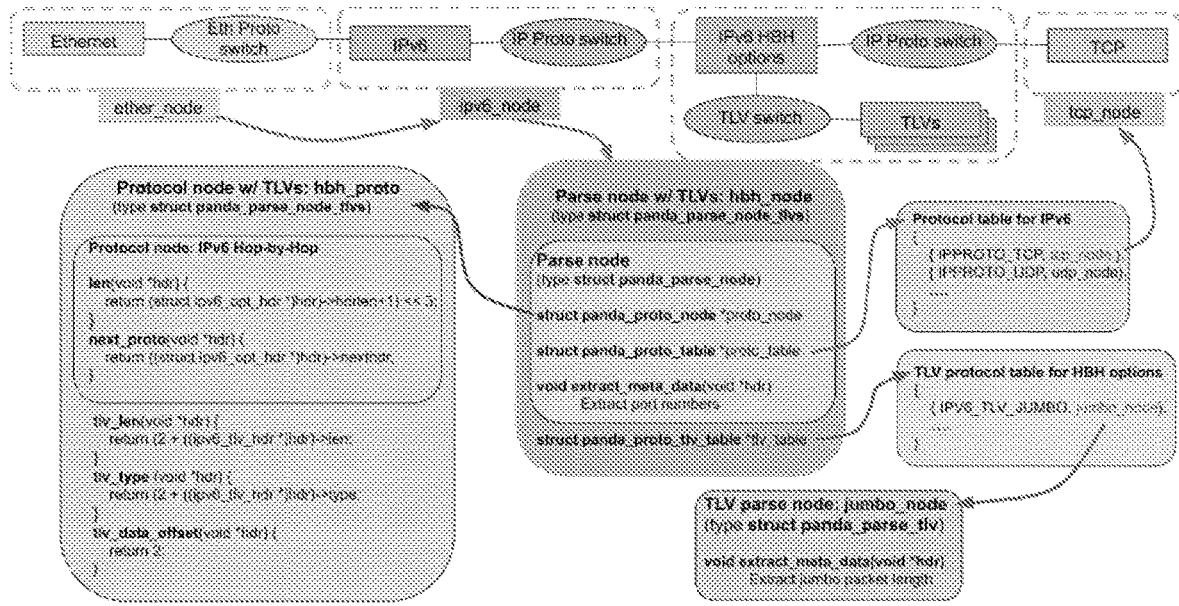
FIG. 88 illustrates a simple PANDA parser.

FIG. 88 illustrates a simple PANDA parser that includes a TLV parse node for IPv6 Hop-by-Hop Options. The TLV parse node contains both a parse node for the Hop-by-Hop extension header and fields for parsing the options within the extension header. The associated TLV table contains one entry for extracting data from the IPv6 Jumbo payload option.

Flag-fields are a common networking protocol construct that encodes optional data in a set of flags and data fields. The flags indicate whether or not a corresponding data field is present. The data fields are fixed length and ordered by the ordering of the flags indicating the presence of the fields. Examples of protocols employing flag fields are GRE and GUE.

A flag-field structure defines one flag/field combination. This structure includes: flag, mask, and size fields. The flag value indicates the flag value to match, the mask is applied to the flags before considering the flag value (i.e. a flag is matched if flags & mask==flag), and size indicates size of the field.

A protocol node with flag-fields is an extended protocol node that describes a protocol that includes flag-fields. A protocol node with flag-fields has two flag-fields related operations: flags returns the flags in a header and fields_offset returns the offset of the fields.

A parse node with flag-fields is an extended parse node that has a reference to a protocol node with flag-fields and a flag-fields table. A flag-fields table is an array of flag-field structures that define the parseable flag-fields for a protocol. A flag-fields table may be defined in conjunction with a protocol node definition and is used by functions of the protocol node or parse nodes for the protocol.

Figure 89:
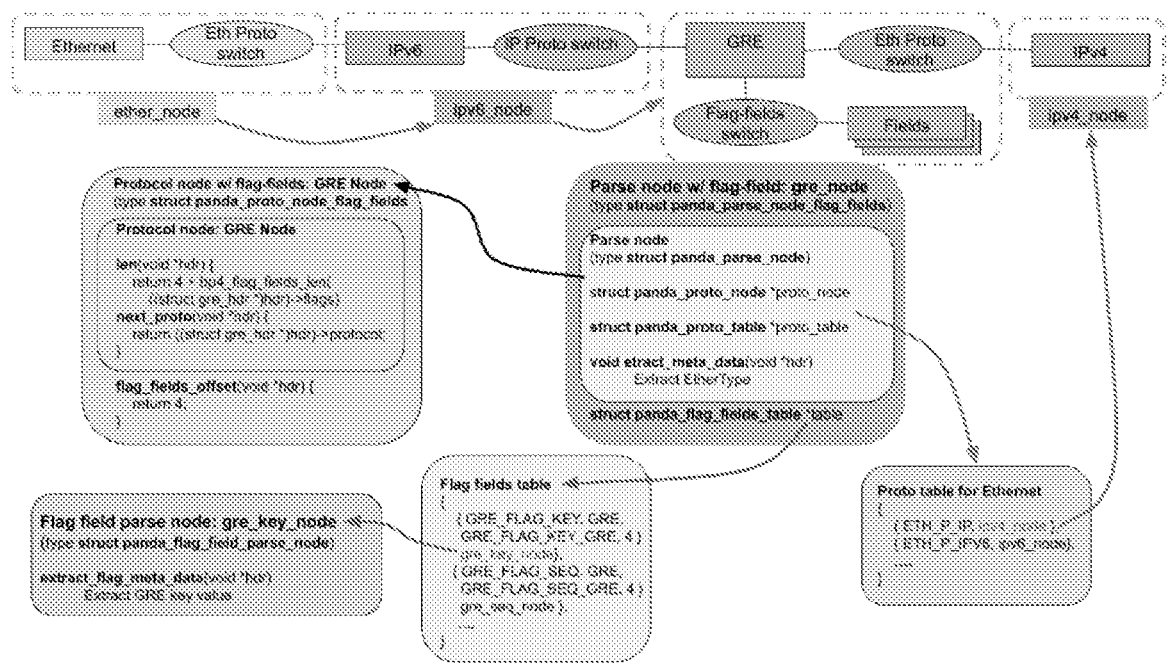
FIG. 89 illustrates a simple PANDA parser that includes a parse for GRE and handling for GRE flag-field.

FIG. 89 illustrates a simple PANDA parser that includes a parse for GRE and handling for GRE flag-fields. The associated flags-field table contains an entry and flag field parse node for extracting data from the GRE KeyTD field.

An instance of a PANDA parser can be mapped to the parser instructions defined in this specification. The goal is that the developer would write a parser in a high level language such as C and an optimizing compiler would emit the sequence of parser instructions that instantiate the parser to run in hardware with high performance. This is facilitated by the design where elements of the declarative representation of a parser in the high level language directly map to specific constructs in the instruction set (following the principles of Domain Specific Architecture).

The nodes of a parser are implemented in a parser as a sequence of instructions that process the node where the sequence is terminated by a .stp instruction (typically an instruction with the S-bit set, but could also be terminated at the end of a loop in a loop instruction). The implementation of a node encompasses the processing functions of both a protocol and a parse node. Protocol tables are mapped to CAM tables which provide the linkage between different nodes in the parse graph.

The basic structure of a node would be:
Determine the length of the header and set CurHdr.Length accordingly. For a variable length protocol this might entail loading a field from the packet header and then executing a length instruction. The instructions of interest for this are:
  prs.load (both to load length field from pcurptr, PktHdrBase+CurHdr.Offset, as well as to set CurHdr.Length)
  prs.lenset pcurhdr, prs.lensetadd pcurhdr, prs.lensetmin pcurhdr
Perform optional compare functions on packet fields. The instructions of interest are:
  prs.load (to load fields frompcurptr, PktHdrBase+CurHdr.Offset)
  prs.cmpi.h, prs.cmpnei.h compare half-word sub-register to a constant
  prs.cmpi.b, prs.cmpnei.b compare byte sub-register to a constant with a mask
  prs.cmplti*, prs.cmpltei*, prs.cmpgti*, prs.cmpgtei* compare a sub-register to a constant for less than, less than or equal to, greater than or greater than or equal to
Determine the next protocol and set Next. The instructions of interest for this are:
  prs.load (to load the next header field)
  prs.camnext
  prs.setaddr pnext
Save metadata, invoke thread processing. The instructions of interest for this are:
  prs.load (to load fields frompcurptr, PktHdrBase+CurHdr.Offset)
  prs.store, prs.storei, storereg save metadata in the current frame or meta metadata
  prs.action invoke thread processing for a protocol layer (details TBD)
Optionally execute a loop to process sub-nodes such as TLVs. Details are described in the next sections
End current node processing and proceed to next in Next. The instructions of interest for this are:
  *.stp: those instructions that set the S-bit
  camjump* instructions may invoke end of node processing
  *loop instructions invoke end of node processing unless post loop processing is configured
Loops are defined from parsing protocol constructs such as TLVs, lists, or flag-fields. LoopSpec (ploopsp) contains configuration for a loop including limits on number of iterations. NodeLoopCnt.NumLoops (ploopct) counts the number of iterations performed, and NodeLoopCnt.NonPadCnt (ploopct) counts the non-padding TLV sub-nodes.

The general flow of a loop is:
Create a loop head. Parse loops are create using
  prs.loop: starts a simple loop that performs LoopSpec.MaxCnt iterations
  prs.tlvloop starts a loop to process TLVs prs.flagsloop starts a loop to process flags in flags-fields
prs.tlvfastloop is a special instance of TLV processing Process on iteration of a loop as a "sub-node", for instance one particular TLV would be processed as a sub-node. The strategy for processing a sub-node is similar to those for processing a node as described above. This is done differently depending on the type of loop as described below.

Perform a lookup on the type and jump to the sub-node processing. The instructions of interest for this are:
  Pcamjumploop
  Pcamjumptlvloop
Process the sub-node. Typical flow is:
Perform optional compare functions on packet fields. The instructions of interest are:
  prs.load (to load fields from the pdatptr, PktHdrBase+DataHdr.Offset)
  prs.cmpi.h, prs.cmpnei.h compare half-word sub-register to a constant
  prs.cmpi.b, prs.cmpnei.b compare byte sub-register to a constant with a mask
  prs.cmplti*, prs.cmpltei*, prs.cmpgti*, prs.cmpgtei* compare a sub-register to a constant for less than, less than or equal to, greater than or greater than or equal to
Save metadata, invoke thread processing. The instructions of interest for this are:
  prs.load (to load fields from the pdatptr, PktHdrBase+DataHdr.Offset)
  prs.store, prs.storei, storereg save metadata in the current frame or meta metadata
  prs.action invoke thread processing for a sub-node (details TBD)
Determine the length of the sub-node header and set DataHdr.Length accordingly. For a variable length protocol, such as a TCP option, this might entail loading a field from the packet header and then executing a length instruction. The instructions of interest for this are:
  prs.load (both to load length field from pdatptr, PktHdrBase+DataHdr.Offset, as well as to set DataHdr.Length)
  prs.lenset pdathdr, prs.lensetadd pdathdr, prs.lensetmin pdathdr
  prs.lensettlv pdathdr, prs.lensettlvadd pdathdr, prs.lensettlvmin pdathdr
  prs.lensetpad pdathdr, prs.lensetpadadd pdathdr, prs.lensetpadmin pdathdr
  prs.lenseteol pdathdr, prs.lenseteoladd pdathdr, prs.lenseteolmin pdathdr
At a .stp instruction, perform the end of sub-node processing and jump to the loop head to handle the next iteration. Appropriate conditions are checked for exiting or breaking the loop. When the loop is terminated normally, jump to post loop processing if set PostLoop contains an address) or perform end of node processing. The instructions of interest for this are:
  *.stp: those instructions that set the S-bit TLV loops are a variant of loop processing with the context of a TLV loop.

A loop head is created by prs.loadtlvloop or prs.loadtlvloopmb instructions; these instructions load the TLV type field into Accum (paccum).

A type lookup and jump to sub-node processing is performed by prs.jumploop or prs.jumptlvloop In the case of prs.jumploop, a CAM lookup is performed and a jump made to the return address. CAM miss processing is performed for a CAM miss.

In the case of prs.jumptlvloop, a CAM lookup is performed and a jump made to the return address. On a CAM miss an extra check is performed to evaluate if the unknown TLV is to be ignored. This is done by and'ing the TLV type in Accum with TLVSpec.IgnMask and comparing the result to TLVSpec.IgnVal; if they are equal then jump is performed to the loop head instruction to process the next iteration. If the values are not equal, the TLV is not ignored and CAM miss processing is invoked.

A sub-node is processed as described above with respect to performing additional compare checks, saving metadata, and invoking processing threads The length of the subnode is set by one of these instructions being called (only one invocation of any them per sub-node)
  prs.lensettlv pdathdr, prs.lensettlvm pdathdr set the length for a non-padding TLV
  prs.lensetpad pdathdr, prs.lensetpadm pdathdr set the length for a padding TLV. This also checks limits concerning padding such as number of consecutive padding options and number of consecutive bytes of padding
  prs.lenseteol, pdathdr, prs.lenseteolm pdathdr set the length for an "End of List" TLV. This also breaks the loop and will jump to either post loop processing or will proceed to the next node.

Flags loops are a variant of loop processing in the context of processing flag-fields in a loop.

A loop head is created by prs.flagsloop; at the first execution the flags to be processed are copied from a sub-register in Accum to the Flags register At each iteration, including the first, the prs.flagsloop instruction runs. It examines the Flags register. If Flags is zero, the loop terminates normally and either a jump is made to post loop processing or end of node processing; else the first set bit in Flags is located. The index of the first bit is set in Accum and the bit is zeroed in the Flags register.

Do a lookup on the index of the flag to process, i.e. the value set in Accum, and jump to sub-node processing is performed by prs.jumploop The flag-fields sub-node is processed as described above with respect to performing additional compare checks, saving metadata, and invoking processing threads The length of the sub-node header, that is the length of the data field for the flag, is typically set in DataHdr.Length by prs.lenset pdathdr with a constant length argument As described for sub-node processing above, at a .stp instruction, perform the end of sub-node processing and jump to the loop head to handle the next iteration TLV fast loops are a fast variant of TLV loops.

A loop head is created by prs.fasttlvloop. This instruction:
  Checks if DataBndLoop.DataBound is zero meaning the end of the TLV list is reached. If it is zero then and the loop exits normally and either a jump is made to post loop processing or end of node processing is performed
  Loads the first two bytes atpdatptr (PktHdrBase+DataHdr.Offset). This is the type byte and length byte. If only byte is available for the limit of DataBndLoop.DataBound or packet length, load only one byte
  If the type byte is equal to TlvSpec.PAD1 (and TlvSPec.P is set) then one padding byte is processed. Padding limits defined in TlvSpec for the number of consecutive padding options and number of consecutive bytes of padding are checked. If any limits are exceeded the parser exits abnormally; else the data offset and point advance by one byte and the next type byte is loaded (go to step b.)
  If the type byte is equal to TlvSpec.EOL and TlvSPec.E is set then the end of loop is processed; the loop exits normally and either a jump is made to post loop processing or end of node processing is performed Otherwise, if only one byte was able to be loaded exit the parser on a malformed TLV If the type is equal to TlvSpec.PADN and TlvSPec.N is set then N padding bytes are processed. Padding limits defined in TlvSpec for the number of consecutive padding options and number of consecutive bytes of padding are checked. If any limits are exceeded the parser exits abnormally; else the data offset and point advance by the number of padding bytes plus two account for the type and length bytes and the next type byte is loaded (go to step b.)

Otherwise, DataHdr.Length is set to the determined TLV length

A type lookup and jump to sub-node processing is performed by prs.jumploop or prs.jumptlvloop. Note that the Accum contains the length as well so a lookup could be performed on the full Type and Length which is convenient in some cases In the case of prs.jumploop, a CAM lookup is performed and a jump made to the returned address. CAM miss processing is performed for a CAM miss.

In the case of prs.jumptlvloop, a CAM lookup is performed and a jump made to the returned address. On a CAM miss an extra check is performed to evaluate if the unknown TLV is to be ignored. This is done by and'ing the TLV type in Accum with TLVSpec.IgnMask and comparing the result to TLVSpec.IgnVal; if they are equal then jump is performed to the loop head instruction to process the next TLV. If the values are not equal, the TLV is not ignored and CAM miss processing is invoked.

A sub-node is processed as described above with respect to performing additional compare checks, saving metadata, and invoking processing threads.

The length of the subnode does not need to be set by the sub-node since the prs.tvfastloop already handles the TLV length.

As described for sub-node processing above, at a .stp instruction, perform the end of sub-node processing and jump to the loop head to handle the next iteration (go to step 1.b.)

The hardware parser handles protocol encapsulation by managing the Counters.Encap register. The register is incremented when transitioning to a new encapsulation layer. As discussed in the description of the MetadataBase (pmdbase) register, the Counters.Encap register serves as the index of the metadata frame where frame pointer is =&frame[Counters.Encap](equals MetadataBase plus 4*FrameOffFnumSeqno.FrameOffset). The maximum encapsulation depth is limited by ParserConfig.MaxEncap. If this limit is reached, then an error is triggered if ParserConfig.EE is set; else Counters.Encap does not increment for additional layers of encapsulation and neither does FrameOffFnumSeqno.FrameOffset change which has the effect that the last metadata frame contents may be overridden by nested encapsulations if ParserConfig.EO is set (this may be desirable in certain circumstances such as when the caller is only interested in the outermost and innermost headers).

Encapsulation depth is incremented in one of two ways:

In common end of node processing (Common_End_of_Node), if the Next's encapsulation bit is set (i.e. masked bit 0x40000000) then ParserConfig.Encap is incremented when jumping to the next node The prs.inc encap instruction increments ParseConfig.Encap and the effect is immediate upon return of the instruction.

When transitioning to the next node, processing Next in Common_End_of_Node, if the next node is marked as an overlay node (i.e. masked bit 0x20000000 is set in Next) then overlay processing is performed. For overlay processing, the current header and data offsets, pointer, and lengths don't change (as opposed to non-overly processing in which case CurHdr.Offset advances and the other pointers, offsets, and lengths are set accordingly.

Guidance for Programming the CAM and Array

This section provides guidance and strategies on programming the CAM and hardware lookup array.

Setting and Removing Entries

Both the CAM and lookup array are presented as arrays for which entries can be set and deleted.

The lookup array is straightforward to program. Target values are written at specific indices in the array using the prs.array.write instruction where the first source operand contains the index and the source second operand contains the thirty-two bit value to write at that index. Entries can be removed using the prs.arr.delete instruction where the source operand is the index of the entry to be deleted. The effect of deleting an array entry is to write a STOP_OKAY code in the entry for the index.

The CAM is programmed as an array of entries where each entry is composed of a thirty-two bit key and a thirty-bit target value. CAM entries are written using the prs.cam.write instruction where the first source operand is the index, and the second operand encodes the key and the target value; the key occupies the high order thirty-two bits of the second operand, and the target occupies the low order thirty-two bits. CAM entries are removed using the prs.cam.delete instruction where the source operand is the index of the entry to be deleted. The effect of deleting a CAM entry is that the key is written with a value of 0xFFFFFFFF and the target value is set to zero; this makes the key an invalid value that should never match any possible CAM lookup.

Note, similar to the programming of the lookup array, it is the prerogative of the software to manage the CAM as an array with some known number of elements. For instance, when adding an entry to the CAM table it's up to the software to determine an unset entry in the table and set the new entry at that index. The software needs to handle the case where there are no free entries in the table, and also needs to ensure that all keys are in the table are unique. Maintaining a shadow table in software of the CAM table may be prudent for table management.

Strategies for Programming the CAM

Shared CAM tables, non-shared CAM tables, and arrays may be used in tandem to implement various protocol lookups.

The advantage of shared tables is that one sub-table can be used for lookup in different instructions, and a shared table allows a 16-bit match value. For instance, a common table for looking up 16-bit EtherType can be used both in Ethernet parse nodes and GRE parse nodes. The limitation of shared tables is that there is a maximum of fifteen shared tables.

The advantage of non-shared tables is that there can be more of them than shared tables. A non-shared table can only be used by one CAM instruction, so shared tables are suitable for "one-off" lookups. For instance, a lookup of the GRE version number is likely only performed by a GRE node so such a table wouldn't need to be shared. Non-shared tables allow only eight bit lookups and there is a risk of key collisions in the 8-bit selector between different instructions.

Arrays have the advantage of simplicity and space compared to CAMs. The caveat is that all possible indices for a match value must be possible in an array even if the lookup value is ignored. For instance, the GRE version number is a three bit field, so a version number lookup could be implemented as an array with eight elements. Version 0 and 1 of GRE are defined so that elements in the array would be populated with node addresses, the other elements would be populated with a parser code indicating no match.

Figure 90:
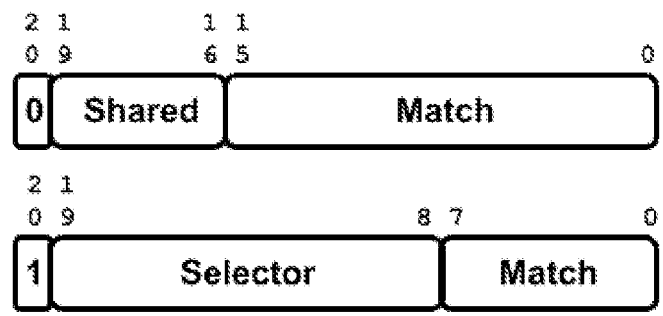
FIG. 90 illustrates a 21-bit key used to increase the selector size to twelve bits
Figure 91:
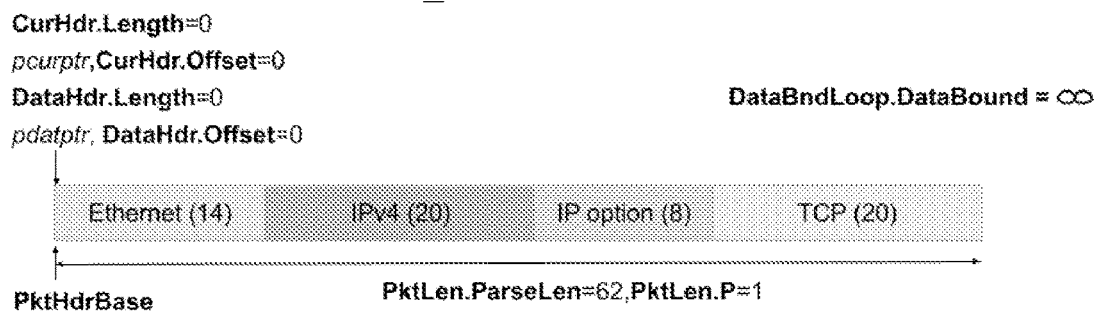
FIG. 91 illustrates register states for key points.
Figure 92:
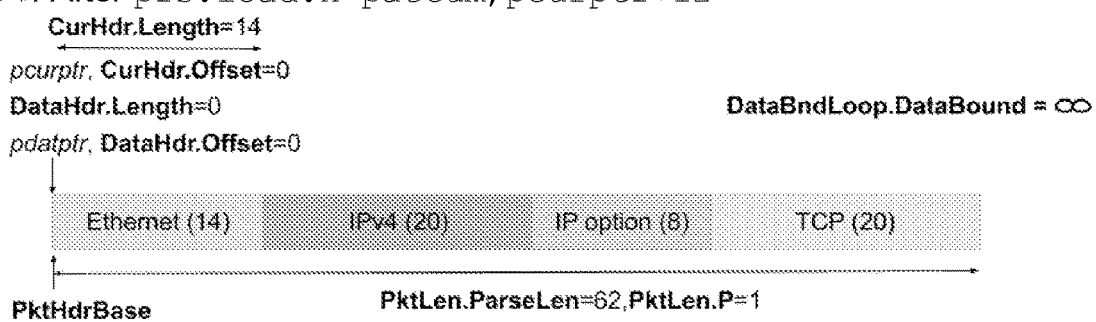
FIG. 92 illustrates further the register states for key points.
Figure 93:
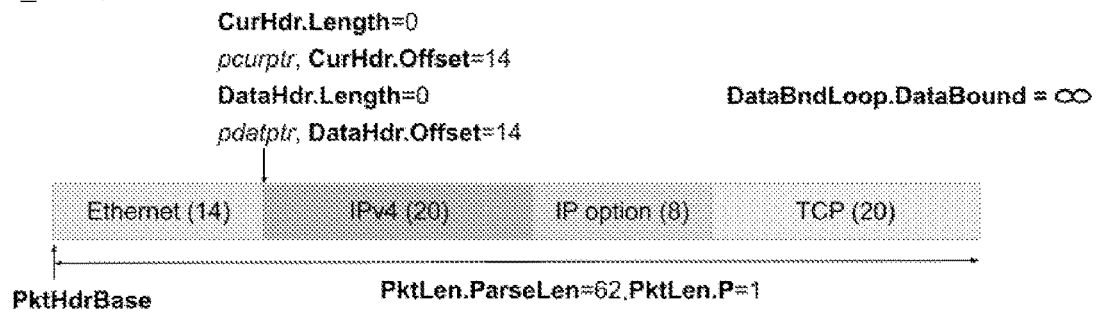
FIG. 93 illustrates further the register states for key points.
Figure 94:
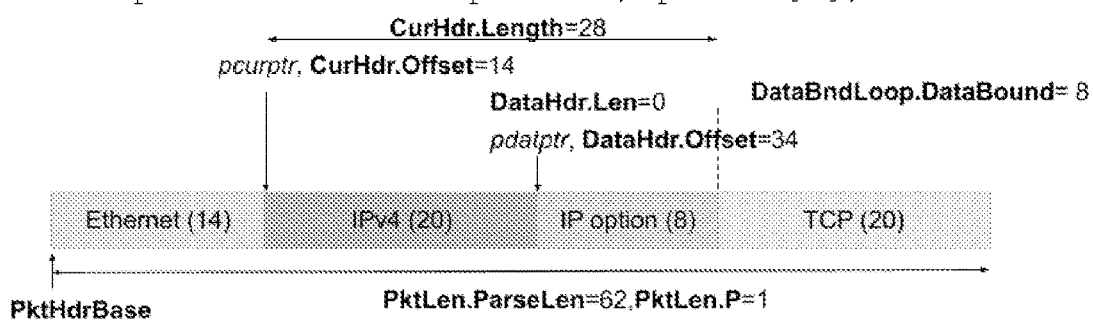
FIG. 94 illustrates further the register states for key points.
Figure 95:
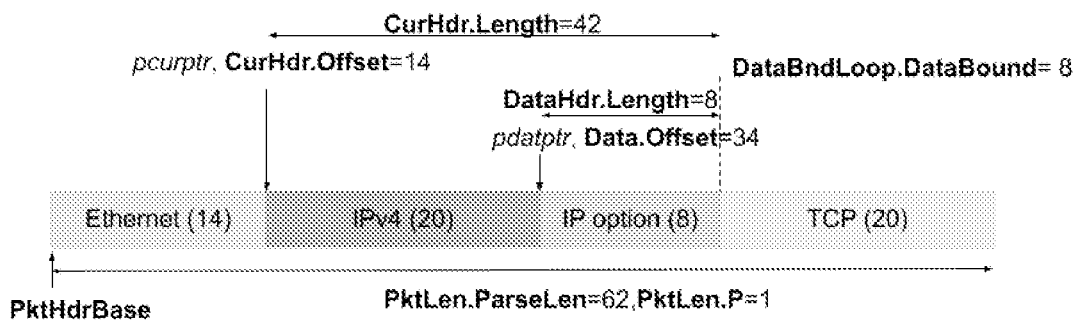
FIG. 95 illustrates further the register states for key points.
Figure 96:
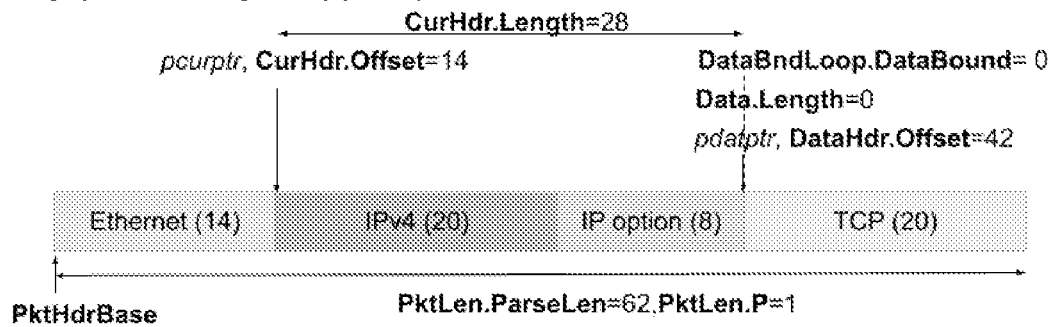
FIG. 96 illustrates further the register states for key points.
Figure 97:
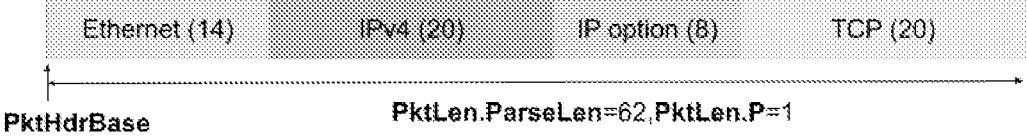
FIG. 97 illustrates further the register states for key points.
Figure 98:
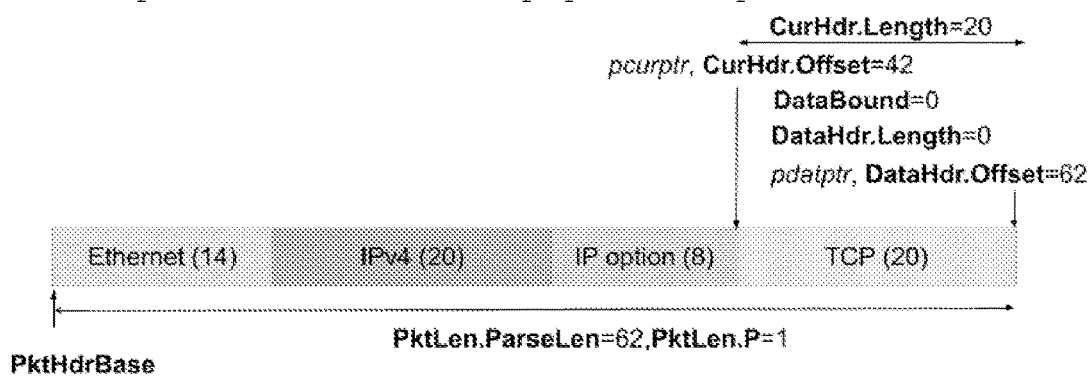
FIG. 98 illustrates further the register states for key points.

Given these limitations and tradeoffs, some general guidance can be provided:

If the lookup is on a 16-bit value or is common amongst multiple instructions, then a shared CAM table should be considered If the lookup is on a small value, say up to 4-bits, then using an array should be considered If the lookup is a "one off" for an instruction and the lookup is on eight bits or less then a non-shared CAM table should be considered The non-shared table selector is 8-bits so in a large program with several non-shared tables the chances of key collisions may be high. As discussed above, inserting nop's is one mitigation. Another possibility is to increase the key size which would require hardware implementation. For instance, a 21-bit key might be used to increase the selector size to twelve bits. This is illustrated in FIG. 90.

Operation of Offsets, Pointers, and Lengths

This section provides an example to illustrate the behavior and semantics of the critical parameters for hardware parsing. These fundamental parameters are in the registers: CurHdr.Offset (phoff), pcurptr pseudo register (PktHdrBase+CurHdr.Offset), CurHdr.Length (phlen), pdatptr pseudo register (PktHdrBase+DataHdr.Offset), DataHdr.Length (pdlen), DataHdr.Offset (pdoff), and DataBndLoop.DataBound (pdbnd).

The assembly for the example is listed below (line numbers are in blue). In this example there are four parse nodes: ether_node, ipv4_node, ip_option_node, and tcp_node. For this example, metadata extraction is omitted, and it is assumed that two protocol tables are populated where for shared table #1 an EtherType lookup is performed and there is once entry that maps IPv4 EtherType to ipv4_node, and for shared table #2 there is one entry that maps TCP protocol number to tcp_node. For the IP options lookup, a PC table is used and it may be assumed that the table is empty and all IP options are just parsed and otherwise ignored.

```
ether_node: /* Initial state, Point 0 */
prs.load.h paccum,pcurptr+12 /* Point 1 */
prs.cam.h.stp pnext,paccum[0],1 /* Point 2 */
ipv4_node:
prs.load.b paccum, pcurptr
prs.lensetmin.n pcurhdr, paccum[1],4:20 /* Point 3 */
prs.load.b paccum, pcurptr+9
prs.cam.b pnext, paccum, 2
prs.loadtlvloop paccum,pdatptr /* Point 6, 2nd exec */
prs.camjumploop.b paccum,pc
ip_option_node:
prs.load.b paccum,pdatptr+1 /* Load length byte
prs.lensettlv.b.stp pdathdr,paccum /* Point 4,Point 5 */
tcp_node:
prs.load.b paccum, pcurptr+12
prs.lensetmin.n.stp pcurhdr,paccum,4:20 /* Point 7 */
```

To illustrate the flow, we assume a TCP/IPv4 packet is input to the parser with one IPv4 option having eight bytes length. There is no TCP data so the total length of the packet is sixty-two bytes and it's assumed that the whole packet is received such that PktLen.ParseLen equals sixty-two. When the parser runs for such a packet, thirteen instructions are executed and have the following order per the line numbers: 2, 3, 5, 6, 7, 8, 9, 12, 13, 9, 10, 15, 16. The register states for key points in processing is described below where Point X references the instructions duly annotated above. This is covered by FIG. 91-98.

Point 0: Initial state when ether_node is called. The initial state for parsing a packet is that CurHdr.Offset, DataHdr.Offset, CurHdr.Length, and DataHdr.Length are set to zero. Pseudo registerers pcurptr and pdatptr (pseudo registers) are logically set to PktHdrBase by virtue of setting CurHdr.Offset and DataHdr.Offset to zero. DataBndLoop.DataBound is set to infinity (−1ULL).

Point 1: After prs.load.h paccum, pcurptr+12

When the halfword load is performed at offset twelve, which loads the EtherType field from the Ethernet header, the expanse of bytes being loaded exceeds the CurHdr.Length but not the packet length. CurHdr.Length is incremented by the end of the data being loaded minus its current value. In this case CurHdr.Length is set to 14.

Point 2: After prs.cam.h.stp pnext, paccum[0], 1 (at ipv4_node)

.stp indicates a transition to the next node and the pointers and offsets are advanced to the next node and the lengths are reset. In this case, CurHdr.Length was equal to fourteen, the length of an Ethernet header, so CurHdr.Offset is set to fourteen as well as DataHdr.Offset, pcurptr, and, pdatptr are updated accordingly. CurHdr.Length and DataHdr.Length are set to zero, and DataBndLoop.DataBound is set to infinity.

Point 3: After prs.lensetmin.n pcurhdr, paccum[1], 4:20 lensetmin indicates both a minimum constant header length and a variable header length which is derived from a length field in the packet. In the case of IPv4, the minimum header length is twenty and the variable length is computed from the second nibble of the header multiplied by four. For this example, the value in the second nibble is seven which makes the length of the IPv4 header 28 bytes. CurHdr.Length is set to the computed variable length, that is 28 for this example. DataHdr.Offset is set CurHdr.Offset plus the minimum length, so in this example DataHdr.Offset is set to 34. pdatptr (pseudo register) is adjusted to reflect the new DataHdr.Offset. DataBndLoop.DataBound is set to the new CurHdr.Length minus the minimum length which equals eight in this example. After this instruction completes pdatptr, DataHdr.Offset, and DataBndLoop.DataBound are primed to commence processing the IP options.

The program continues through the prs.loadtlvloop and prs.camjump instruction to reach the ip_node_node. The next instruction to affect the parser offsets is then prs.lensettlv at point 4.

Point 4: After prs.lensettlv.b.stp pdathdr, paccum[1]
(before .stp processing is applied)

lensettlv determines the length of a non-padding option being processed by inspecting the length field in a subregister. The IP option length is 8 bytes, so DataHdr.Length is set to eight.

Point 5: After prs.lensettlv.b.stp pdathdr, paccum, 0
(after .stp processing is applied)

When .stp processing occurs for a TLV, the data pointer, offset, length, and data bound are set for processing the next TLV. DataHdr.Offset is advanced by the value in DataHdr.Length making DataHdr.Offset equal to 42 in this example, and DataBndLoop.DataBound is reduced by the value in DataHdr.Length so in this example DataBndLoop.DataBound is set to zero. pdatptr is set accordingly, and DataHdr.Length is set to zero. At this point, the next option can be processed, however in this example DataBndLoop.DataBound is now zero which indicates there are no more IP options to process.

Point 6: After second execution of
prs.loadtlvloop paccum, pdatptr (at tcp_node)

At the second iteration of loadtlvloop, DataBndLoop.DataBound is zero indicating the end of options has been reached. In this example there is no post loop processing (PostLoop is assumed to be NULL) so the pointers offsets, and lengths are set up to process the next node. In this example, CurHdr.Length was equal to 28, the computed variable length of the IPv4 header, plus the original CurHdr.Offset value of 14 makes the new CurHdr.Offset set to 42. DataHdr.Offset, pcurptr and pdatptr are updated accordingly. CurHdr.Length and DataHdr.Length are set to zero, and DataBndLoop.DataBound is set to infinity.

Point 7: After prs.lensetmin.n.stp pcurhdr, paccum, 4:20
lensetmin computes the variable length of the TCP header with a minimum constant check that the TCP header is at least twenty bytes. In this example, the constant length and computed length of the TCP header are both twenty bytes so CurHdr.Length is set to twenty. The data pointer, offset, and data point are set accordingly and in this example DataHdr.Offset is set to 62, DataHdr.Length and DataBndLoop.DataBound are both zero. In this example packet there are no TCP options, and this simple program doesn't process them anyway. When .stp processing is performed for this instruction, there is no Next set so the parser terminates normally with STOP_OKAY.

Below is an example of a simple parser in parser instructions. This parse is composed of four nodes:

ether_node: Parses the Ethernet header and extracts the EtherType into metadata. It then performs a CAM lookup on the Ethernet using share table #1 ipv4_node: If Ethertype is IPv4, then the IPv4 header is parsed. First the IP version number is checked to equal four. A length check is performed that the minimum length is twenty bytes and determines the variable length from the IPv4 header. The source and destination addresses are extracted to metadata and the IP protocol field is extracted and CAM lookup is performed on the value using share table #2 ipv6_node: If Ethertype is IPv6, then the IPv6 header is parsed. First the IP version number is checked to equal six. The source and destination addresses are extracted to metadata and the next header is extracted and CAM lookup is performed on the value using share table #2. Note that setting the header length to twenty bytes is performed implicitly by load in the destination address ports_node: If the IP protocol or next header is UDP or TCP (as set in share table #2) then the port numbers are extracted to metadata. The port numbers occupy the first four bytes of the transport layer header, so a single four byte load is performed that also implicitly verifies there is at least four bytes of length for the header in the packet.

```
Assembly for sample program
.text
ethernet_node:
/* Load Ethertype; set length also (14 bytes) */
prs.load            paccum,pcurptr+12
/* Lookup Ethertype for next node */
prs.cam.h           pnext, paccum[0],1
/* Extract Ethertype */
prs.store.w.stp     pframe, paccum[0] /* Already in paccum */
ipv4_node:
/* Check IP version IP and hlen, min 20 bytes and check IHL */
prs.load.b          paccum,pcurptr
prs.cmpi.b.fail     paccum[0],0x40:0xf0
```

```
prs.lensetmin.n         pcurhdr,paccum[1],4:20
/* Lookup next node for IP proto and extract value */
prs.load.b              paccum,pcurptr+9
prs.cam.b               pnext,paccum[0],2
/* Extract struct iphdr field saddr to addrs.v4 */
prs.store.b             pframe+113,paccum
    prs.load            paccum,pcurptr+12
prs.store.stp           pframe+120,paccum
ipv6_node:
prs.load                paccum,pcurptr
prs.cmpi.b.fail         paccum[0],0x60:0xf0
prs.cam.b               pnext,paccum[6],2
/* Extract struct next header and addresses to addrs.v6 */
prs.store.b             pframe+113,paccum[6]
prs.load                paccum,pcurptr+8
prs.store               pframe+120,paccum
prs.load                paccum,pcurptr+16
prs.store               pframe+128,paccum
prs.load                paccum,pcurptr+24
prs.store               pframe+136,paccum
prs.load                paccum,pcurptr+32
prs.store.stp           pframe+144,paccum
ports_ins32_node: /* Process transport header */
/* Extract ports, implicit check for four bytes length */
prs.load.w              paccum,pcurptr
prs.store.w.stp         pframe+116,paccum
Disassembly of sample program
simple.o:    file format elf64-littleriscv
Disassembly of section .text:
0000000000000000 <ethernet node>:
   0:   0000600b      prs.load         paccum,pcurptr+12
   4:   6001fc0b      prs.cam.h        pnext,paccum,1
   8:   b000020b      prs.store.w.stp  pframe,paccum
000000000000000c <ipv4_node>:
   c:   1000000b      prs.load.b       paccum,pcurptr
  10:   8207868b      prs.cmpi.b.fail  paccum,0x40:0xf0
  14:   4140990b      prs.lensetmin.n
pcurhdr,paccum[1],4:20
  18:   1000480b      prs.load.b       paccum,pcurptr+9
  1c:   5002fc0b      prs.cam.b        pnext,paccum,2
  20:   10038a0b      prs.store.b      pframe+113,paccum
  24:   0000600b      prs.load         paccum,pcurptr+12
  28:   8003c20b      prs.store.stp    pframe+120,paccum
000000000000002c <ipv6_node>:
  2c:   0000000b      prs.load         paccum,pcurptr
  30    8307868b      prs.cmpi.b.fail  paccum,0x60:0xf0
  34:   5602fc0b      prs.cam.b        pnext,paccum[6],2
  38    16038a0b      prs.store.b      pframe+113,paccum[6]
  3c:   0000400b      prs.load         paccum,pcurptr+8
  40:   0003c20b      prs.store        pframe+120,paccum
  44:   0000800b      prs.load         paccum,pcurptr+16
  48:   0004020b      prs.store        pframe+128,paccum
  4c:   0000c00b      prs.load         paccum,pcurptr+24
  50:   0004420b      prs.store        pframe+136,paccum
  54:   0001000b      prs.load         paccum,pcurptr+32
  58:   8004820b      prs.store.stp    pframe+144,paccum
000000000000005c <ports_ins32_node>:
  5c:   3000000b      prs.load.w       paccum,pcurptr
  60:   b003a20b      prs.store.w.stp pframe+116,paccum
```

The SiPanda Hardware parser is an integral component in the SDPU architecture. The parser provides two outputs: metadata and requests to schedule worker threads.

Metadata is any information derived for parsing a packet including values of protocol fields, offsets of protocol headers, lengths of protocol headers, and general packet information such as packet length and a receive timestamp. Metadata is saved into a metadata block of memory via the prs.store* instructions. The saved metadata is consumed by downstream processing by reading the memory containing metadata.

Requests to schedule worker thread is accomplished by the prs.runtrhead instruction. This instruction allocates a work item object in memory, via an external object allocator. Work items are sixty-four byte structures that are overlaid onto the first eight parser registers (p0 to p7).

Figure 99:
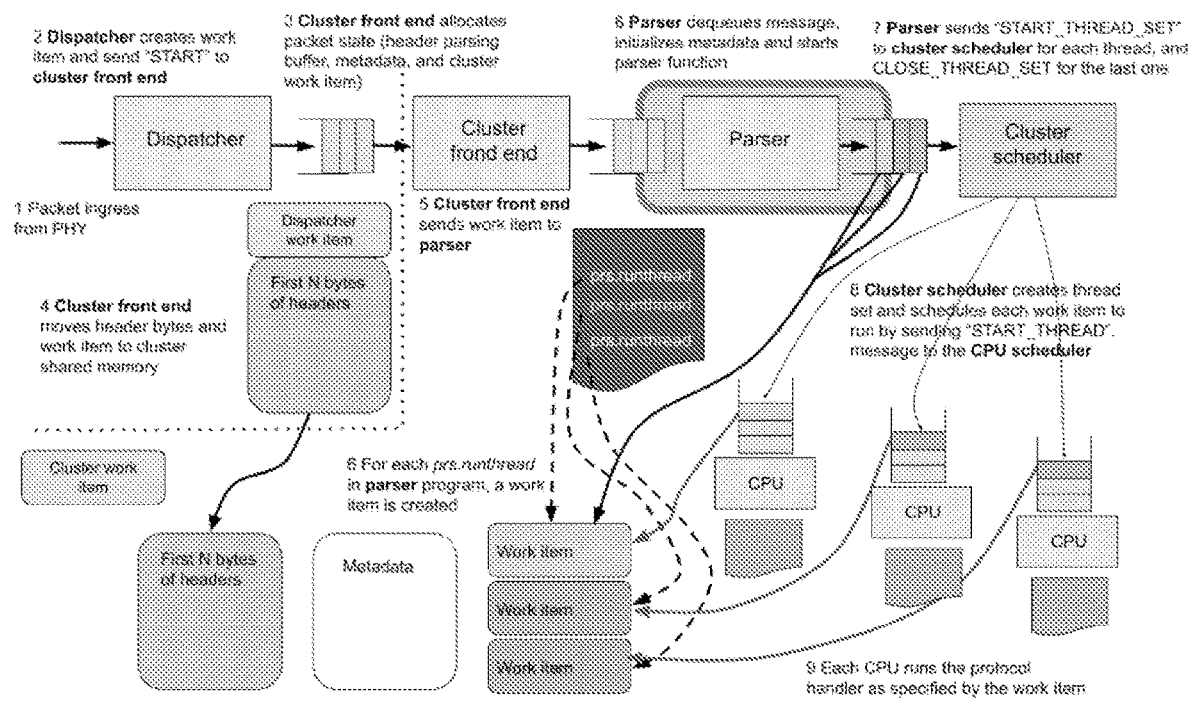
FIG. 99 illustrates parser's role and position in the SDPU architecture

FIG. 99 illustrates the parser's role and position in the SDPU architecture.

As depicted in the diagram, the Parser is architecturally positioned between the Cluster Front End and the Cluster Scheduler. The input to the parser are work items from the Cluster Front End that provide the information needed for parsing received packets. A work item from the Cluster Front End is sent in a PARSER_START_MSG message on the clusfend_to_parser_fifo FIFO. A work item includes a reference to the packet context which includes the parsing buffer holding the first N bytes of data and a Metadata block. The Parser parses the headers in the parsing buffer and writes metadata to the Metadata block.

When the parser receives a PARSER_START_MSG message, a lookup is performed to determine which parser program to run. The work item from the Cluster Front End contains a parse function number that the parser uses to lookup in a table. The returned value is that address of the program that the parser runs.

As the parser runs, the program schedules worker threads by invoking the prs.runtrhead instruction. This instruction allocates a thread work item object in cluster local memory via an object allocator. These work items are sixty-four byte structures that are overlaid on the first eight parser registers. Once the work item is allocated, a block copy is performed of the first eight parser registers. Effectively, this is taking a snapshot of the current parser state that is needed for running the work thread (e.g. the pointer to the base address of the packet headers, the offset and length of the current header being processed, the pointer to the current metadata block, etc.).

The thread work item created by prs.runthread is processed as follows:

If PendingWork.PendingWork is equal to 0xFFFF then this is the first thread scheduled for a packet. prs.runthread sets PendingWork.PendingWorkto the index of the thread work item Else, if PendingWork.PendingWork is not equal to 0xFFFF then this is not the first thread for the packet. The parser creates a START_THREAD_MSG message with a reference to the work item in cluster local memory. The message is sent to the cluster scheduler on the parser_to_clussched_fifo. When the cluster scheduler receives the message it can schedule a thread to process the work item When the parser completes and PendingWork.PendingWork is not equal to 0xFFFF then the parser creates a LAST_THREAD_MSG message with a reference to the work item in cluster local memory. The message is sent to the cluster scheduler on the parser_to_clussched_fifo. When the cluster scheduler receives the message it can schedule a thread to process the work item and also marks the thread set as parsing complete. A bit in this last work item also can indicate that the cluster scheduler should close the thread set for the packet.

When the parser completes parsing a packet, PendingWork.PendingWork is set to 0xFFFF in preparation for parsing the next packet The parser processes two types of work items: it sends thread work items and receives cluster work items.

Thread work items are sent from parser to cluster scheduler on the pars_to_clussched_fifo in messages of type START_THREAD_MSG or LAST_THREAD_MSG; these describe the request for processing a protocol layer in a worker thread. Note that these work items are overlaid on the first eight parser registers (this facilitates a simple block store for the register file to initialize a thread work item).

```
struct {
    void *_ obj_ref;
    void *_pkt_hdr_base;
    void *_metadata_base;
    _u32 cur_hdr_offset;
    _u32 cur_hdr_length;
    _u32 dat_hdr_offset;
    _u32 dat_hdr_length;
    _u64 pkt_len;
    _u16 frame_offset;
    _u16 func_num;
    _u32 seqno;
    _u8 rsvd: 3;
    _u8 freed: 1;
    _u8 no_pkt_csum: 1;
    _u8 close_thread_set: 1;
    _u8 not_killable: 1;
    _u8 last_in_thread_set: 1;
    _u8 IFID;
    _u16 next_work_item;
    _u16 checksum;
    _u16 pkt_ctx;
};
```

Cluster work items are sent from the cluster from end to the parser in START_PARSER_MSG type messages on the clusfend_to_pars_fifo; these describe a packet that is to be parsed by the parser.

```
struct {
    void *obj_ref;
    _u64 pkt_len;
    _u32 seqno;
    _u16 checksum;
    _u16 pkt_ctx;
    _u8 IFID;
    _u8 rsvd;
    _u16 pfunc_num;
    _u32 rsvd2;
    _u64 timestamp;
    _u16 rsvd3[3];
};
```

The parser receives messages from the cluster front end via the clusfend_to_pars_fifo. The expected message type is PANDA_SDPU_CLUSFEND_TO_PARSER_START_MSG. The structure of the messages is:

```
struct panda_sdpu_clusfend_to_pars_work_msg {
_u64 type: 8; /*
PANDA_SDPU_CLUSFEND_TO_PARSER_START_MSG */
_u64 pfunc: 8;
_u64 work: 16;
_u64 seqno: 8;
_u64 rsvd1: 8;
_u64 rsvd2: 16;
}
``` pfunc is the parser function number, this indicates which parser program to run. work is a reference to the packet work item; values from the work item are used to initialize the parser registers for each packet. seqno is a sequence number used to ensure proper ordering of messages when there are multiple parsers; the parser does not process this and just passes it in thread work items sent to the cluster scheduler.

Packet work items reside in cluster shared memory. The address of the work item in shared memory is computed by:
TempAddr=SysWorkItemsBase( );
TempAddr+=64*work item_index The parser sends messages to the cluster scheduler via the pars_to_clussched_to_pars_fifo. The two message types are PANDA_SDPU_PARS_TO_CLUS_START_THREAD_SET and PANDA_SDPU_PARS_TO_CLUS_THREAD_SET_CLOSE_MSG. Both of these are sent as a result of prs.runthread being invoked. The first is sent to start a thread for a thread set for all threads except the last one in the thread set; the second type is sent to start the last thread in the thread set (i.e. the last thread closes the thread set). The structure of these message is:

```
struct panda_sdpu_pars_to_clussched_work_msg {
_u64 type: 8; /*
PANDA_SDPU_PARS_TO_CLUS_START_THREAD_SET or
PANDA_SDPU_PARS_TO_CLUS_THREAD_SET_CLOSE_MSG
*/
_u64 seqno: 8;
_u64 work: 16;
_u64 hash: 32;
};
``` seqno is the parser sequence number and id just copied from the packet work item received by the cluster scheduler, work is a reference to the thread work item, hash is the return result of a hash function being called for the last thread in the thread set (that is the hash value is only set in when message type is PANDA_SDPU_PARS_TO_CLUS_THREAD_SET_CLOSE_MSG).
Message Type Constants
    PANDA_SDPU_PARS_TO_CLUS_THREAD_SET_START_MSG=1
    PANDA_SDPU_PARS_TO_CLUS_THREAD_SET_CLOSE_MSG=12
    PANDA_SDPU_CLUSFEND_TO_PARSER_START_MSG=12
Parser Event Loop In the SDPU, the parser, as all the other components, is driven by an event loop. The event loop could be implemented in instructions or hard logic for highest performance.
Start Event Loop The PEVENTLOOP instruction (see PEVENTLOOP description above) is used to initiate an event loop. The pseudo code for the PEVENTLOOP instruction is:

```
_start_:
// Dequeue a message from the FIFO
TempMsg = Dequeue_Fifo(clusfend_to_pars_fifo);
// Check the message type
if (!(TempMsg & 0xFF == PARSER_START_MSG))
goto_start_; // Unknown message type should be an error
TempWorkItemIndex = TempMsg >> 48;
TempPktCtx = TempWorkItemIndex;
TempMetadataAddress = SysMetadataBase( );
TempMetadataAddress += TempPktCtx * size_of_metdata_block
TempHdrsAddress = SysHeadersBase( );
TempHdrsAddress += TempPktCtx * size_of_parsing_buffer
TempPktWorkItemAddr = SysWorkItemsBase( )( );
TempPktWorkItemAddr += TempWorkItem * size_of_work item;
TempObjRef = LoadFromMemory(TempPktWorkItemAddr, 8);
TempPktLen = LoadFromMemory(TempPktWorkItemAddr + 8, 8);
TempSeqno = LoadFromMemory(TempPktWorkItemAddr + 16, 4);
TempChecksum = LoadFromMemory(TempPktWorkItemAddr + 20, 2);
TempIFID = LoadFromMemory(TempPktWorkItemAddr + 22, 1);
TempPFuncNum = LoadFromMemory(TempPktWorkItemAddr + 24, 2);
TempTimestamp = LoadFromMemory(TempPktWorkItemAddr + 32, 8);
// Initialize the parser for parsing the next packet. The
// arguments to InitializeParser are taken from fields in
// in the work item from the cluster front end
InitializeParser(TempHdrsAddress, TempPktLen, TempMetadataAddress,
TempSeqno, TempChecksum. TempIFID, TempObjectRef,
TempTimestamp, PktCtx);
// Determine the address of the requested parser function
FunctionAddress = SysParserFunctionsBase( );
```

```
FunctionAddress += 8 * TempPFuncNum;
// Set the return address for the parser function in ra. When the
// parser function returns (ret instruction), execution continues at
// this instruction
TempReturnAddress = PC +
Sign_Extend(Return_address * 4);
regs[1] = TempReturnAddress;
GOTO FunctionAddress
End event loop
```

The PEVENTLOOPEND instruction (see PEVENTLOOPEND description above) is used to handle the end of an iteration of an event loop. The instruction would normally be run by PEVENTLOOP setting the return address register to point to an prs.endloop instruction.

```
// Check if any work items were created
if ( PendingWork.PendingWork != 0xFFFF) {
// Pending work is not NULL. Send a LAST_THREAD_MSG to the
// cluster scheduler to schedule the last thread for the thread
// set
TempMessage = LAST_THREAD_MSG;
TempMessage |= (TempWorkItemIndex << 48);
TempMessage.Work = PendingWork.PendingWork;
// Send the work to the cluster scheduler
Fifo_Enqueue(parser_to_clussched_fifo, TempMessage);
} else {
// No work items, free the packet since there's nothing else
// to do
FreePacket(ObjectRef);
}
```

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A parsing system for parsing protocol headers, the parsing system comprising one or more computers, one or more storage devices on which are stored instructions that are operable, one or more memory and a parser engine, one or more parse nodes, one or more protocol tables, and one or more parsers, wherein an instance of a parser is comprised of a set of parse nodes and protocol tables, wherein the one or more parse nodes provide rules for parsing one or more protocol headers and the one or more parse nodes including additional rules for processing a protocol, wherein the one or more protocol tables describe relationships between the one or more parse nodes, wherein the parser engine processes the one or more protocol headers in a data object or packet per the rules of the one or more parse nodes and the one or more protocol tables, wherein to parse the one or more protocol headers, the one or more parse nodes determines a length of the one or more protocol headers being processed and a type of a next protocol header to be processed, wherein the length of the one or more protocol headers is determined by the one or more parse nodes that defines a minimum length attribute to give a minimum length of the one or more protocol headers, and wherein for a variable size protocol header, the one or more parse nodes define a length function that calculates the length of the one or more protocol headers, and wherein the length function includes a value of a length field in the one or more protocol headers as input, wherein the one or more parse nodes define a next type function to determine a type of the next protocol header to process, where the next type function includes a value of a next protocol field in the one or more protocol headers as input, wherein the parser engine uses the type of the next protocol header as input to a lookup in the one or more protocol tables that returns a next parse node or null when there is no next parse node, wherein an offset of the next parse node to process is given by a sum of an offset of a current protocol header being processed and a length of the current protocol header being processed, wherein when processing completes for the one or more parse nodes, the parser engine transitions to process the next parse node, wherein parsing of the data object or the packet is complete when the parser engine determines there is no next parse node to process.

2. The parsing system of claim 1, wherein the parsing system is configured for parsing sub-protocol headers within a protocol header, wherein a sub-protocol defines a list of data elements each of which have one or more data headers, wherein the list of data elements are a Type Length Value list, a set of flag-fields, arrays, or other construct including multiple objects to be parsed, wherein the one or more data headers are parsed in a context of the one or more parse nodes, wherein the one or more parse nodes for the protocol with the sub-protocol includes one or more sub-parse nodes, one or more sub-protocol tables, and rules for parsing the one or more data headers of the sub-protocol, wherein the one or more sub-parse nodes provide rules for processing a data element, wherein the one or more sub-parse nodes define nested sub-protocols, wherein the one or more sub-protocol tables map types of data elements to the one or more sub-parse nodes, wherein the parser engine processes the sub-protocol in the protocol header by parsing and processing each of the data elements in the list of the sub-protocol, wherein to parse the one or more data headers, the one or more parse nodes determine a length and type of a current data header of the one or more data headers being processed, wherein the parser engine uses the type of the one or more data headers as input to a lookup in a sub-protocol table that returns the one or more sub-parse nodes for processing the data element, wherein the offset of a next data element to process is given by the sum of the offset of the one or more data headers being processed and the length of the data being processed, wherein when processing completes for the one or more sub-parse nodes, the parser engine transitions to process a next sub-parse node, wherein parsing of the sub-protocol for the one or more parse nodes is complete when all the data elements have been processed.

3. The parsing system of claim 2, further comprising a set of parser instructions and one or more parser registers, wherein parser instructions are instructions in an Instruction Set Architecture that perform functions and operations related to parsing, wherein the one or more parser registers includes state variables for parsing, wherein the one or more parser registers are input to and processed by the parser instructions, wherein the parser instructions can be commingled with plain integer instructions, wherein the parsing system has instructions to move data from one or more integer registers to the one or more parser registers, wherein the instructions also move the data from the one or more parser registers to the one or more integer registers.

4. The parsing system of claim 3, further comprising one or more parser exit codes which are a set of status codes returned when the parser exits, wherein the one or more parser exit codes include a success code and error code for conditions, wherein the one or more parser exit codes are stored in a parser status code register, wherein parser instruction processing may cause the parser to exit prematurely, wherein an exit code set in a parser exit status register specifying a reason the parser exited.

5. The parsing system of claim 3, further comprising state information describing the current protocol header being processed or the current data header being processed, wherein the state information for the current protocol header being processed includes the offset of a first byte of the protocol header being processed relative to a start of the packet and the length of the current protocol header being processed, wherein a current header parser register of the one or more parser registers holds the offset and the length of the current protocol header being processed, wherein a pointer to the current protocol header or the current data header being processed is derived from the offset and a base address pointer for the data object or the packet, wherein the state information for the one or more data headers being processed includes the offset of the first byte of the one or more data headers being processed relative to the start of the packet and the length of the one or more data headers being processed, where in the current header parser register of the one or more parser registers holds the offset and the length of the one or more data headers being processed, wherein a pointer to the one or more data headers being processed is derived from an offset and the base address pointer for the data object or the packet.

6. The parsing system of claim 3, further comprising limit bounds of parsing, wherein the length of the data object or the packet implies a maximum length of the one or more protocol headers, wherein the length of the data object or the packet is held in a packet length register, wherein when the protocol header with its length exceeds the limit bounds set by the length of the packet or an instruction attempts to access data beyond the limit bounds then the parser will exit on an error, wherein a parse node sets a databound for the sub-protocol that is the maximum length of all the data elements included within the protocol header, wherein when the length of the one or more data headers exceeds the bound limits set by the databound or an instruction attempt to access data beyond the databound in the context of the sub-protocol then the parser exits on an error.

7. The parsing system of claim 3, further comprising end of node processing that is performed at an end of a node for an instruction sequence processing the node, wherein the end of node processing includes checking that parsing is complete, checking a for loop, jump to loop head, exiting loops, jump to next node, and overlay handling, wherein end of node processing first checks a loop register, wherein when the loop register is set to an address a data header offset is advanced by the length of the current data header and then a jump is performed to that address, or wherein when the loop register is a status code indicating an error then the parser exits and reports the error, or wherein when the loop register is set to an okay status code, the loop is not being processed and a next register is checked, wherein when the next register is set to an address, a current header offset is advanced by the length of the current data header, wherein when the one or more parse nodes are marked as an overlay node then the current header offset does not advance, wherein the jump is performed to that address the next register, or wherein when the next register is a status code indicating an error then the parser exits and reports the error, or wherein when the next register is set to the okay status code then the parser exits normally with the okay status code, wherein a limit is configured for a number of loop iterations and when the limit is exceeded then the loop exits with an error, wherein a limit is configured for the one or more parse nodes to process and when the limit is exceeded then the parser exits with an error.

8. The parsing system of claim 7, wherein the parser instructions are augmented with an end-of-node attributes, wherein once a marked instruction completes its primary processing it executes common end of node processing, wherein the parser instructions set the next register or loop register to be processed by the end of node processing.

9. The parsing system of claim 7, further comprising loop instructions including basic loops that are defined by a loop head, which sets the loop register with the address, wherein at the end of node processing when the loop register is set an address then the jump is made to the address to process the next loop iteration, wherein in end-of-node processing a loop terminates when the loop register has been set to sub node stop okay or the loop register is set to an error code when an error being encountered during loop processing, wherein an optional jump to post loop processing is allowed.

10. The parsing system of claim 7, wherein an encapsulation level is maintained in the one or more parser registers, wherein when transitioning to a parse node marked as encapsulation in the end of node processing the encapsulation level is incremented, where in when the encapsulation is incremented a pointer to a metadata frame is advanced by the size of the metadata frame, wherein a limit for a number of encapsulations is set and when the limit is exceeded the parser exits with an error, the one or more parser registers comprise a current encapsulation level.

11. The parsing system of claim 3, wherein the one or more parser registers include one or more counters that count events, wherein the parsing system includes an increment counter instruction that increments the one or more counters, wherein a limit is configured for a counter, of wherein when the limit is exceeded then the parser engine takes an action that could be stop the parser, stop the parser with error, exit loop, don't increment counter, wherein counters are automatically reset to zero when parsing commences for the packet or the data object, wherein the counter is optionally configured to be reset when an encapsulation parse node is encountered.

12. The parsing system of claim 3, further comprising a load from header instruction that loads some number of bytes from the current protocol header or the data header being processed into an accumulator register, wherein an attribute of the instructions indicates whether a source is the current protocol header or the one or more data headers, wherein an offset indicates the offset to load from relative to a start of the current header or data header, wherein an address pointer for the load can be derived by adding the offset to the pointer for the current header or the one or more data headers, wherein the attribute of the instructions indicate a loaded value is to by endian swapped, wherein an optional shift value indicates a number of bits to shift left the loaded value, wherein an optional mask value indicates a number of high order bits in the loaded value to zero, wherein the parsing system checks current header of data header length as part of the load, wherein when the load would access bytes beyond a length limit then parser exits on error condition, wherein when the length is acceptable but beyond the current header or data length then a saved header length value is extended in the one or more parser registers.

13. The parsing system of claim 11, further comprising a store to metadata instruction that stores some number of bytes from the one or more parser registers or immediate value to metadata memory, wherein source data may be a sub-register of the one or more parser registers, wherein a target of the store is either common metadata or a metadata frame, wherein the offset indicates the offset to store data relative to start of the common metadata or the metadata frame, wherein a counter register is specified to use as an array index and the counter is configured to be associated with an array element size, wherein the offset into the array is derived by multiplying the value of the counter by the array element size, wherein the offset for storing data is the offset indicated in the instructions plus the offset of the array when the array index is specified, wherein the one or more parser registers include base addresses of the common metadata and the metadata frame so that fully qualified address pointer for a destination is derived by adding the base addresses and a computed store offset.

14. The parsing system of claim 5, further comprising hardware parser length instructions, to set and check current header length data header length, and databound, wherein the length is derived from an immediate length, a variable field loaded in a sub-register of the one or more parser registers, or a sum of an immediate value and a variable length, wherein when the variable length is set it can be left shifted, wherein once the length is computed it is checked against appropriate bounds, wherein when a bound is exceeded, the parser stops with code depending on whether the length is for the current protocol header or the one or more data headers.

15. The parsing system of claim 2, further comprising a Content Addressable Memory that is used as a protocol table, wherein each entry is composed of a key and a target value, wherein the Content Addressable Memory is used to perform next protocol lookups and can be used for other purposes as well, wherein instruction are used to program entries of the Content Addressable Memory, wherein the Content Addressable Memory lookup instructions perform the lookup on the value in an accumulator sub-register as the key, wherein Content Addressable Memory instructions set returned value in a next register, set the returned value in an accumulator register, or jump directly to a returned address, wherein the Content Addressable Memory instructions indicate a table selector that allows different Content Addressable Memory tables, wherein the different Content Addressable Memory tables are consolidated into a single Content Addressable Memory table by making the table selector to be part of the key, wherein for the single Content Addressable Memory table, where the table selector may be deduced by a low order bits program counter to reduce a number of bits needed to express a table identifier in the instructions.

16. The parsing system of claim 2, further comprising lookup arrays that are used as a protocol table, wherein the lookup arrays are used to perform next protocol lookups and can be used for other purposes as well, wherein instruction are used to program entries of the array, wherein parser array lookup instructions perform a lookup using a value in a sub-register as an index, wherein array lookup instructions set a returned value in a next register, set the returned value in one or more parser registers, or jump directly to a returned address, where the value includes a base index into a sub-table to consolidate different lookup arrays in into a single array table.

17. The parsing system of claim 9, further comprising Type Length Value loops that are implemented using a loadtlvloop instruction, which combines a functionality of loading a Type Length Value type from the one or more data headers and serving as a loop head, wherein at each iteration the one or more parser registers is set to an index of a next set flag bit to process, wherein a "jump loop" function performs the lookup and jump in the context of a loop, wherein a "jump TLV loop" function performs the lookup and the jump in the context of a Type Length Value loop.

18. The parsing system of claim 3 further comprising comparison instructions that perform a comparison operation between a value in sub-register of the one or more parser registers and an immediate, wherein a result of the comparison is false then behaviors include one of a following: stop the parser, stop processing the current node, stop processing a current sub-node, of jump to a handler address specified in the one or more parser registers.

19. The parsing system of claim 3 further comprising runthread instructions that requests that work be performed to process a protocol layer in one or more worker threads, wherein a work item indicates a function to run in the one or more worker threads to process a protocol layer and includes the parser state describing the protocol layer to be processed, wherein when a runthread instruction is executed, a snapshot of a material parser state is taken and placed in an allocated work item which is a memory object, wherein the one or more parser registers are overlaid with data of the allocated work item such that taking the snapshot is done by a block copy for the one or more parser registers to an address of the allocated work item in memory, wherein the parser engine sends these messages to a thread scheduler initiate scheduling of the one or more worker threads, wherein the scheduler processes the message and schedules the one or more worker threads to run all the work items in the list, wherein the one or more worker threads thread are scheduled asynchronously and runs in parallel with the parser.

20. The parsing system of claim 13 further comprising data extraction instructions that performs a copy from header data to metadata to perform data extraction, wherein the data extraction instructions encapsulate load and store operations and move multiple bytes in one instruction, wherein the data extraction instructions invokes pseudo instructions, wherein the pseudo instructions include an index of the instructions in memory, and a total number of the pseudo instructions to execute.

* * * * *